US011240325B2

(12) United States Patent
Greifeneder et al.

(10) Patent No.: US 11,240,325 B2
(45) Date of Patent: Feb. 1, 2022

(54) METHOD AND SYSTEM FOR TRACING END-TO-END TRANSACTION, INCLUDING BROWSER SIDE PROCESSING AND END USER PERFORMANCE EXPERIENCE

(71) Applicant: Dynatrace LLC, Waltham, MA (US)

(72) Inventors: Bernd Greifeneder, Linz (AT); Helmut Spiegl, Linz (AT); Markus Gaisbauer, Linz (AT); Clemens Fuchs, Gallneukirchen (AT)

(73) Assignee: Dynatrace LLC, Waltham, MA (US)

( * ) Notice: Subject to any disclaimer, the term of this patent is extended or adjusted under 35 U.S.C. 154(b) by 0 days.

(21) Appl. No.: 16/687,995

(22) Filed: Nov. 19, 2019

(65) Prior Publication Data

US 2020/0195735 A1 Jun. 18, 2020

Related U.S. Application Data

(62) Division of application No. 15/412,129, filed on Jan. 23, 2017, now Pat. No. 10,516,747, which is a division of application No. 13/722,026, filed on Dec. 20, 2012, now Pat. No. 9,571,591.

(60) Provisional application No. 61/580,869, filed on Dec. 28, 2011.

(51) Int. Cl.
*H04L 29/08* (2006.01)

(52) U.S. Cl.
CPC .............. *H04L 67/22* (2013.01); *H04L 67/02* (2013.01)

(58) Field of Classification Search
CPC ....... H04L 67/22; H04L 67/02; H04L 67/142; H06L 43/12
See application file for complete search history.

(56) References Cited

U.S. PATENT DOCUMENTS

| | | | |
|---|---|---|---|
| 6,973,490 B1 | 12/2005 | Robertson et al. | |
| 7,600,014 B2 | 10/2009 | Russell et al. | |
| 8,234,631 B2 | 7/2012 | Greifeneder et al. | |
| 8,271,878 B2 | 9/2012 | Kane et al. | |
| 8,489,714 B2 | 7/2013 | Thangadurai et al. | |
| 10,389,818 B2 | 8/2019 | Anand | |
| 2002/0099818 A1* | 7/2002 | Russell | H04L 69/329 709/224 |
| 2006/0106702 A1* | 5/2006 | Pauw | G06Q 10/10 705/35 |

(Continued)

*Primary Examiner* — Eric J Yoon

(57) ABSTRACT

A system is provided for tracing end-to-end transactions. The system uses bytecode instrumentation and a dynamically injected agent to gather web server side tracing data, and a browser agent which is injected into browser content to instrument browser content and to capture tracing data about browser side activities. Requests sent during monitored browser activities are tagged with correlation data. On the web server side, this correlation information is transferred to tracing data that describes handling of the request. This tracing data is sent to an analysis server which creates tracing information which describes the server side execution of the transaction and which is tagged with the correlation data allowing the identification of the causing browser side activity. The analysis server receives the browser side information, finds matching server side transactions and merges browser side tracing information with matching server side transaction information to form tracing information that describes end-to-end transactions.

21 Claims, 59 Drawing Sheets

System Overview Separate Request Server

(56) References Cited

U.S. PATENT DOCUMENTS

| | | | | |
|---|---|---|---|---|
| 2007/0245027 | A1 | 10/2007 | Ghosh et al. | |
| 2007/0299869 | A1 | 12/2007 | Clary et al. | |
| 2008/0114875 | A1 * | 5/2008 | Anastas | G06Q 30/02 709/224 |
| 2009/0299998 | A1 * | 12/2009 | Kim | G06F 16/951 |
| 2009/0327914 | A1 * | 12/2009 | Adar | G06F 16/958 715/745 |
| 2010/0082438 | A1 * | 4/2010 | Garmon | A61P 35/00 705/14.66 |
| 2010/0088404 | A1 * | 4/2010 | Mani | H04L 67/02 709/224 |
| 2012/0078707 | A1 * | 3/2012 | Ramakrishnan | G06Q 30/0242 705/14.41 |
| 2013/0185643 | A1 | 7/2013 | Greifeneder et al. | |
| 2015/0186249 | A1 | 7/2015 | Miller | |

* cited by examiner

FIG 1: System Overview
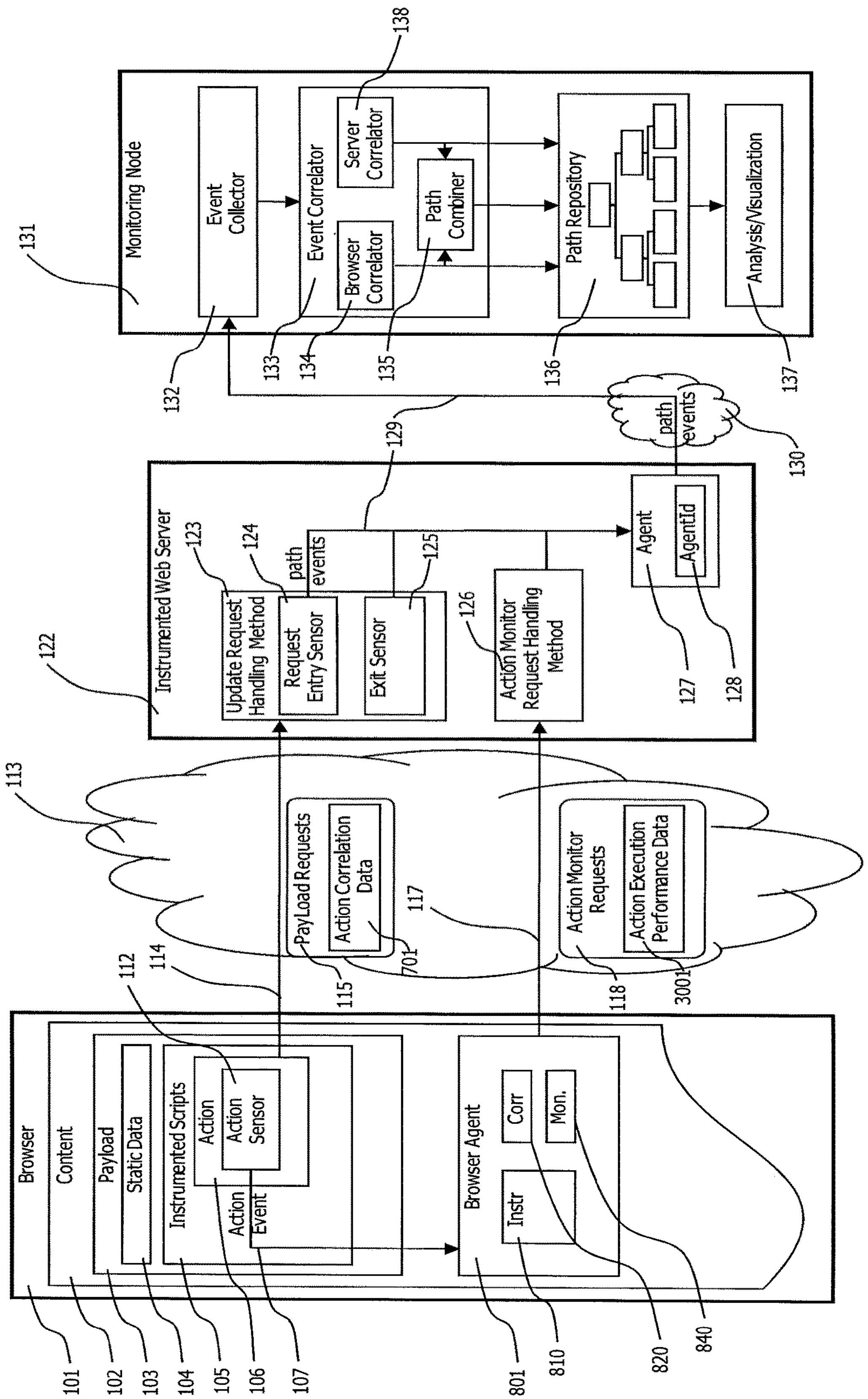

FIG 2: System Overview Separate Request Server
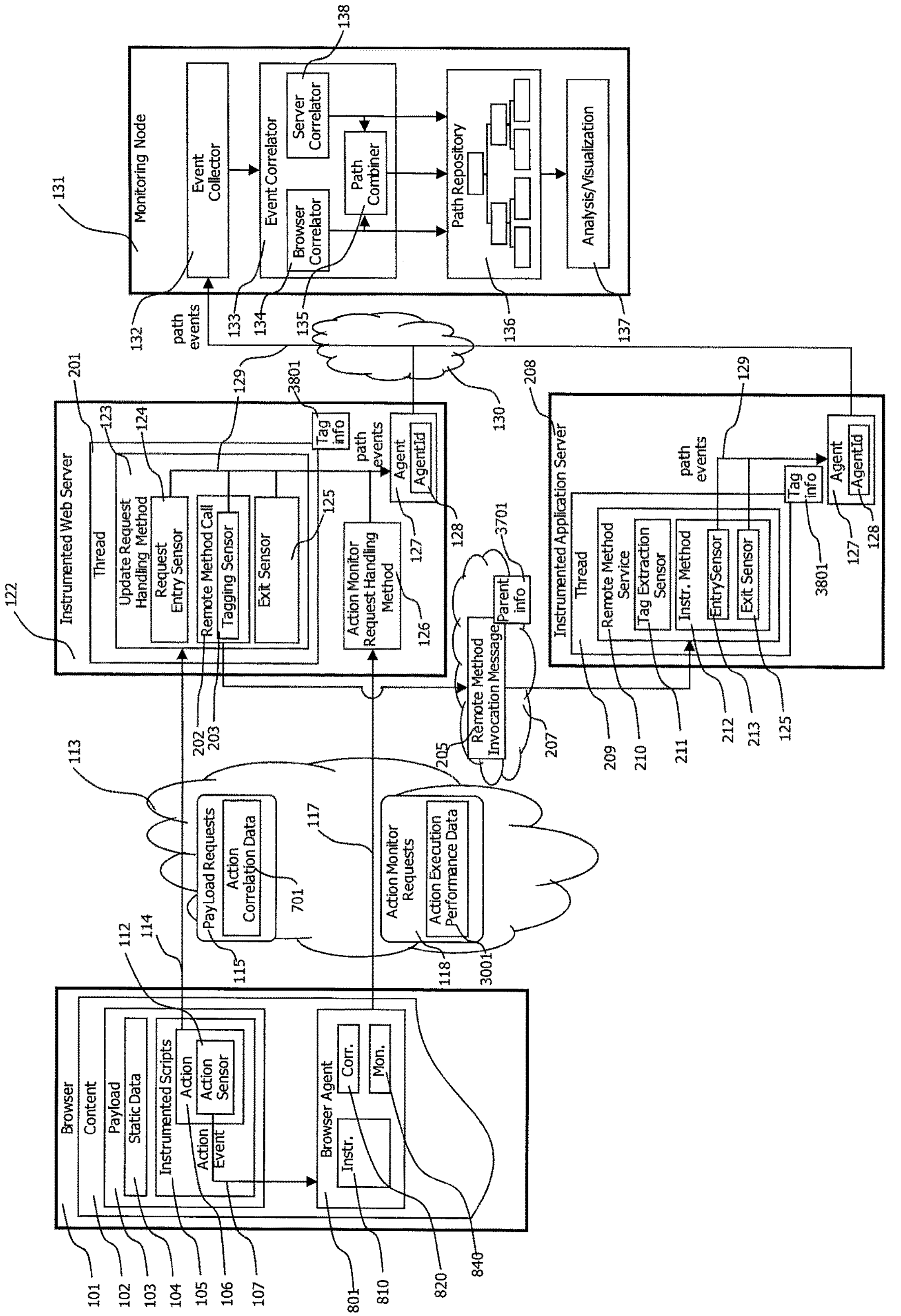

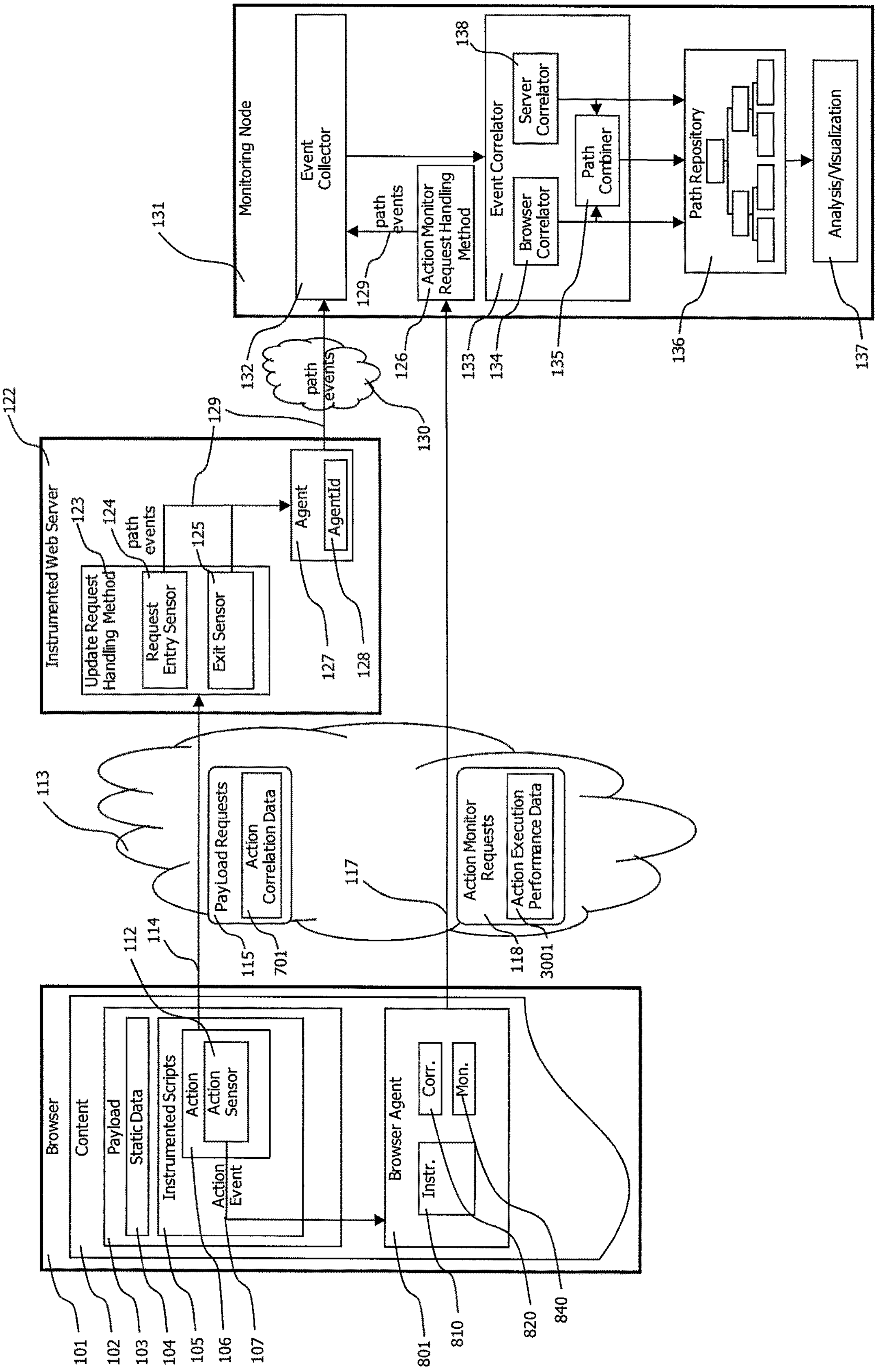
FIG 3: System Overview Direct Action Monitor Requests

FIG 4: Initial Browser Agent Deployment
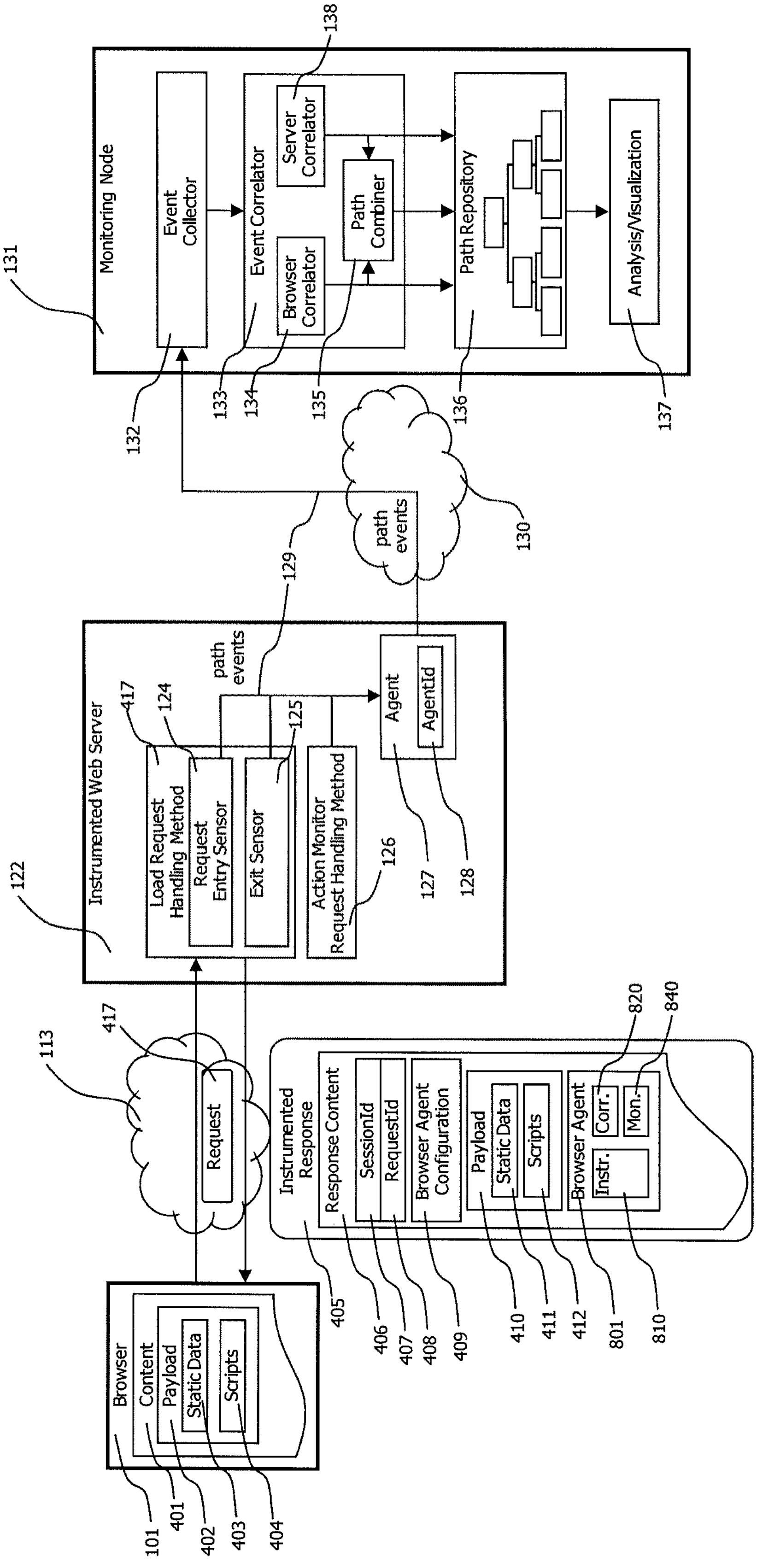

FIG 5: Capture Page Load Activity before Browser Agent Initialization
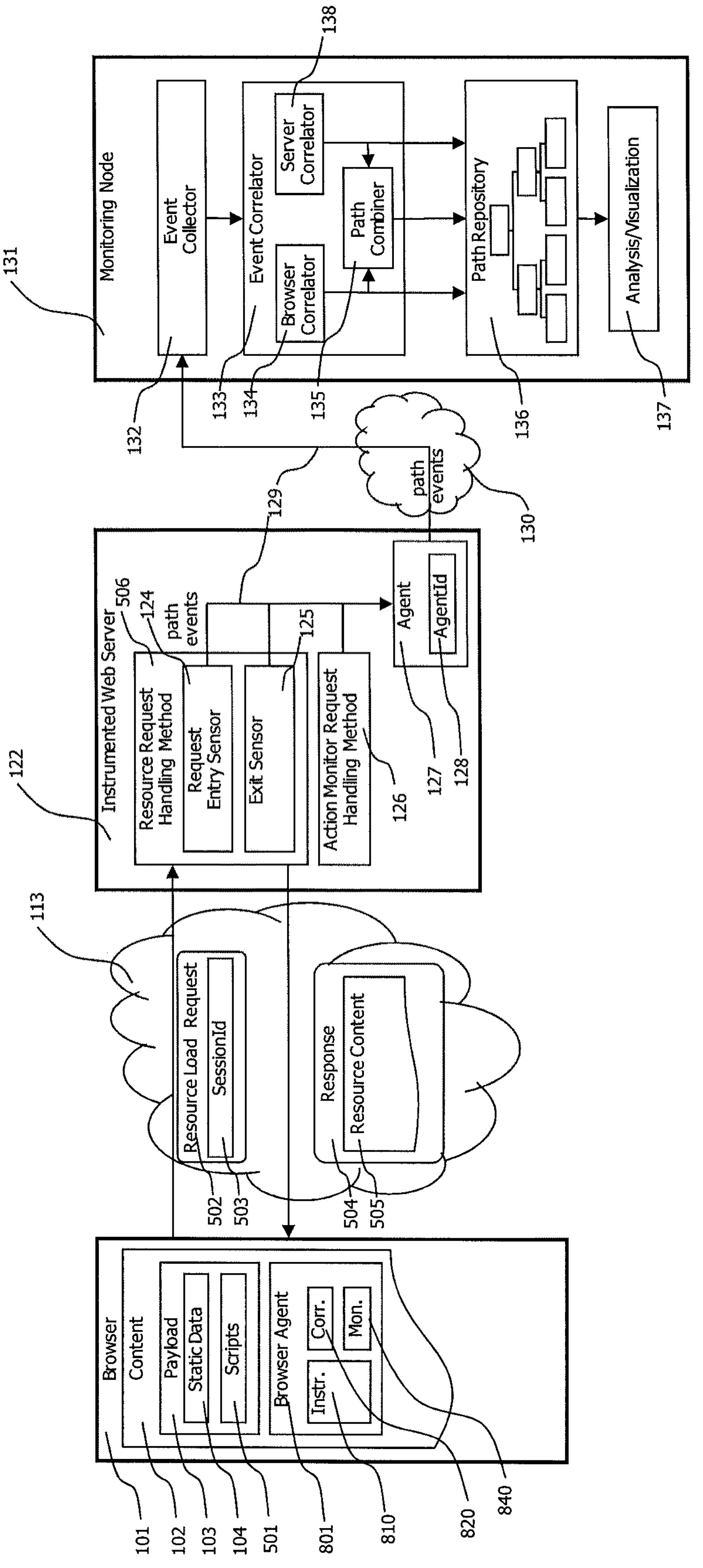

FIG 6: Capture Page Load Activity after Browser Agent Initialization
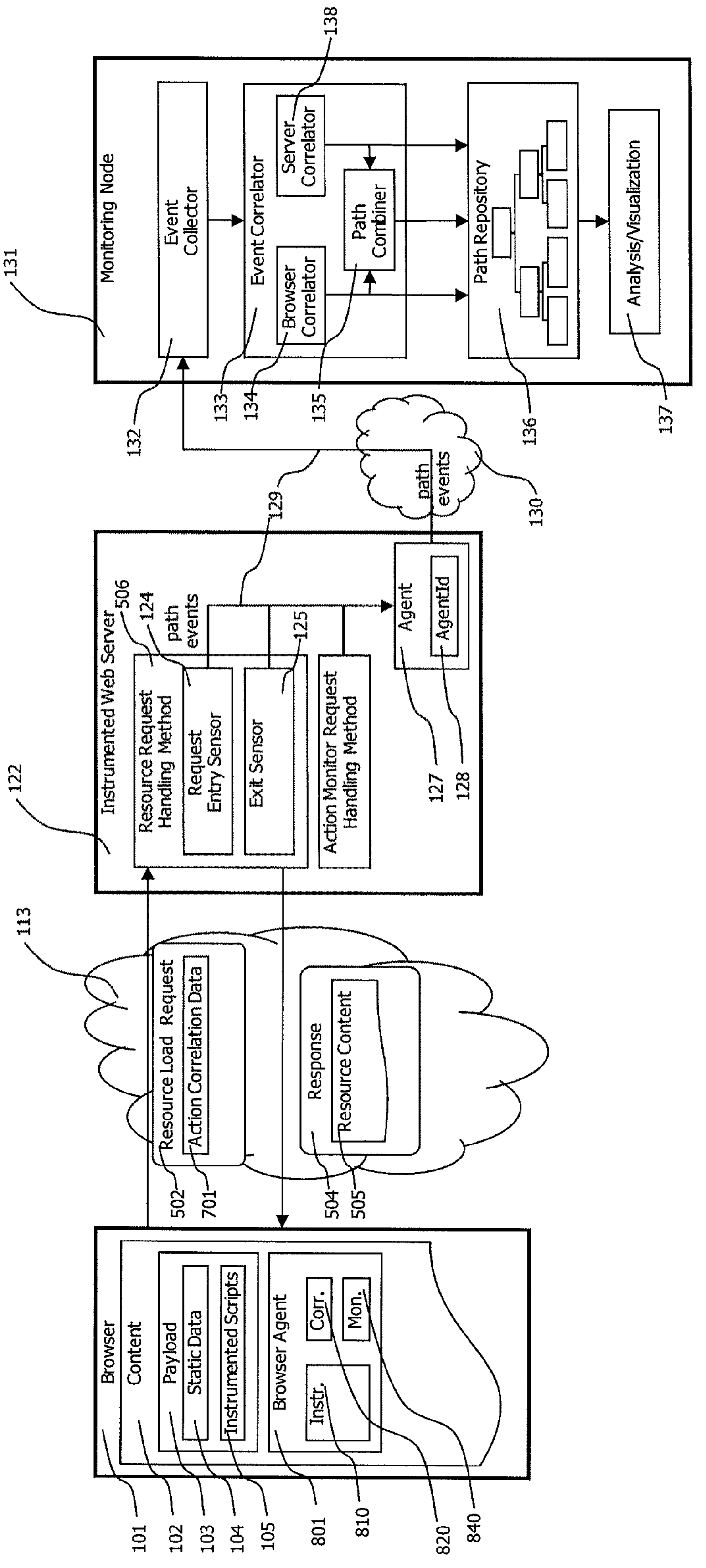

FIG 7: Action Correlation Data
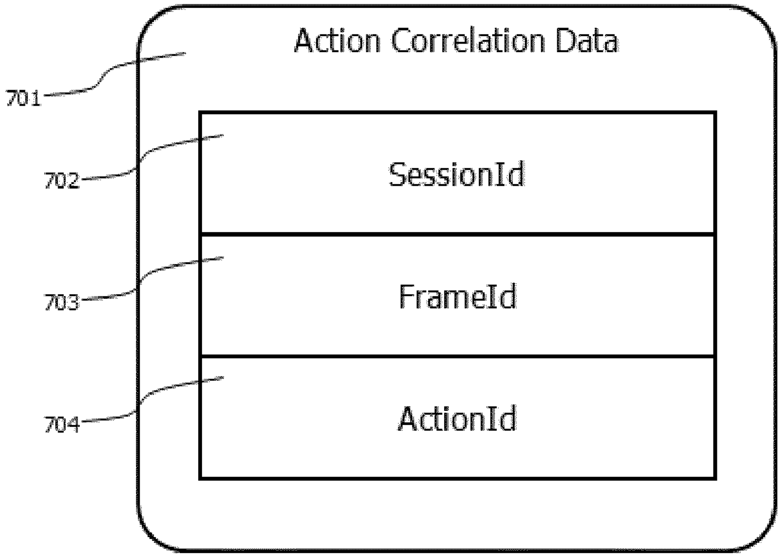

FIG 8: Browser Agent
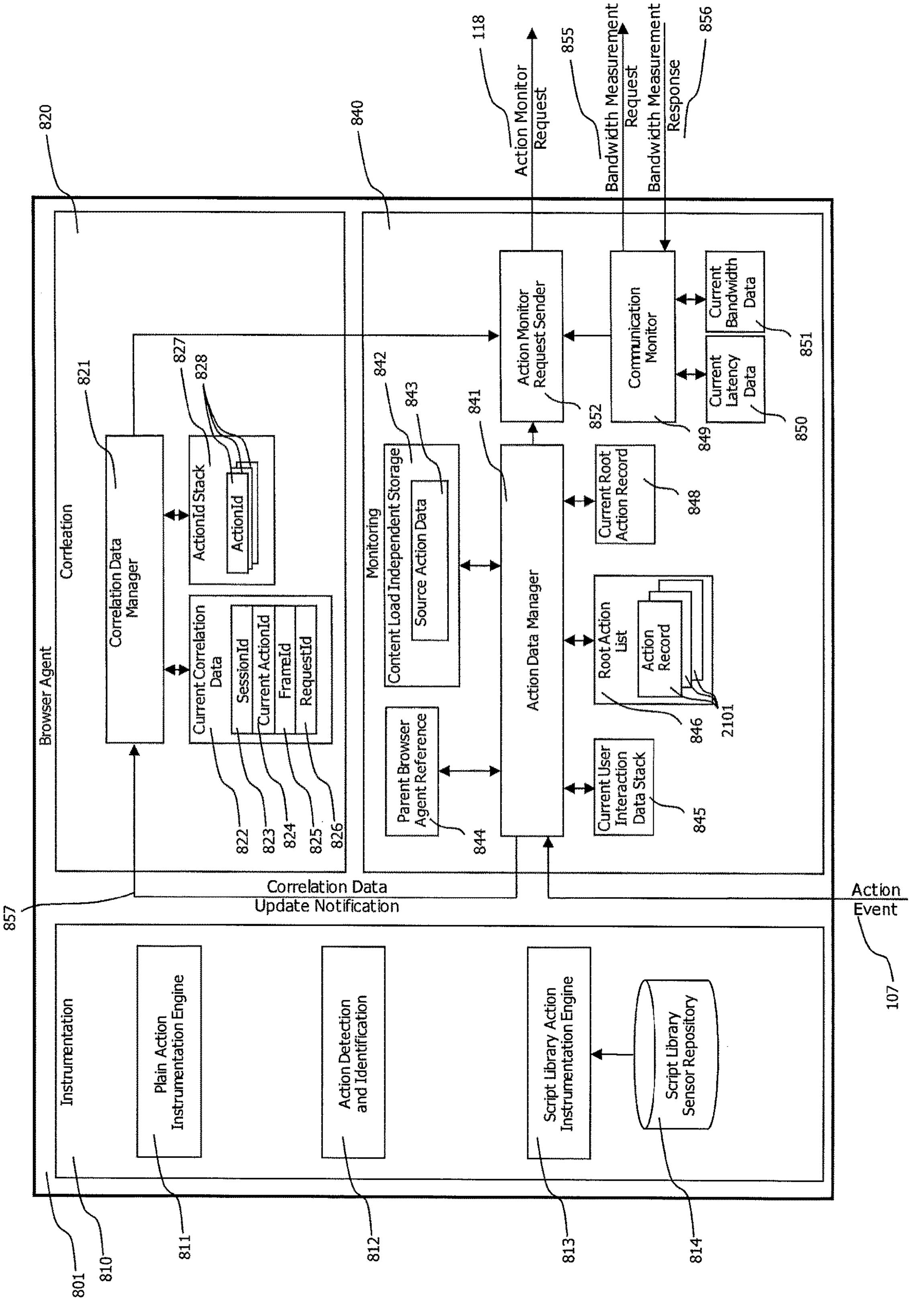

FIG 9: Action Classification

901 Plain Actions

| | User Interaction Actions (Exemplary) | Content Load Action (Exemplary) | Content Update Action (Exemplary) | |
|---|---|---|---|---|
| 910 | | 920 | | 930 |
| 911 | MouseUp | Load 921 | Synchronous Content Update | 931 |
| 912 | MouseDown | OnLoad 922 | Asynchronous Content Update | 932 |
| 913 | Click | OnUnload 923 | (Nested Asynchronous Content Update) | 933 |
| 914 | Double Click | ... | ... | |
| | ... | | | |

940 Script Library Actions

| | User Interaction Actions (Exemplary) | Content Update Action (Exemplary) | |
|---|---|---|---|
| 950 | | | 960 |
| 951 | Click | Synchronous Content Update | 961 |
| | ... | Asynchronous Content Update | 962 |
| | | (Nested Asynchronous Content Update) | 963 |
| | | ... | |

FIG 10: User Interaction Event Propagation
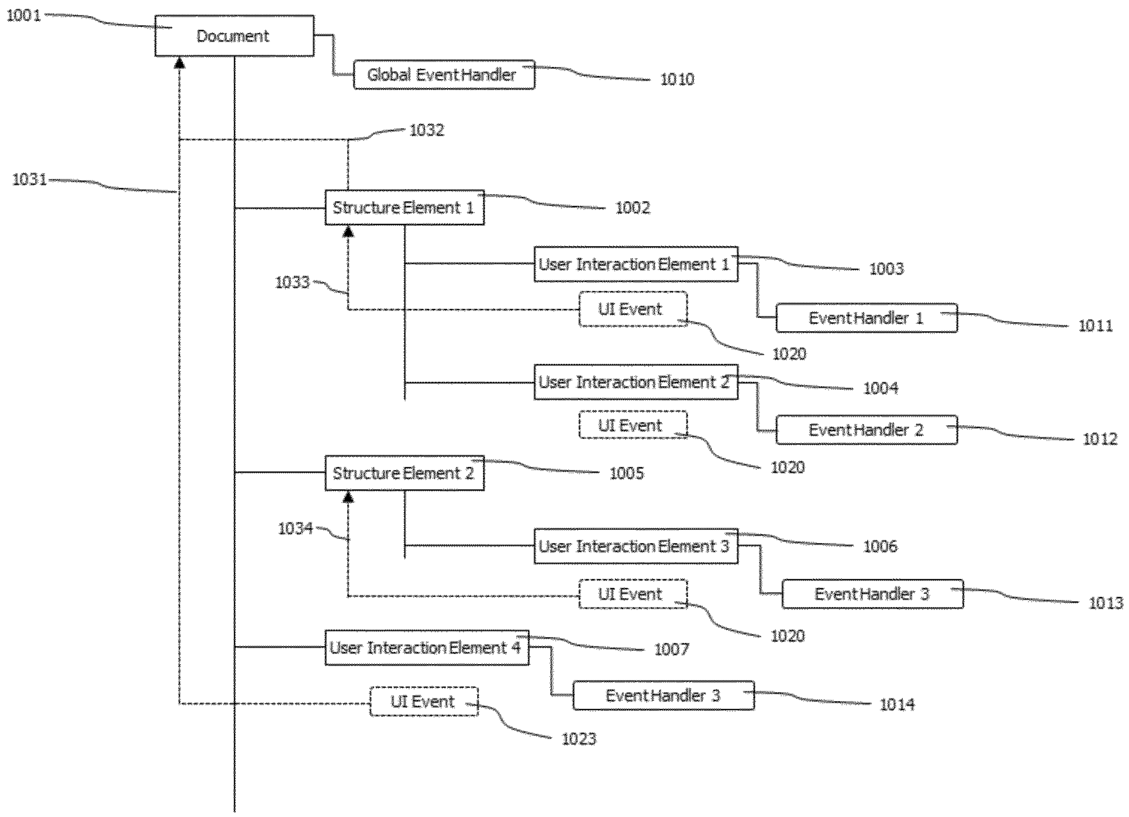

FIG 11: Fragmented Content
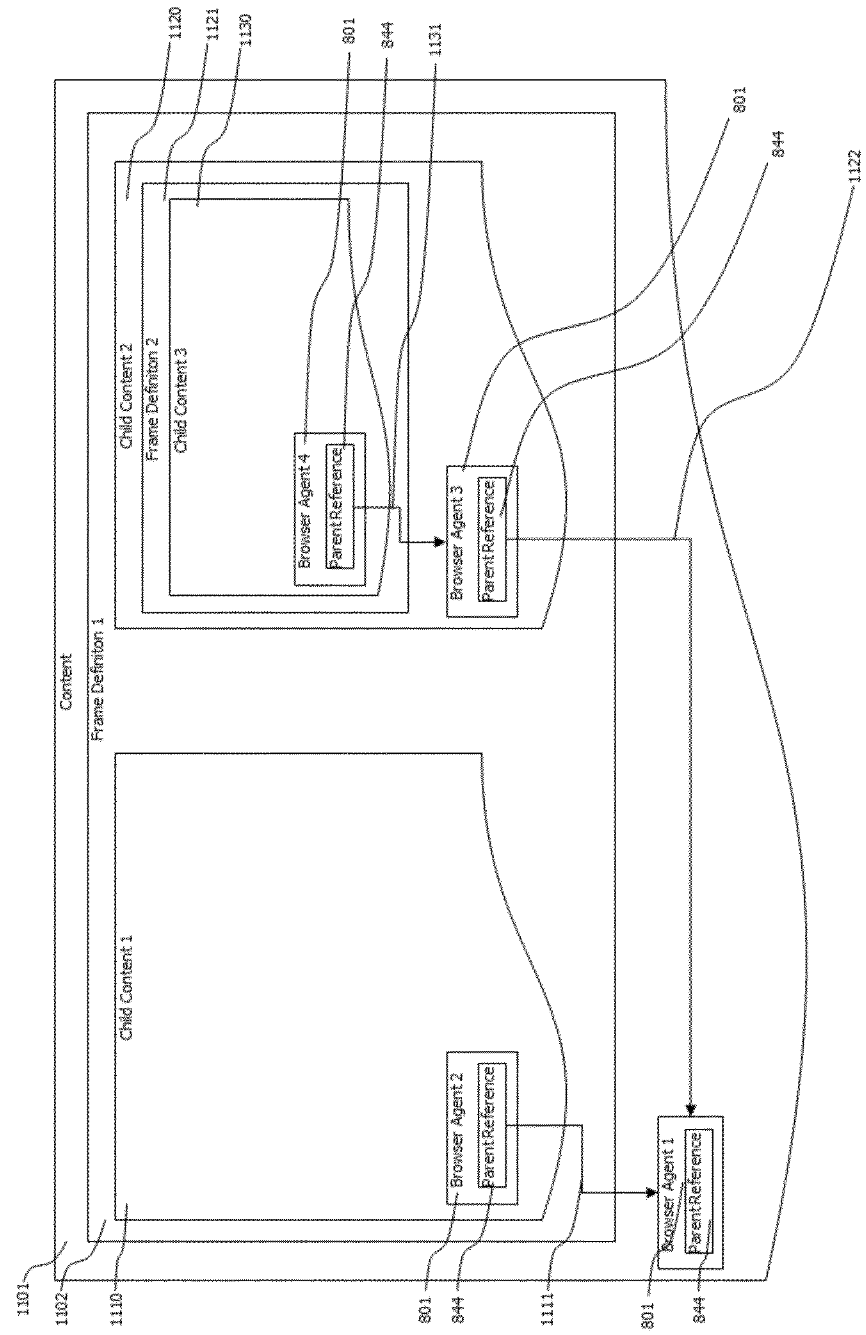

FIG 12: Content Load Process
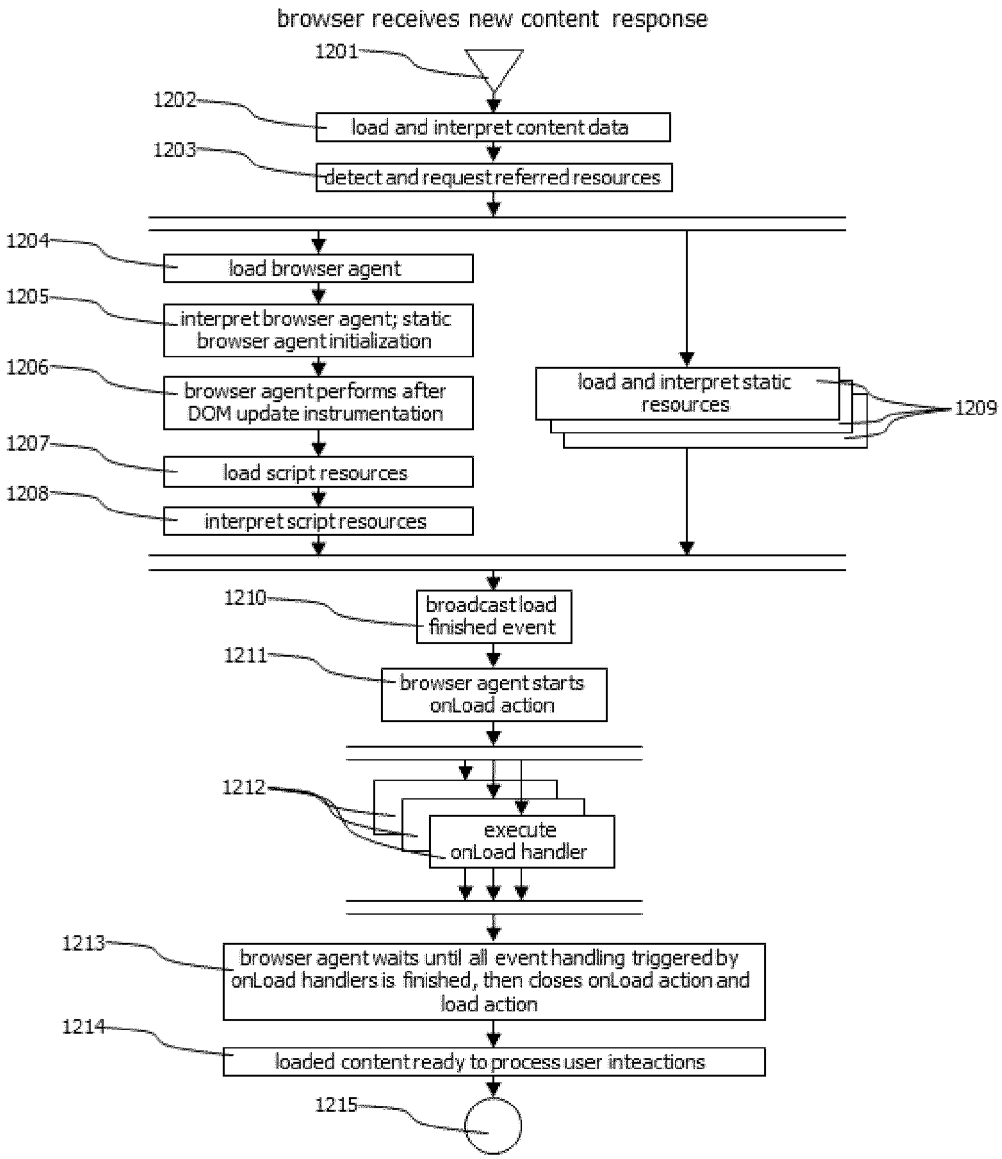

FIG 13: Content UnLoad Process
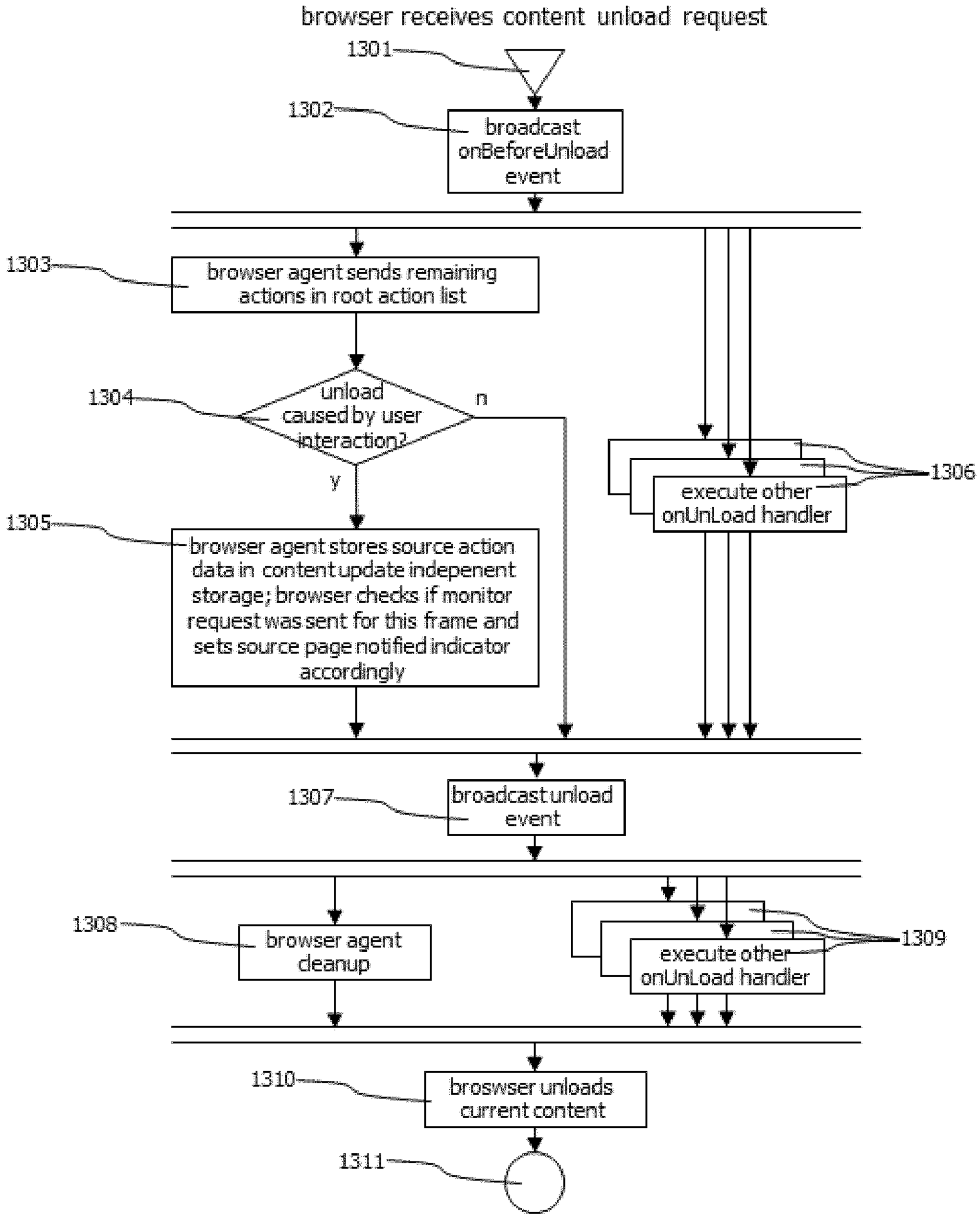

FIG 14: Static Browser Agent Initialization
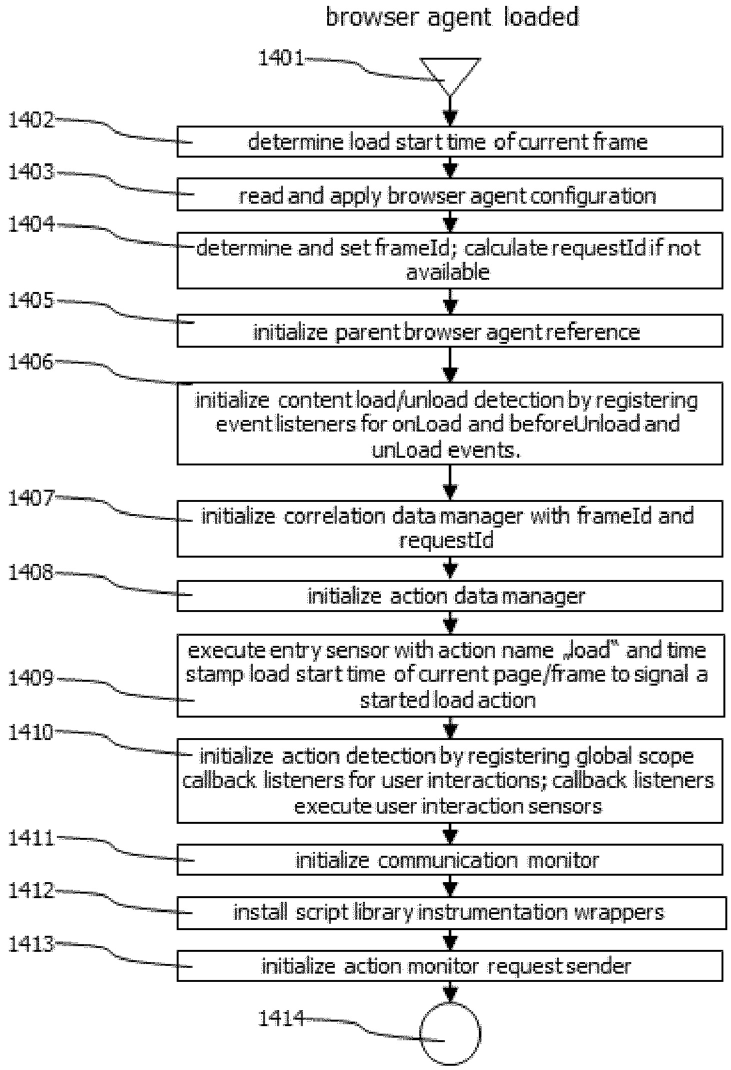

FIG 15: After DOM Update Instrumentation
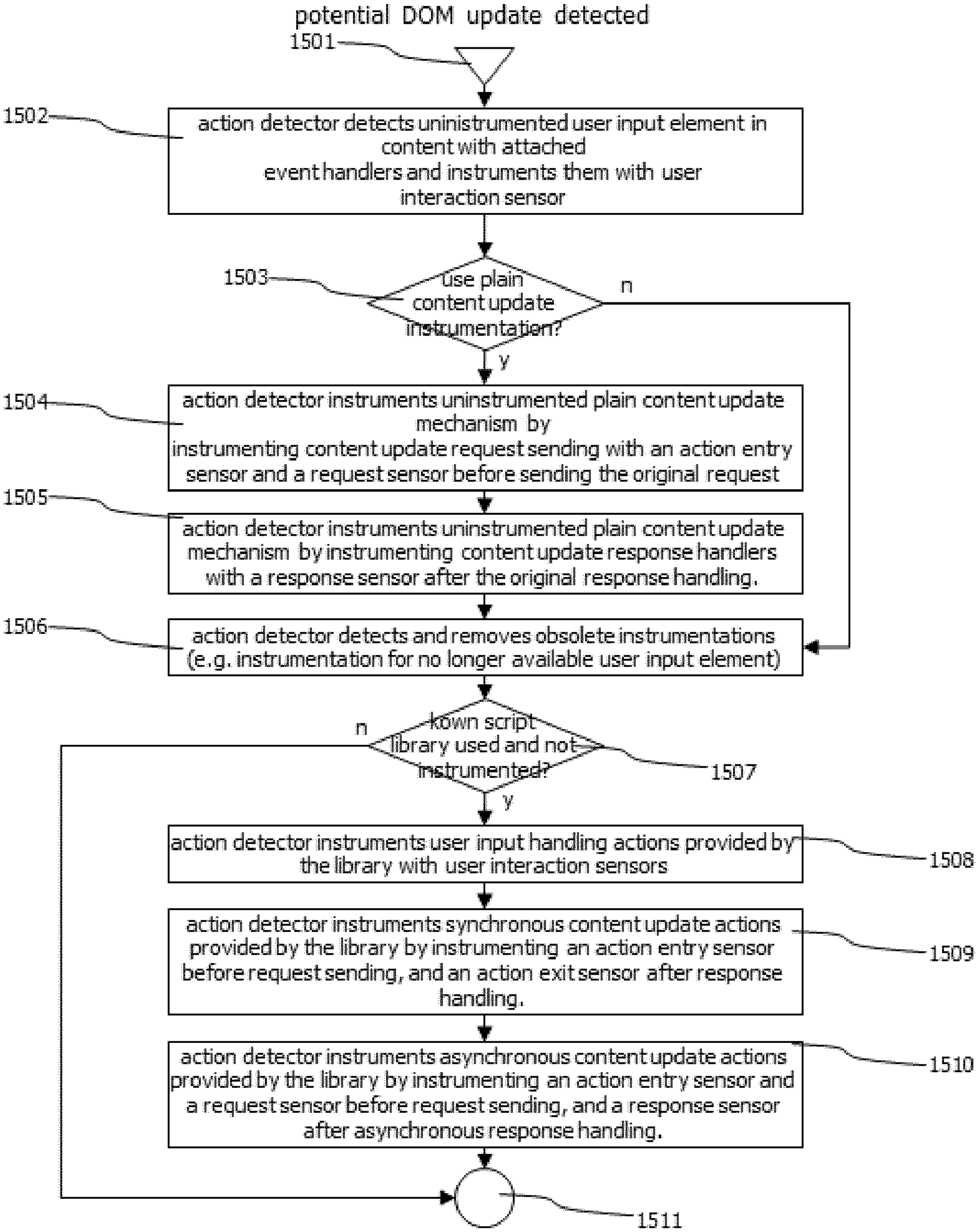

FIG 16: Action Execution
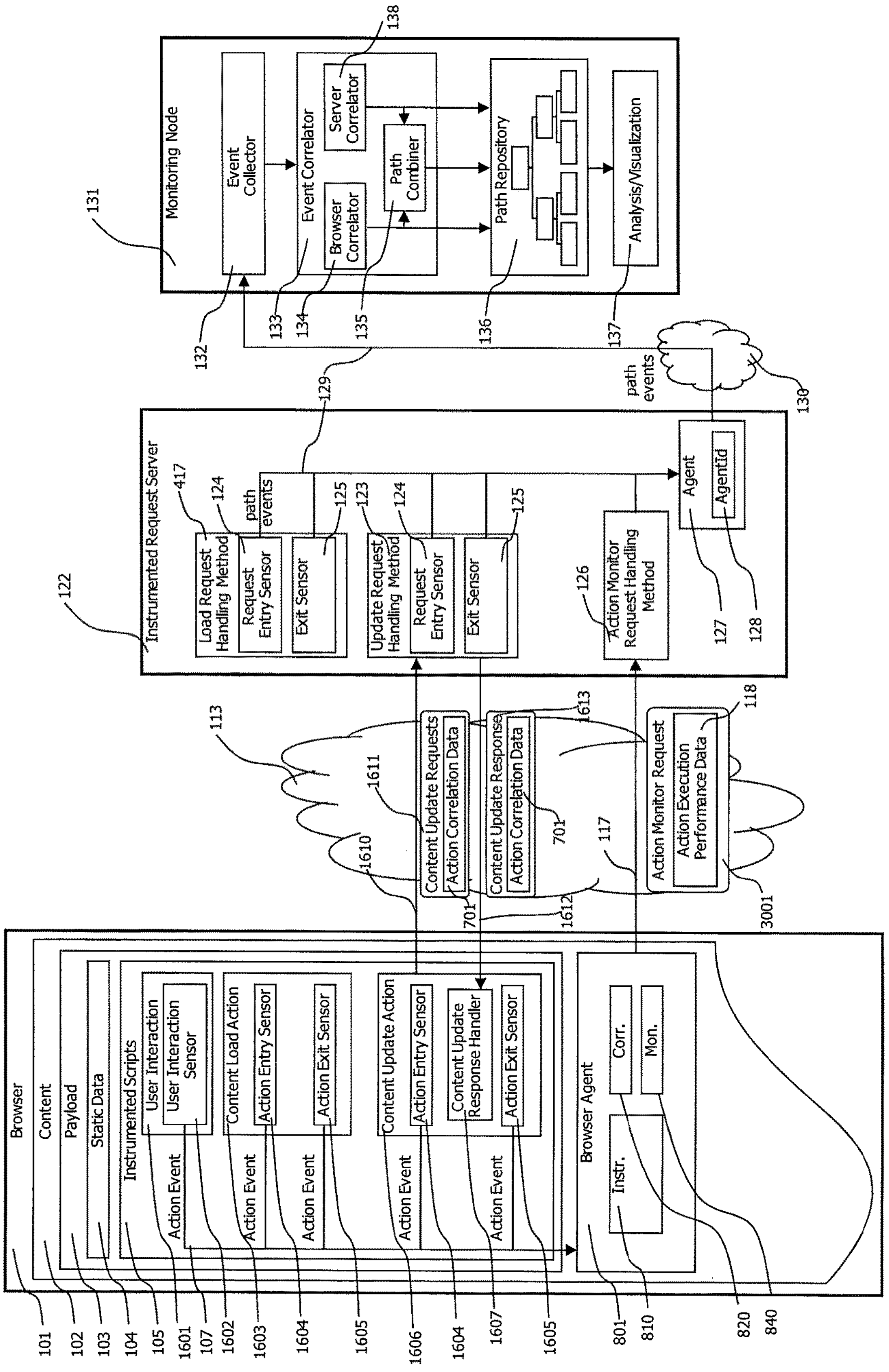

FIG 17: Nested Action Execution
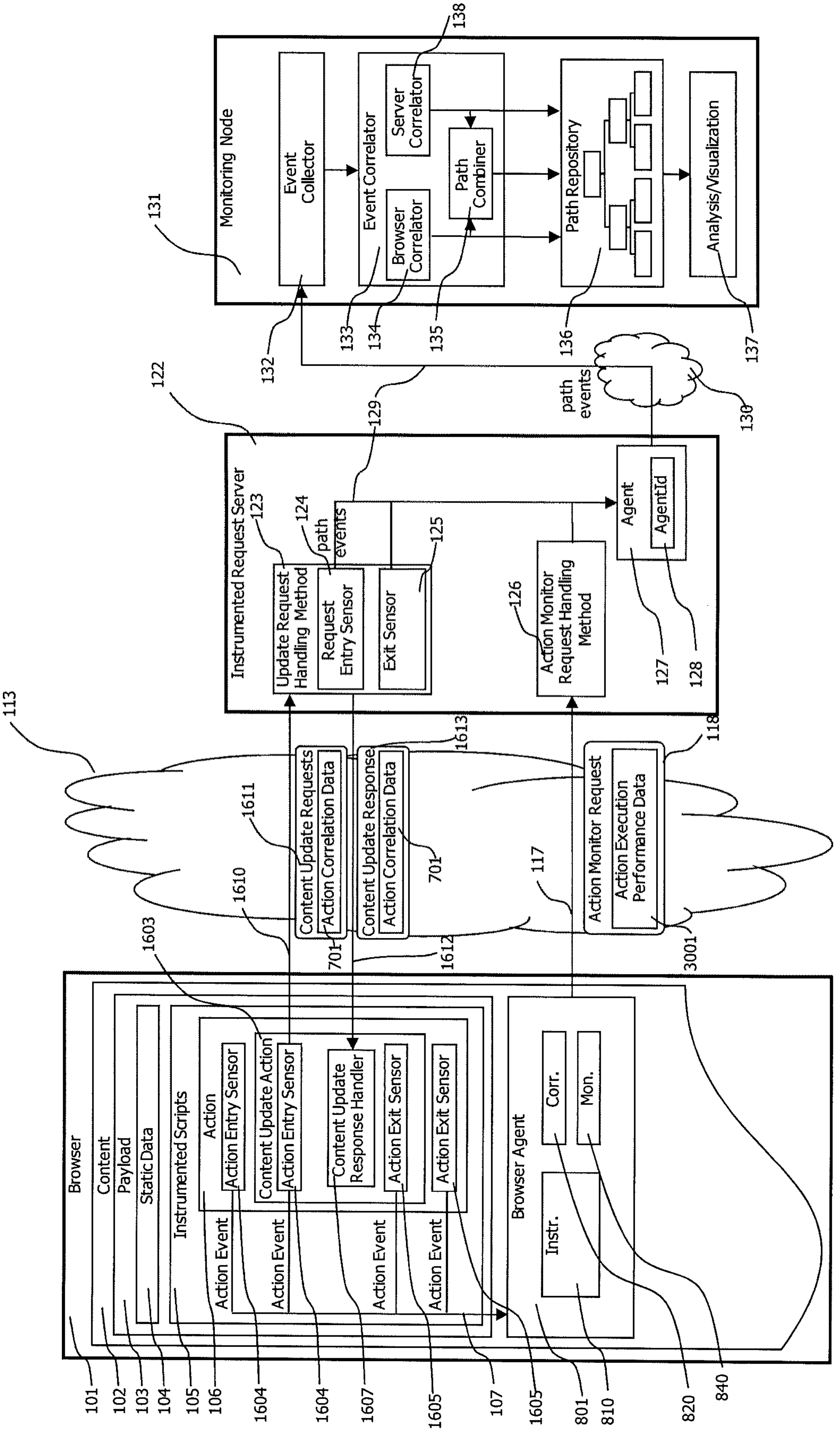

FIG 18: Action Execution with Asynchronous Response Handling
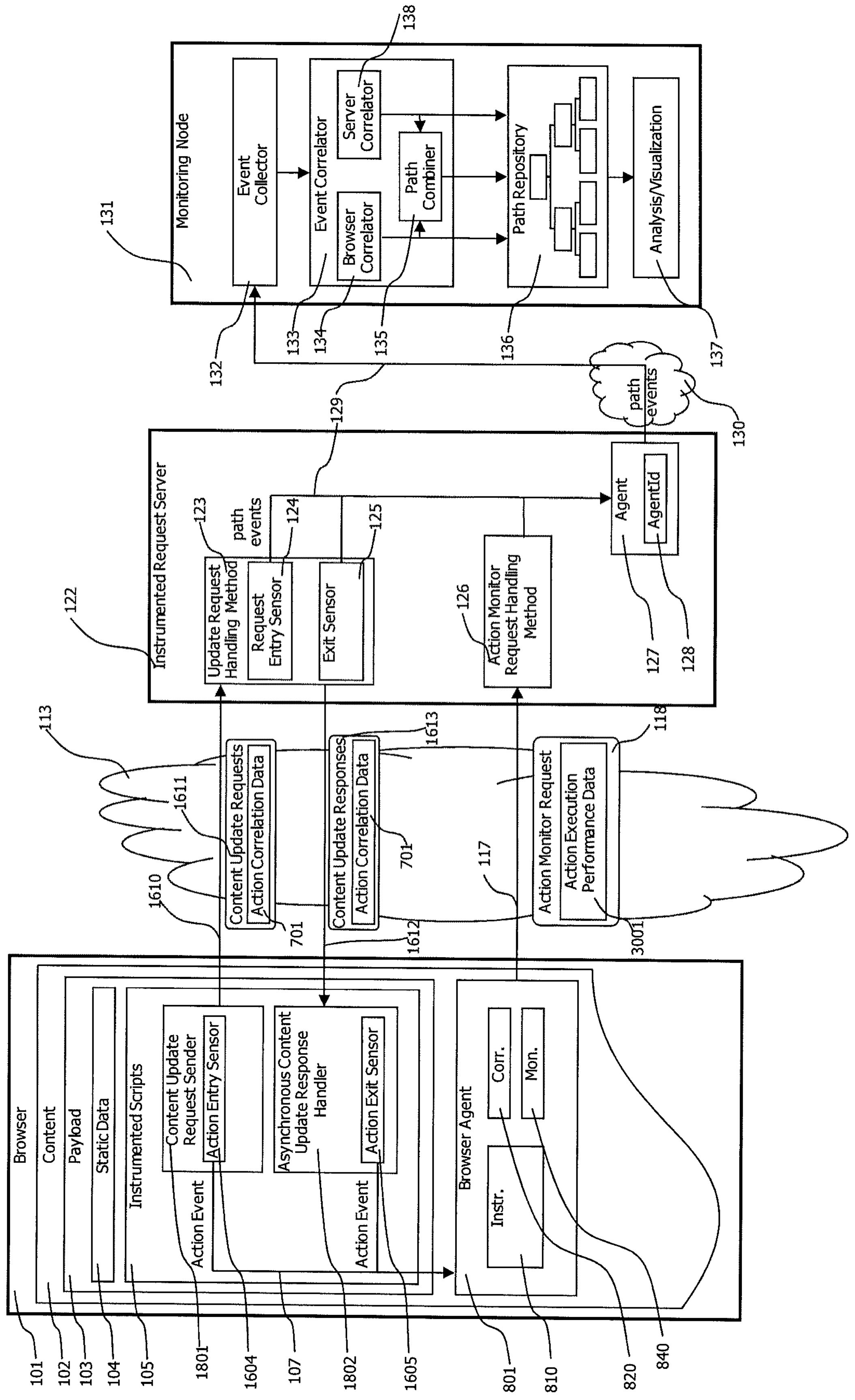

FIG 19: Action Execution with Nested Asynchronous Response Handling
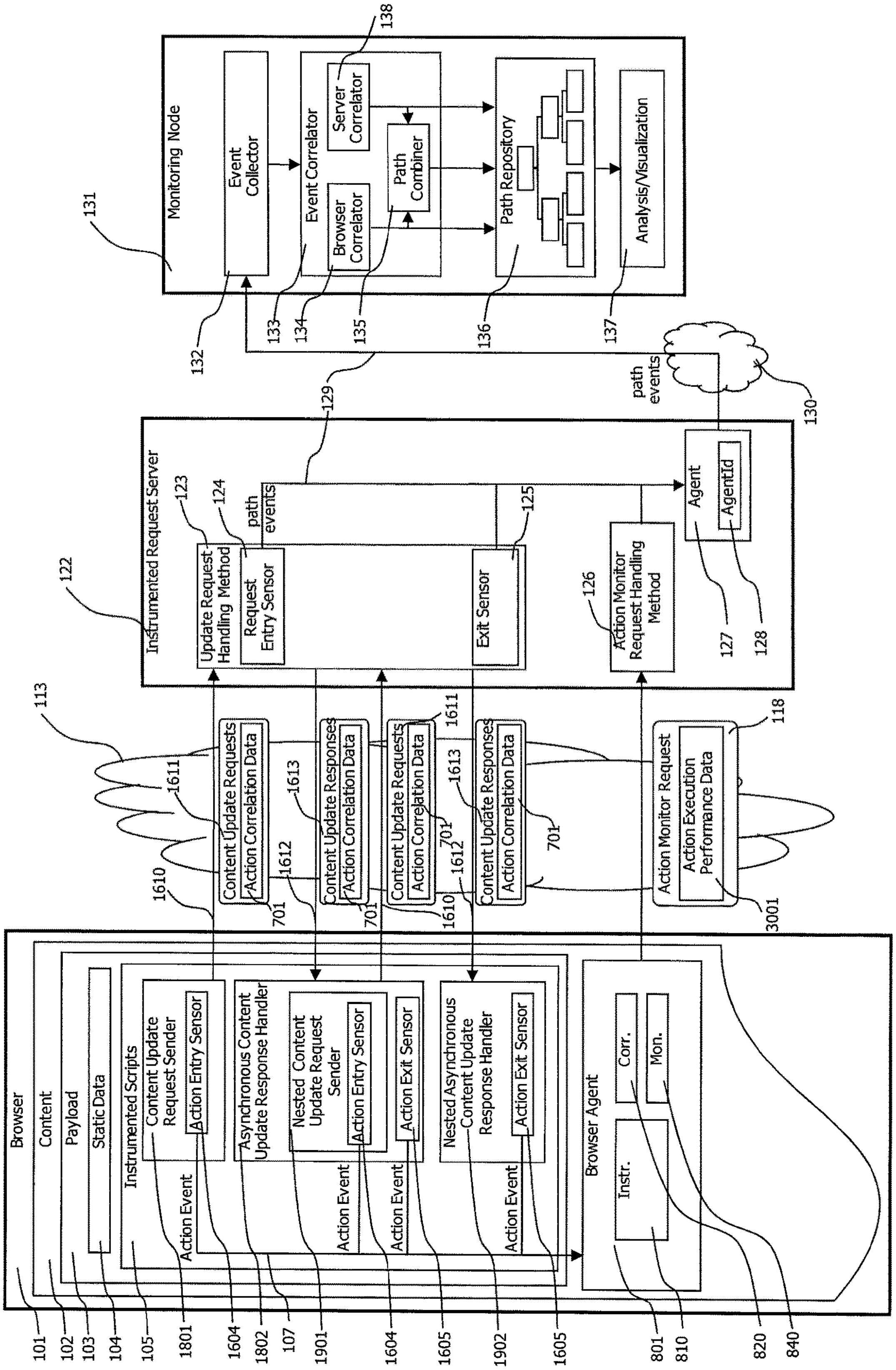

FIG 20: Action Events

Figure 20A:
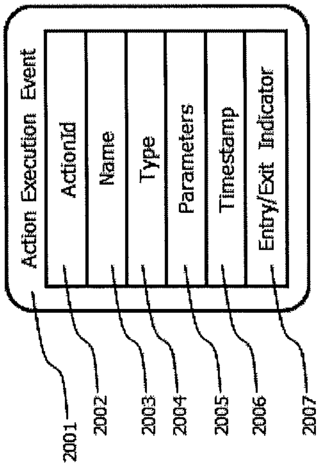

FIG 20a: Action Execution Event

Figure 20B:
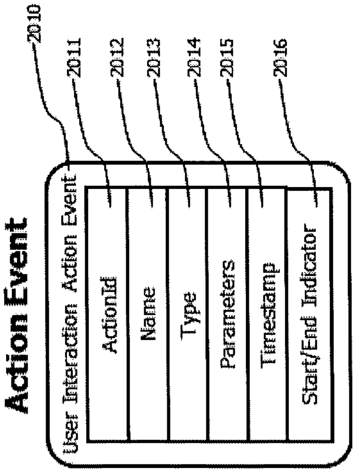

FIG 20b: User Interaction Action Event

FIG 21: Action Record
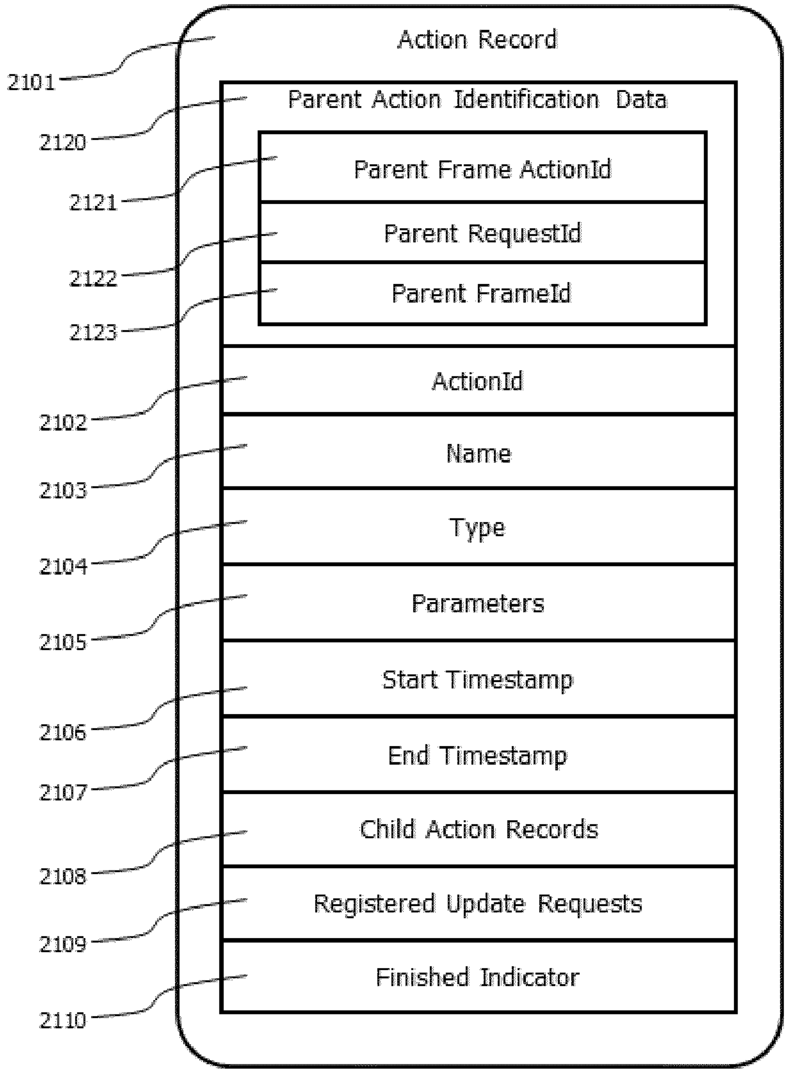

FIG 22: User Interaction Data
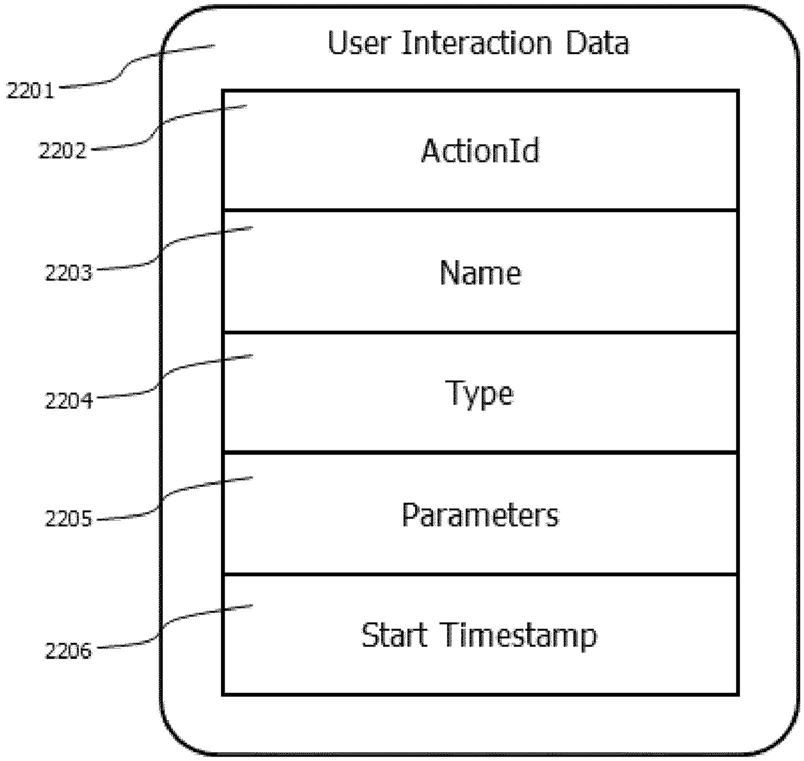

FIG 23: Source Action Data
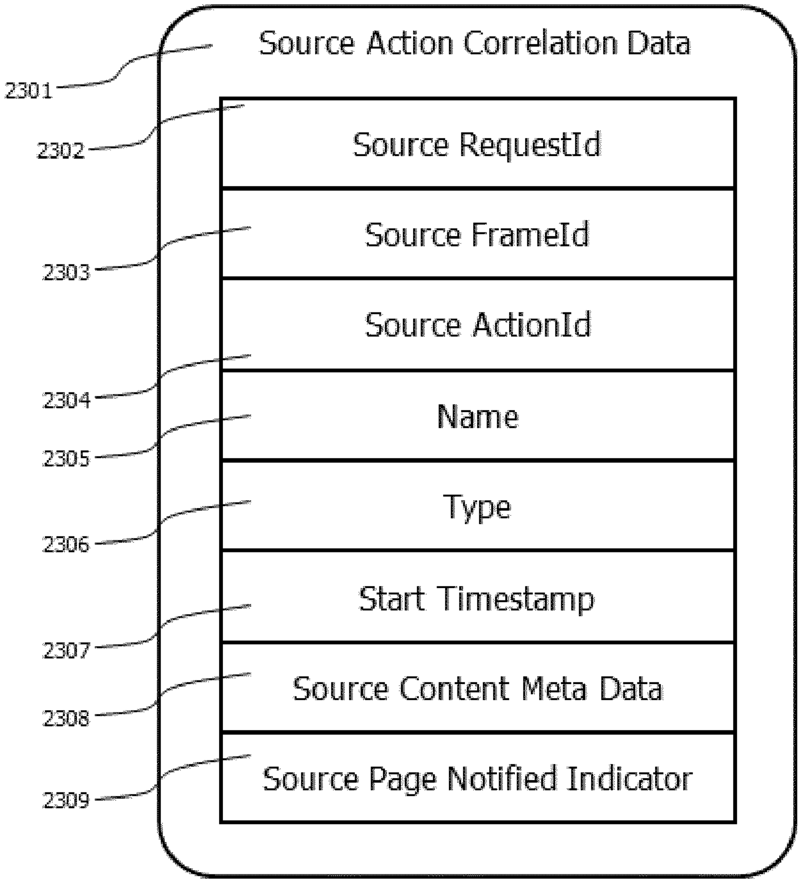

FIG 24: Action Sensor Execution { Fig 24a, Fig 24b
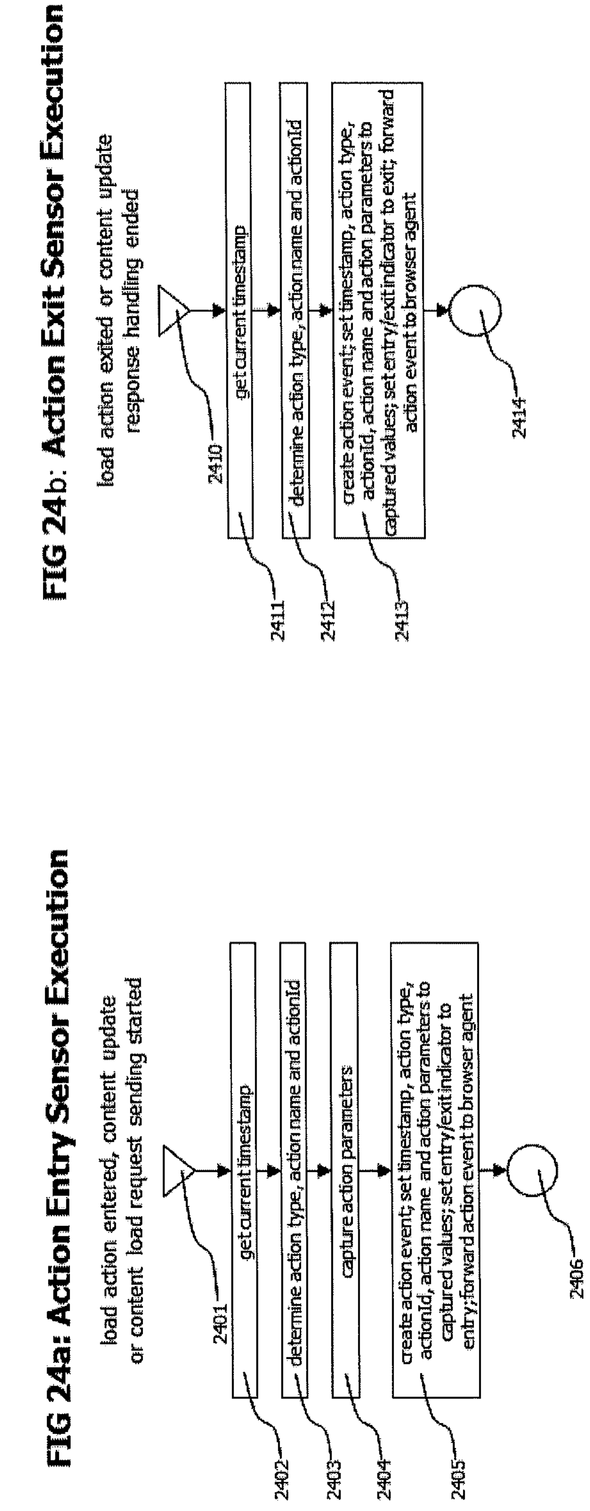

FIG 25: User Interaction Sensor Execution
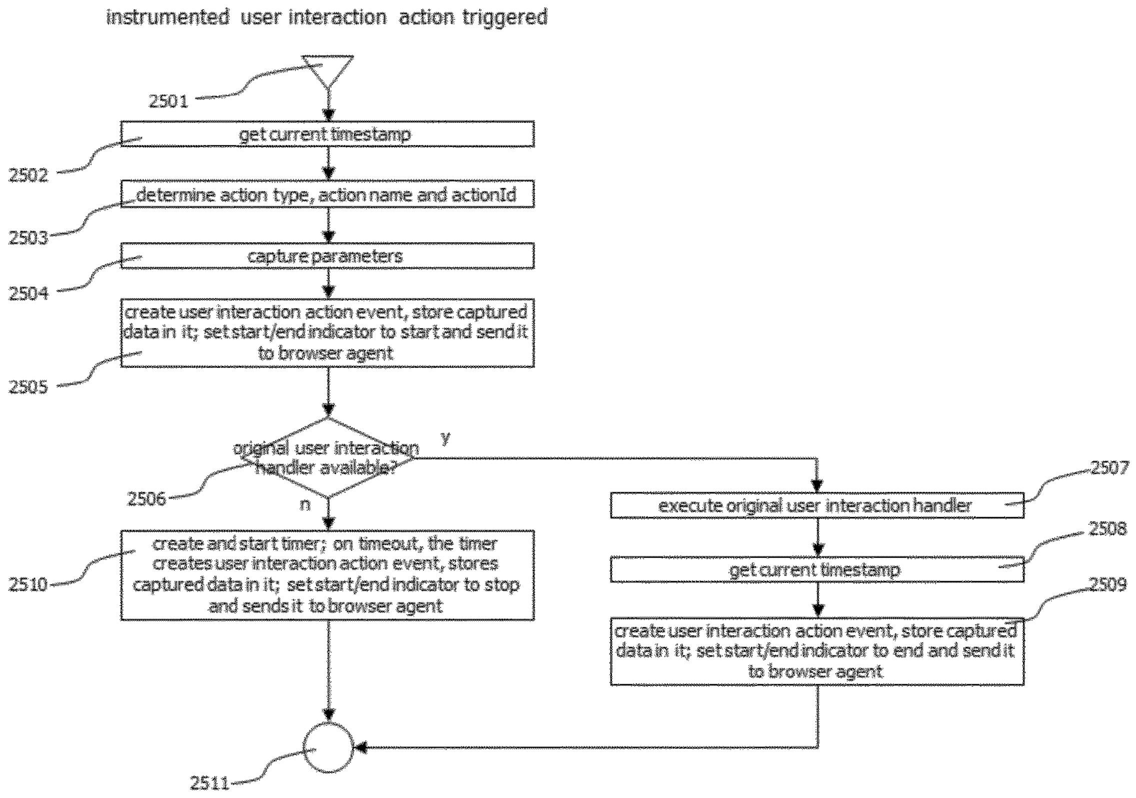

FIG 26: Event Handling Duration Measuring Sensor Execution
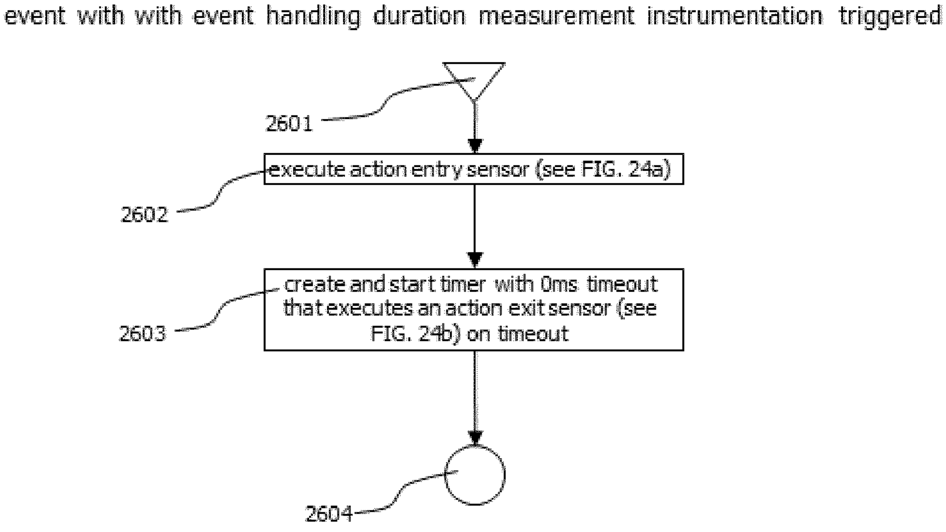

FIG. 27: User Interaction Action Event Processing by Action Data Manager
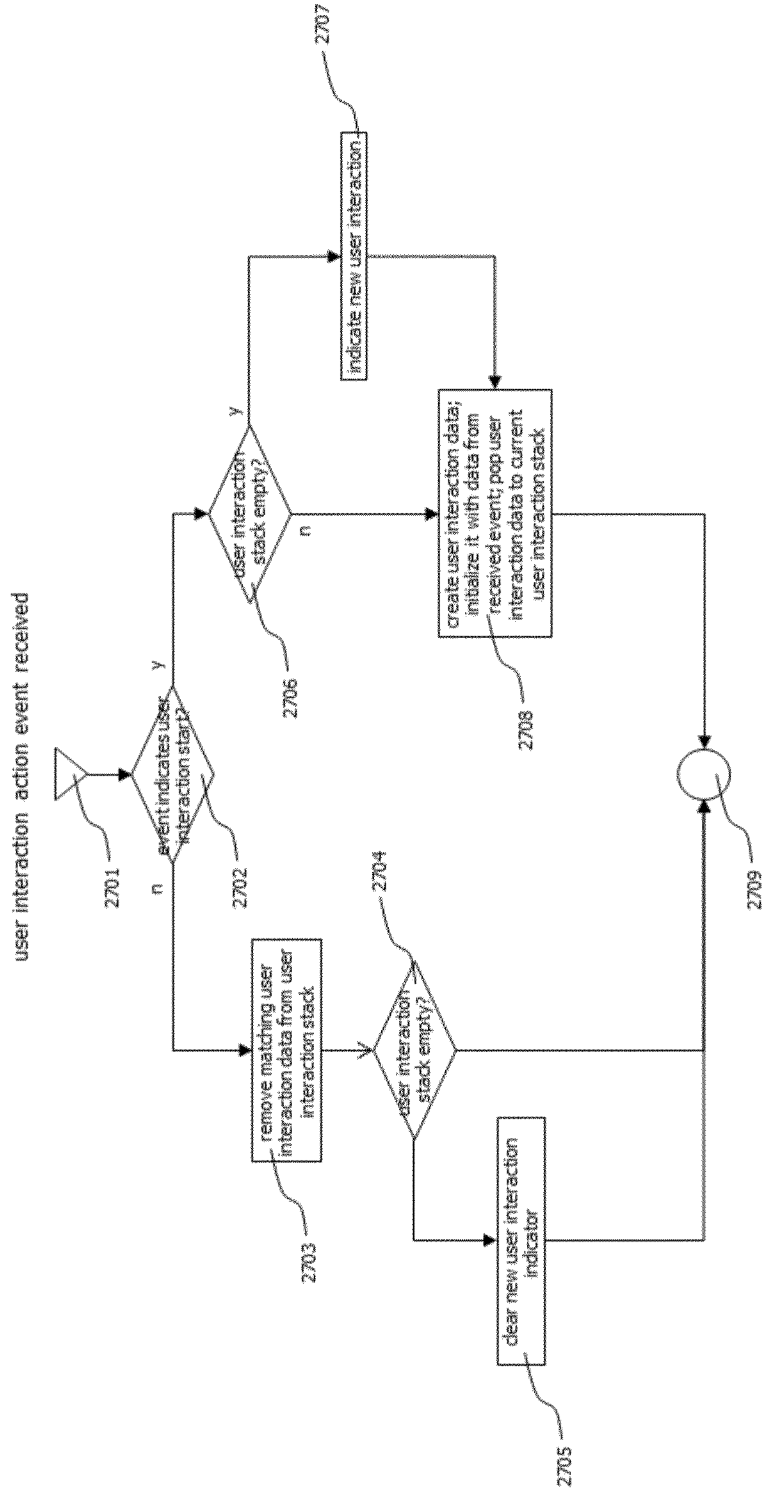

FIG. 28: Recording of User Triggered Actions

Figures 28A, 28B, 28C:
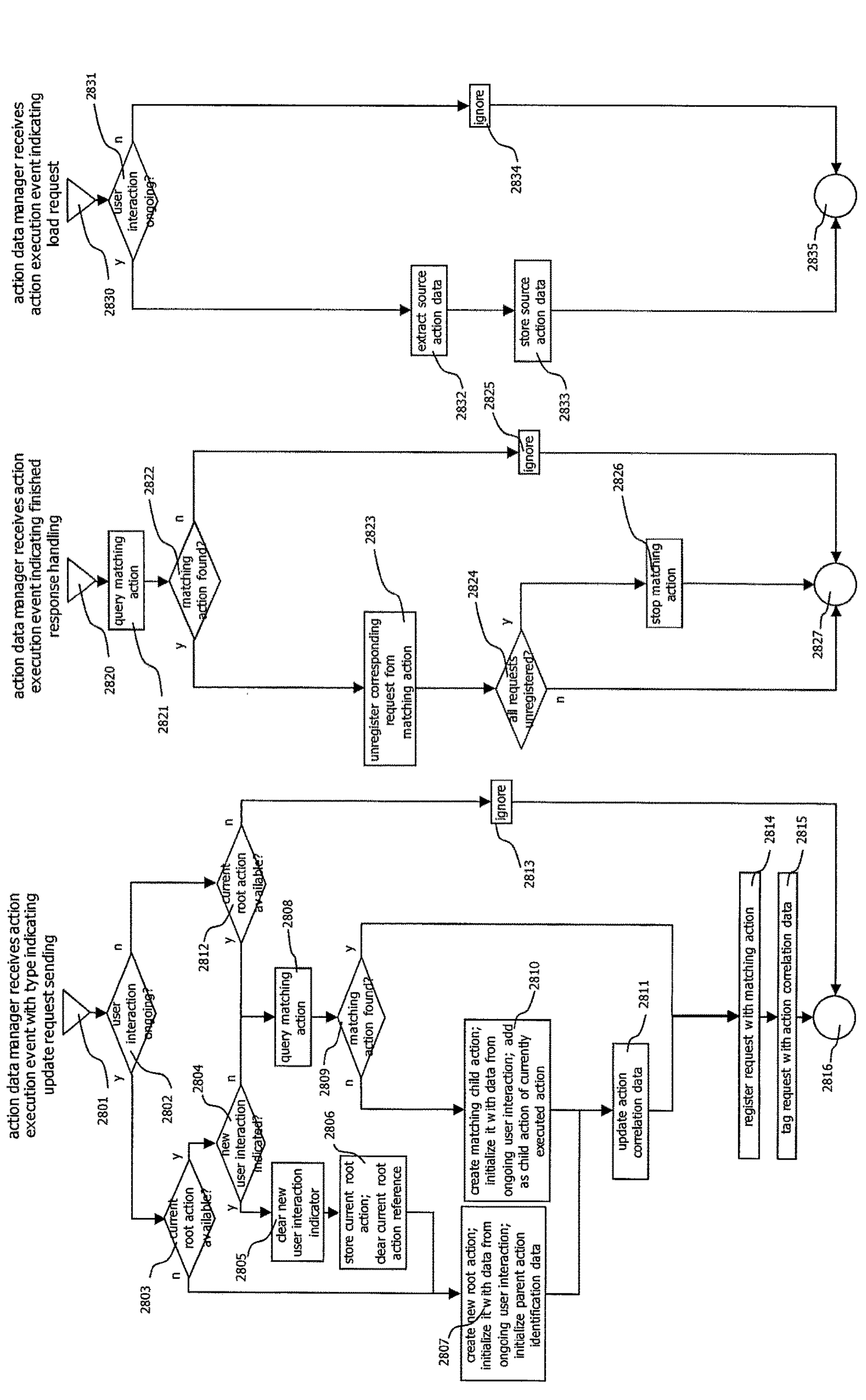

FIG 28a: Content Update Request Sending Detected

FIG 28b: Content Update Response Handling Detected

FIG 28c: Content Load Request Sending Detected

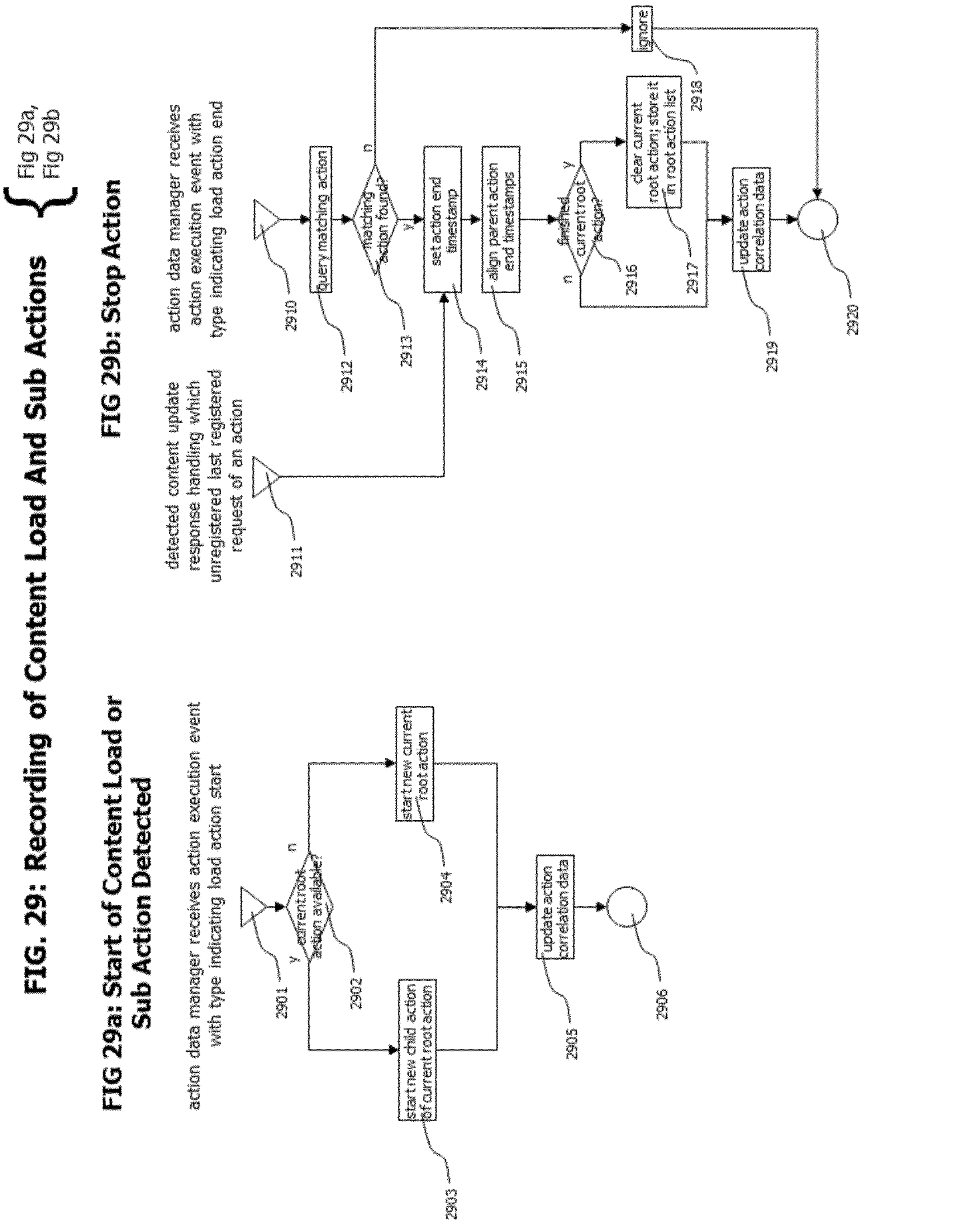
FIG. 29: Recording of Content Load And Sub Actions
FIG 29a: Start of Content Load or Sub Action Detected
FIG 29b: Stop Action FIG 30: Action Performance Data { Fig 30a, Fig 30b, Fig 30c
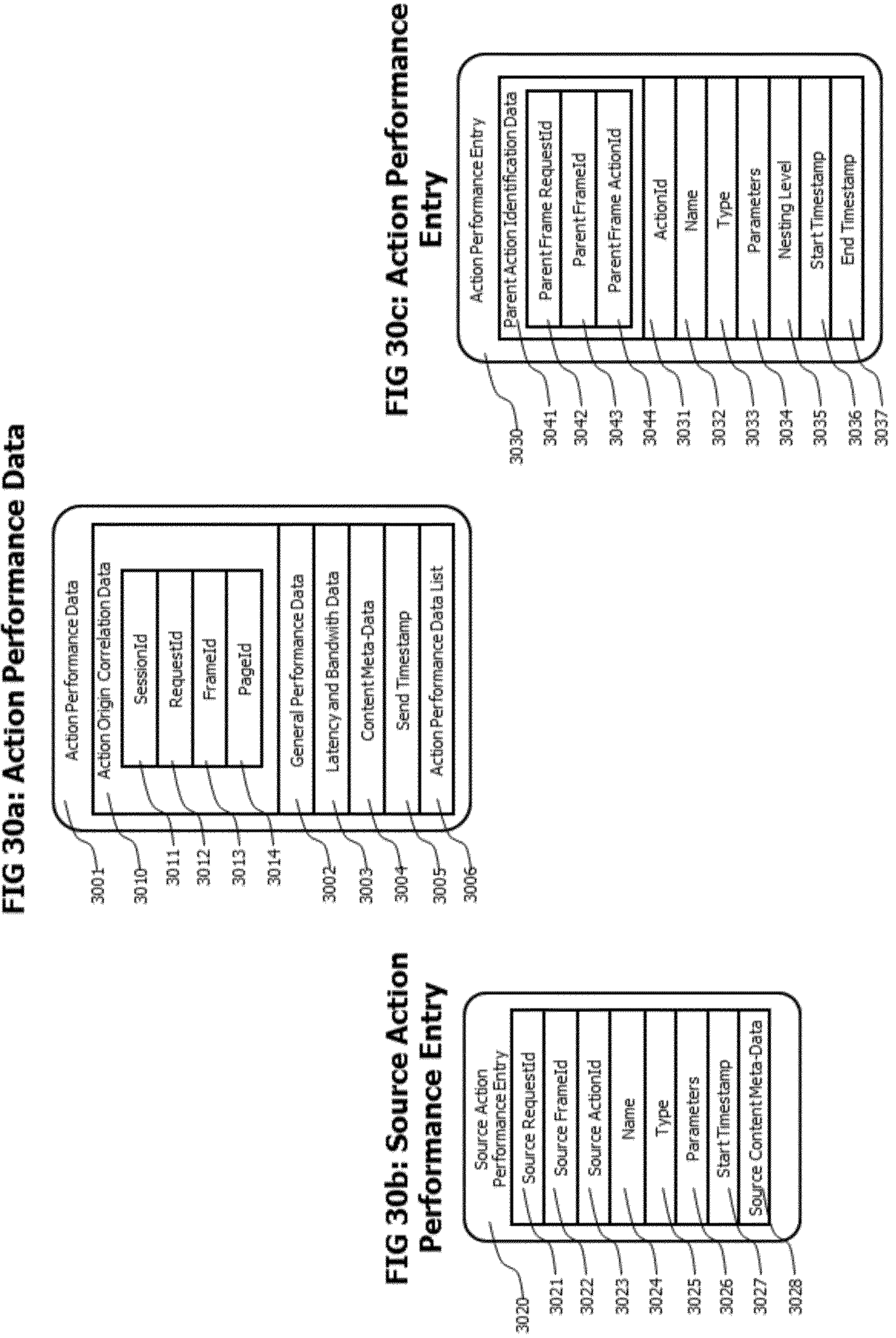
FIG 30a: Action Performance Data
FIG 30b: Source Action Performance Entry
FIG 30c: Action Performance Entry

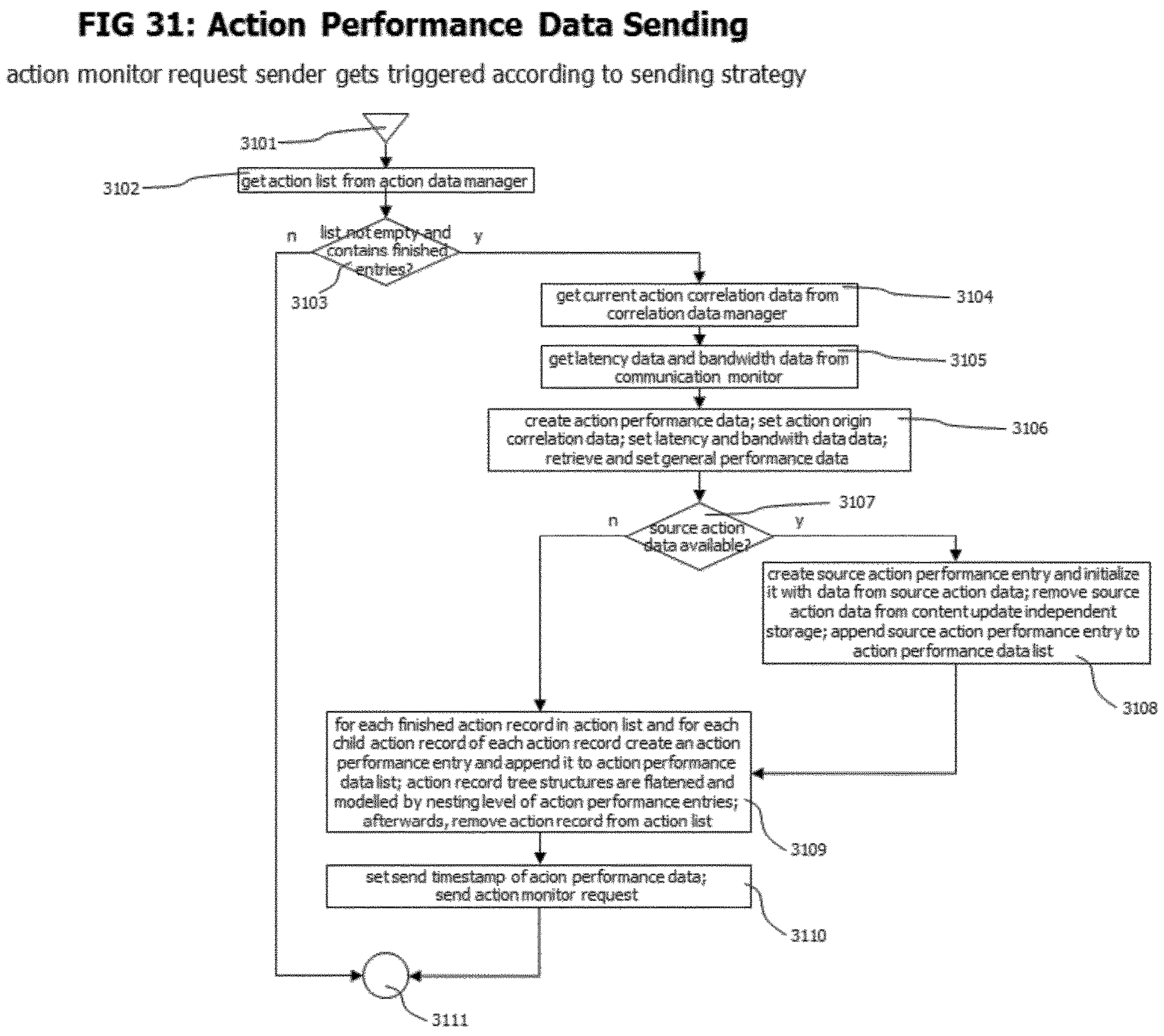
FIG 31: Action Performance Data Sending
action monitor request sender gets triggered according to sending strategy
3101
3102
get action list from action data manager
list not empty and contains finished entries?
n
y
3103
get current action correlation data from correlation data manager
3104
get latency data and bandwidth data from communication monitor
3105
create action performance data; set action origin correlation data; set latency and bandwith data data; retrieve and set general performance data
3106
3107
source action data available?
n
y
create source action performance entry and initialize it with data from source action data; remove source action data from content update independent storage; append source action performance entry to action performance data list
3108
for each finished action record in action list and for each child action record of each action record create an action performance entry and append it to action performance data list; action record tree structures are flatened and modelled by nesting level of action performance entries; afterwards, remove action record from action list
3109
set send timestamp of acion performance data; send action monitor request
3110
3111

FIG 32: Exemplary Action Sending Strategies
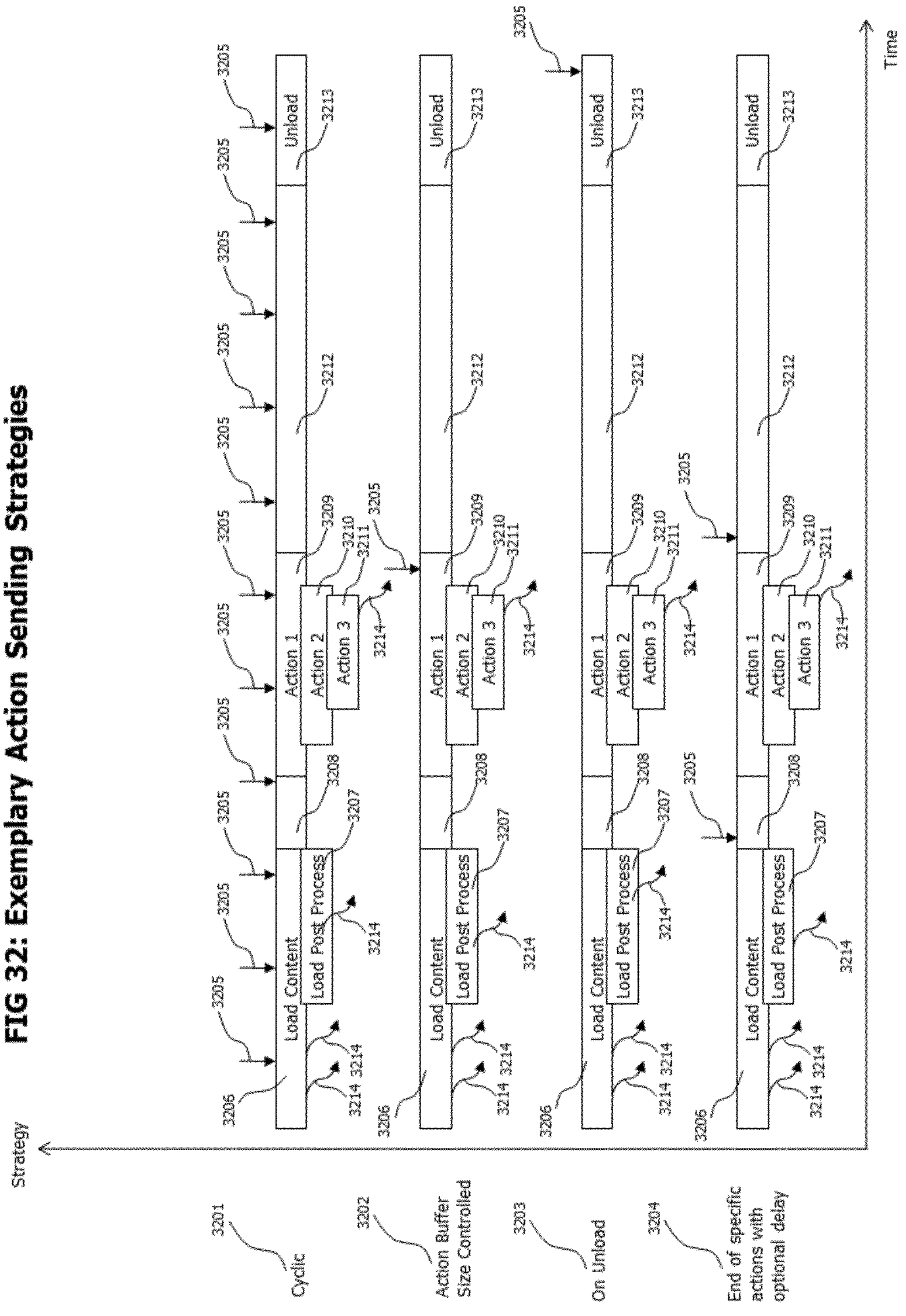

FIG 33: Bandwidth and Lantency Calculation Overview
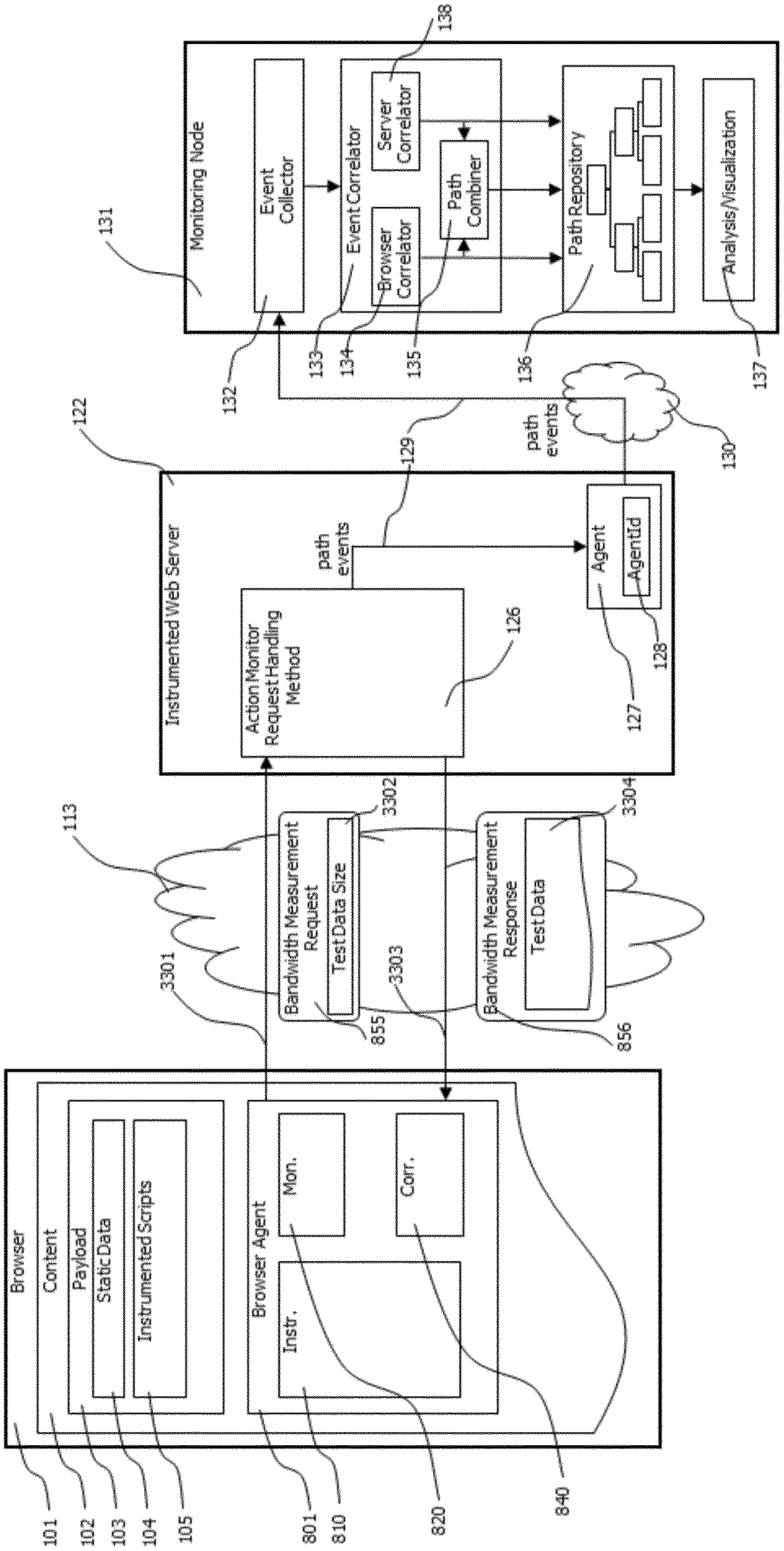

FIG 34: Bandwidth and Lantency Calculation on Browser Agent
on finished content load and cyclic with bandwidth check interval
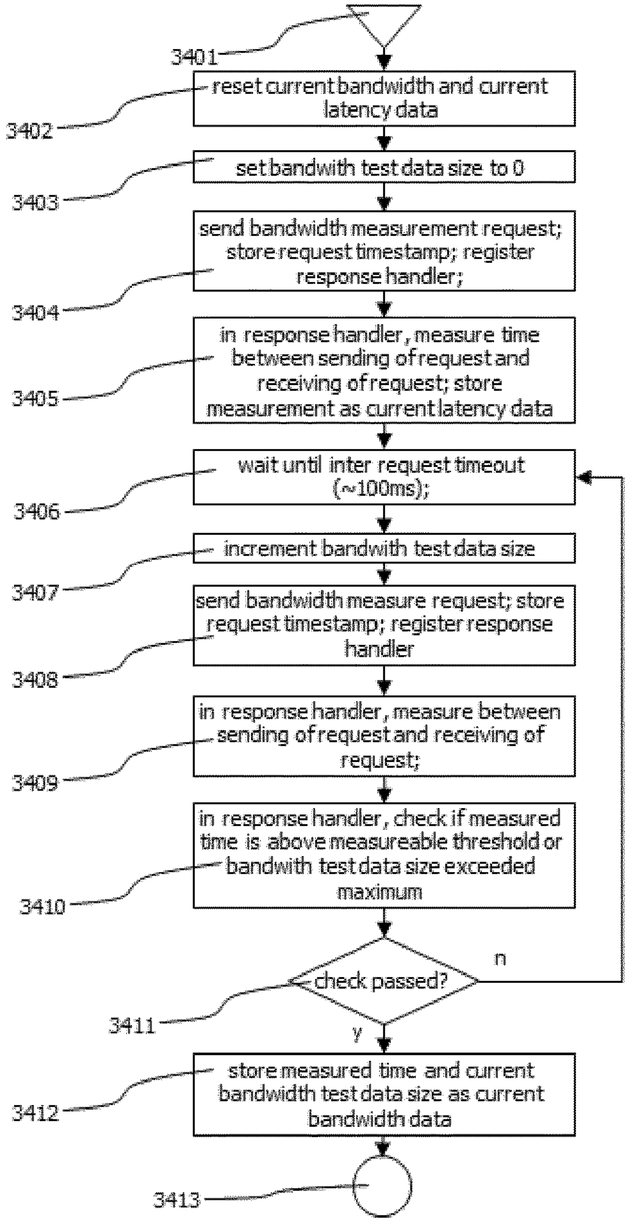

FIG 35: Bandwidth and Lantency Calculation by Action Monitor Request Handling Method
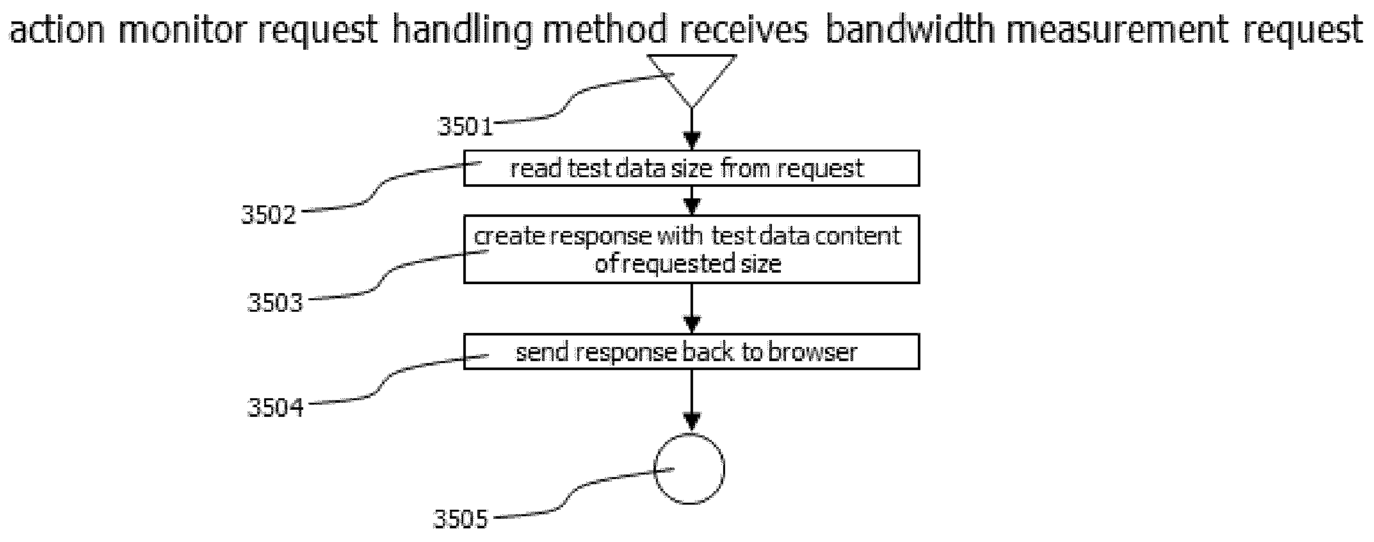

FIG 36: Enter Request Handling Method
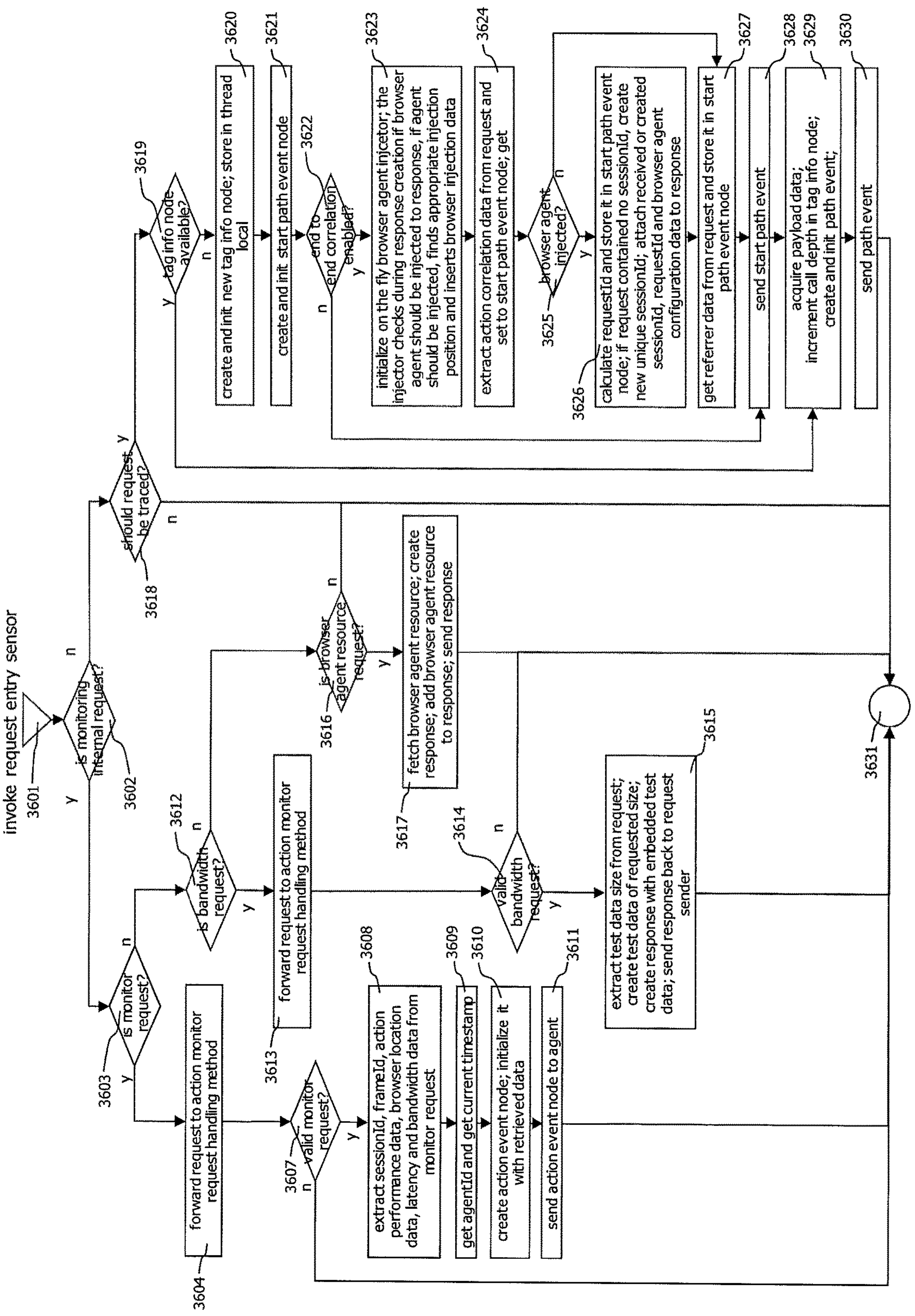

FIG 37: Inter Thread Correlation Data: Parent Info Node
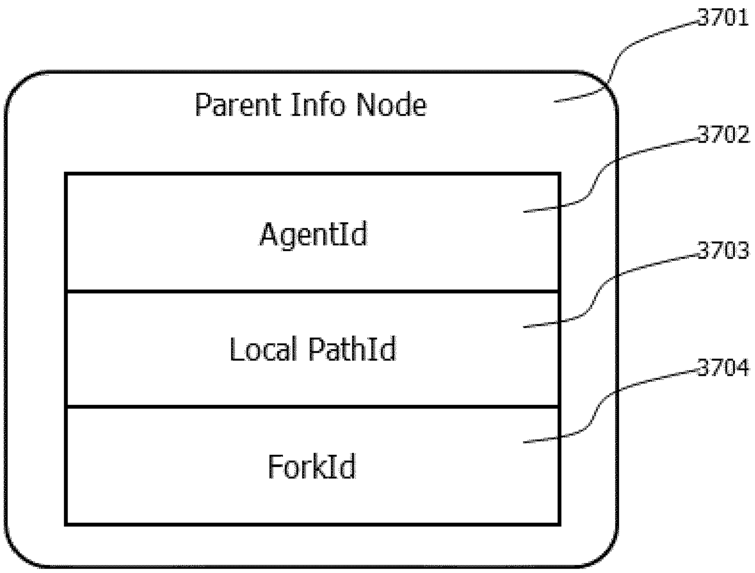

FIG 38: Tag Info Node
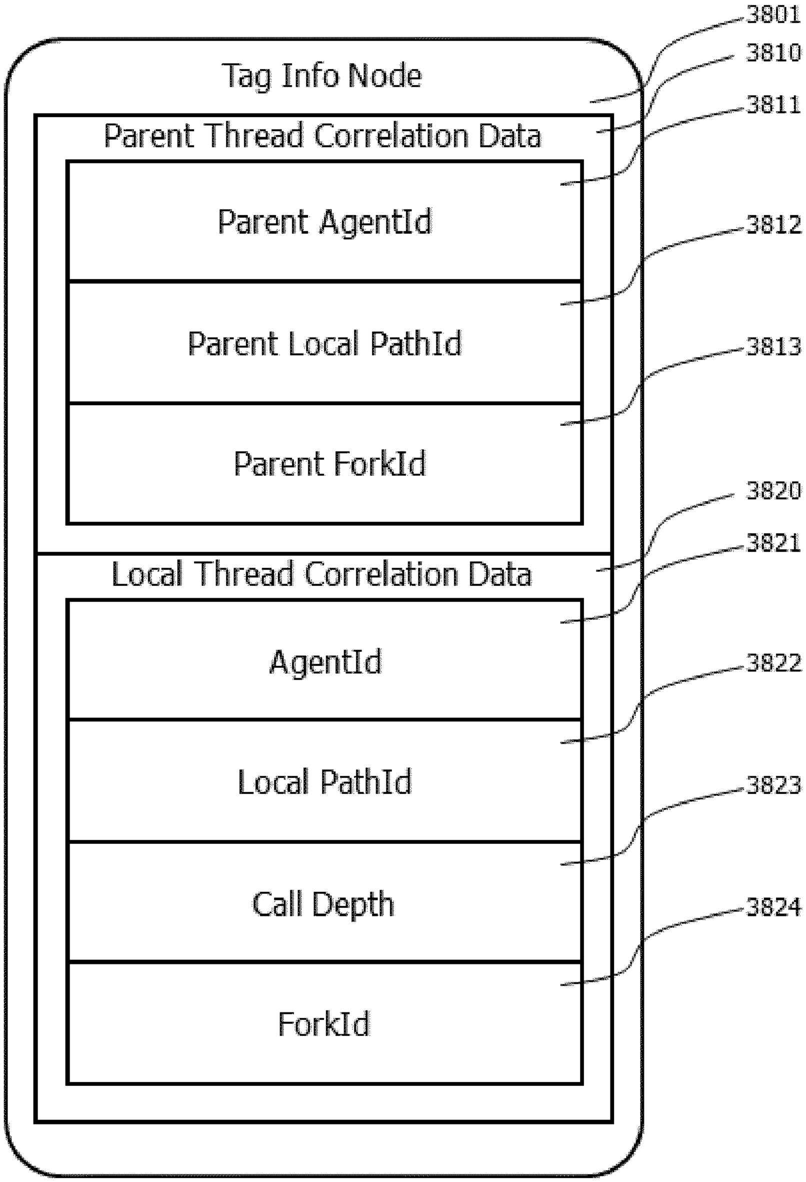

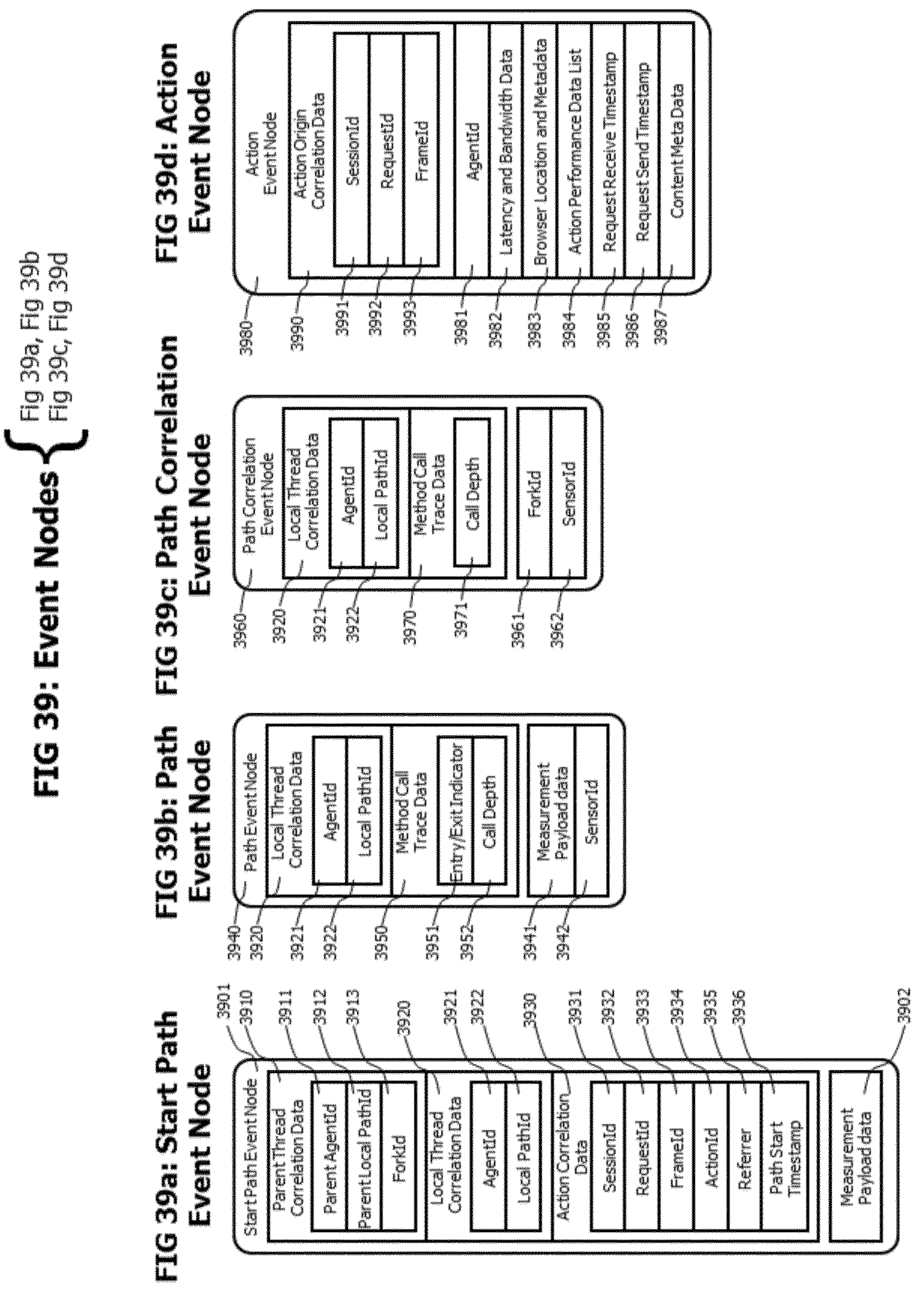
FIG 39: Event Nodes
Fig 39a, Fig 39b
Fig 39c, Fig 39d
FIG 39a: Start Path Event Node
Start Path Event Node
Parent Thread Correlation Data
Parent AgentId
Parent Local PathId
ForkId
Local Thread Correlation Data
AgentId
Local PathId
Action Correlation Data
SessionId
RequestId
FrameId
ActionId
Referrer
Path Start Timestamp
Measurement Payload data
3901
3910
3911
3912
3913
3920
3921
3922
3930
3931
3932
3933
3934
3935
3936
3902
FIG 39b: Path Event Node
Path Event Node
Local Thread Correlation Data
AgentId
Local PathId
Method Call Trace Data
Entry/Exit Indicator
Call Depth
Measurement Payload data
SensorId
3940
3920
3921
3922
3950
3951
3952
3941
3942
FIG 39c: Path Correlation Event Node
Path Correlation Event Node
Local Thread Correlation Data
AgentId
Local PathId
Method Call Trace Data
Call Depth
ForkId
SensorId
3960
3920
3921
3922
3970
3971
3961
3962
FIG 39d: Action Event Node
Action Event Node
Action Origin Correlation Data
SessionId
RequestId
FrameId
AgentId
Latency and Bandwidth Data
Browser Location and Metadata
Action Performance Data List
Request Receive Timestamp
Request Send Timestamp
Content Meta Data
3980
3990
3991
3992
3993
3981
3982
3983
3984
3985
3986
3987

FIG 40: Transfer of Correlation Information within Remote Method Calls { Fig 40a, Fig 40b
FIG 40a: Remote Message Caller
FIG 40b: Remote Message Callee
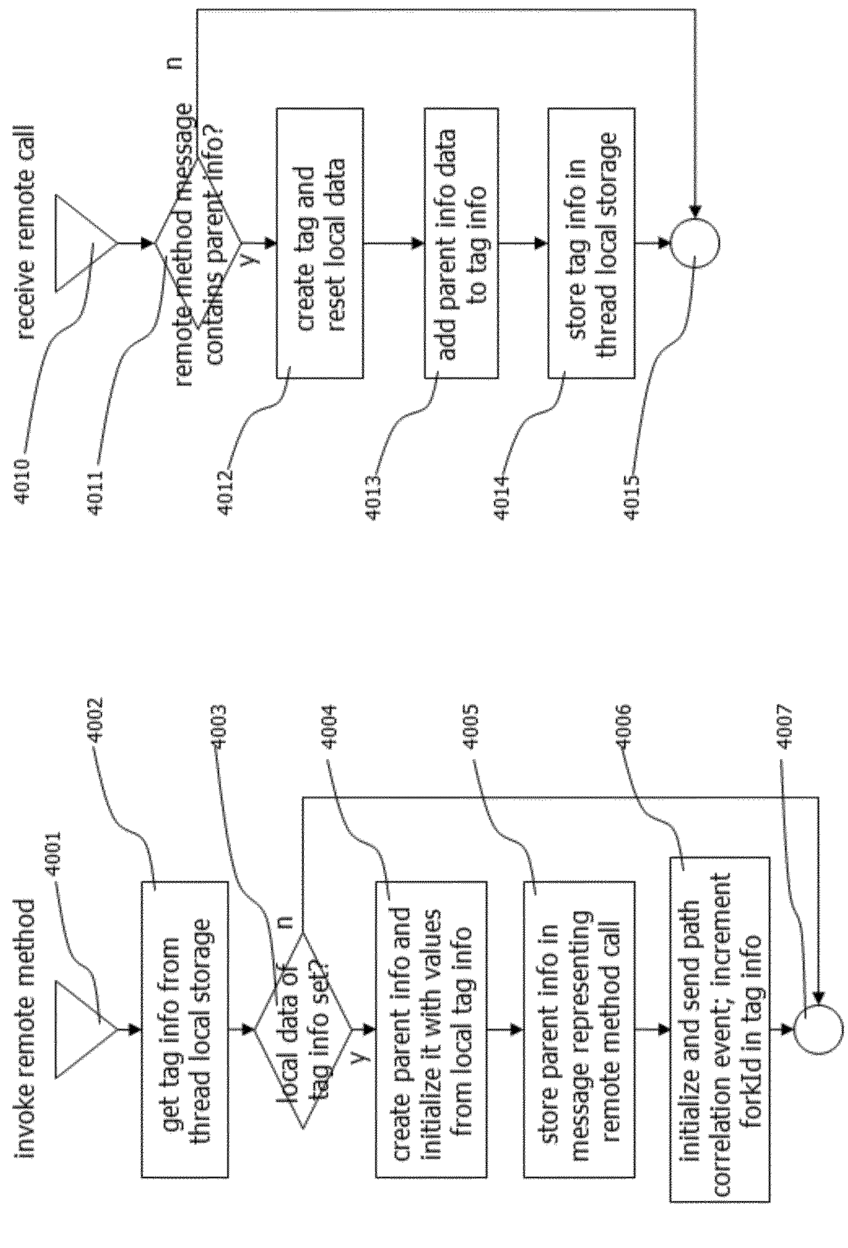

FIG 41: Enter Instrumented Method
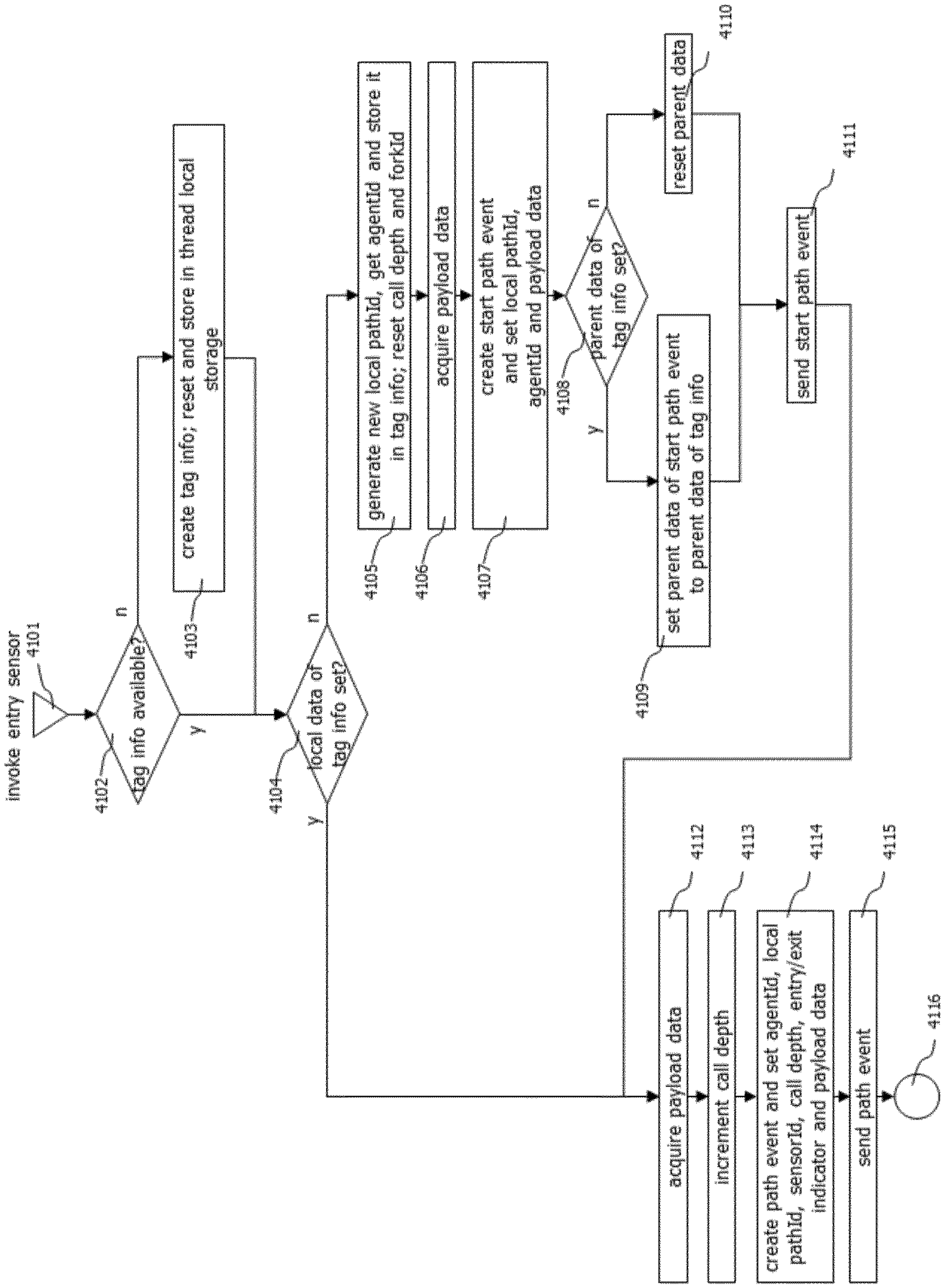

FIG 42: Exit Instrumented Method
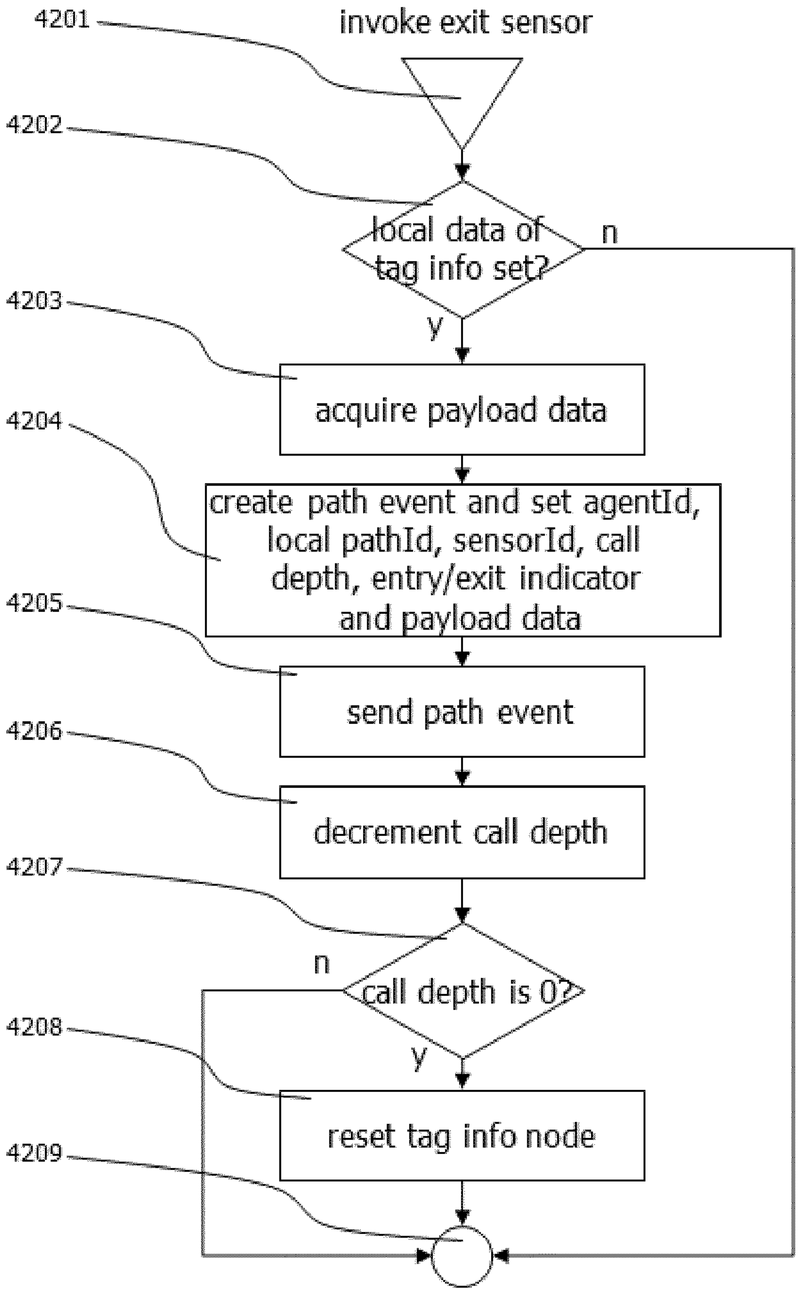

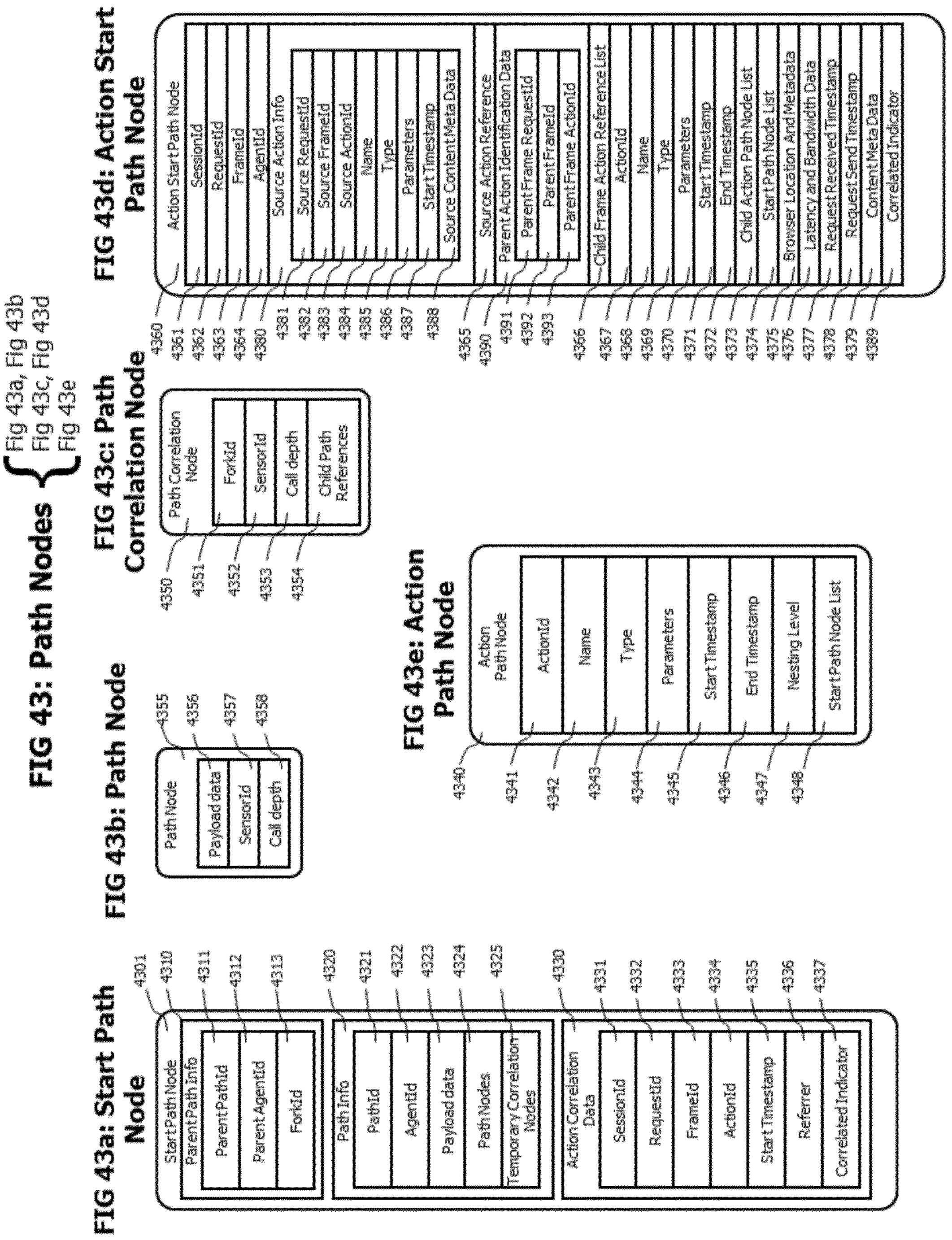
FIG 43: Path Nodes
Fig 43a, Fig 43b
Fig 43c, Fig 43d
Fig 43e
FIG 43a: Start Path Node
Start Path Node
Parent Path Info
Parent PathId
Parent AgentId
ForkId
Path Info
PathId
AgentId
Payload data
Path Nodes
Temporary Correlation Nodes
Action Correlation Data
SessionId
RequestId
FrameId
ActionId
Start Timestamp
Referrer
Correlated Indicator
4301
4310
4311
4312
4313
4320
4321
4322
4323
4324
4325
4330
4331
4332
4333
4334
4335
4336
4337
FIG 43b: Path Node
Path Node
Payload data
SensorId
Call depth
4355
4356
4357
4358
FIG 43c: Path Correlation Node
Path Correlation Node
ForkId
SensorId
Call depth
Child Path References
4350
4351
4352
4353
4354
FIG 43d: Action Start Path Node
Action Start Path Node
SessionId
RequestId
FrameId
AgentId
Source Action Info
Source RequestId
Source FrameId
Source ActionId
Name
Type
Parameters
Start Timestamp
Source Content Meta Data
Source Action Reference
Parent Action Identification Data
Parent Frame RequestId
Parent FrameId
Parent Frame ActionId
Child Frame Action Reference List
ActionId
Name
Type
Parameters
Start Timestamp
End Timestamp
Child Action Path Node List
Start Path Node List
Browser Location And Metadata
Latency and Bandwidth Data
Request Received Timestamp
Request Send Timestamp
Content Meta Data
Correlated Indicator
4360
4361
4362
4363
4364
4380
4381
4382
4383
4384
4385
4386
4387
4388
4365
4390
4391
4392
4393
4366
4367
4368
4369
4370
4371
4372
4373
4374
4375
4376
4377
4378
4379
4389
FIG 43e: Action Path Node
Action Path Node
ActionId
Name
Type
Parameters
Start Timestamp
End Timestamp
Nesting Level
Start Path Node List
4340
4341
4342
4343
4344
4345
4346
4347
4348

FIG 44: Correlation of Start Path Events
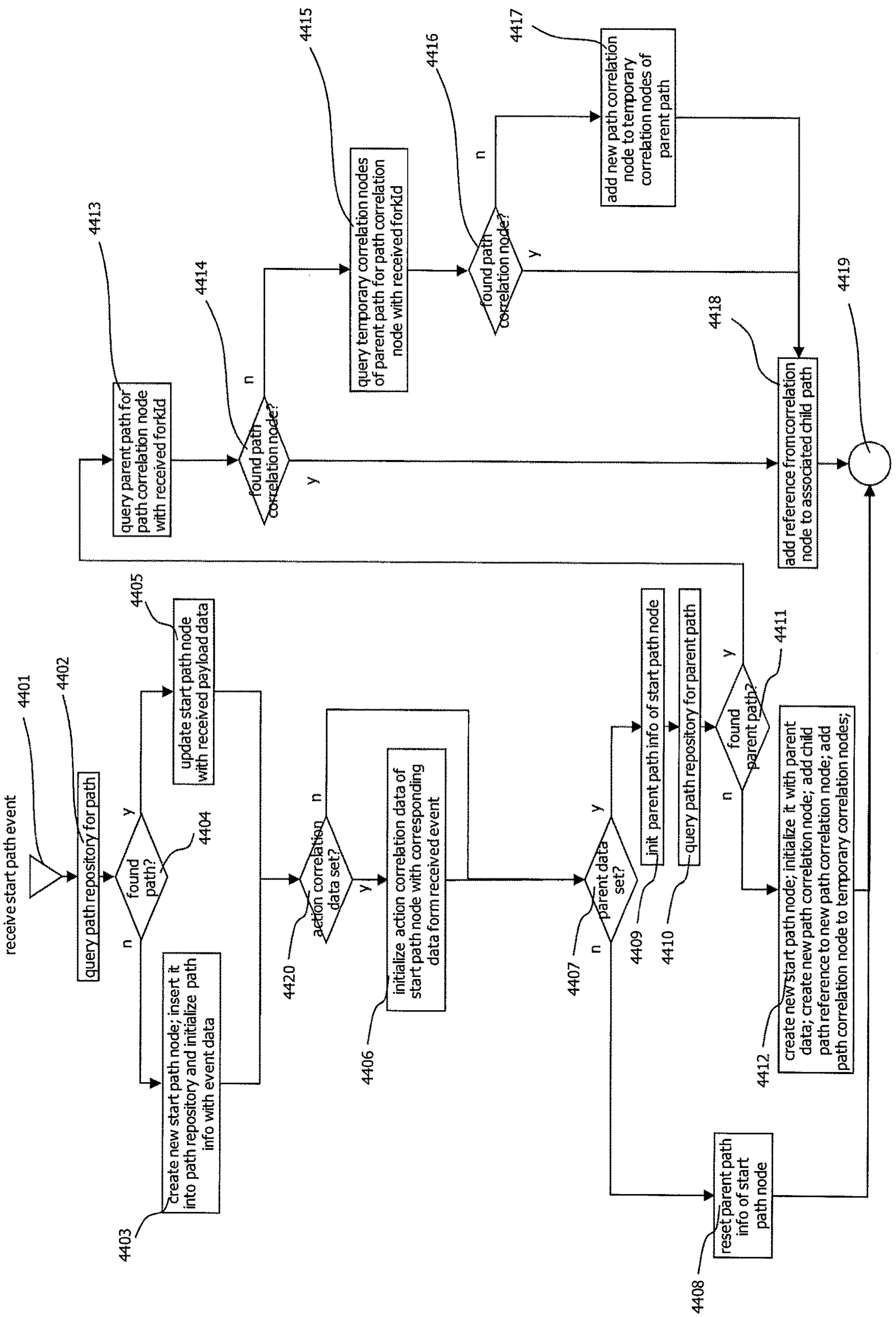

FIG 45: Correlation of Path Correlation Events
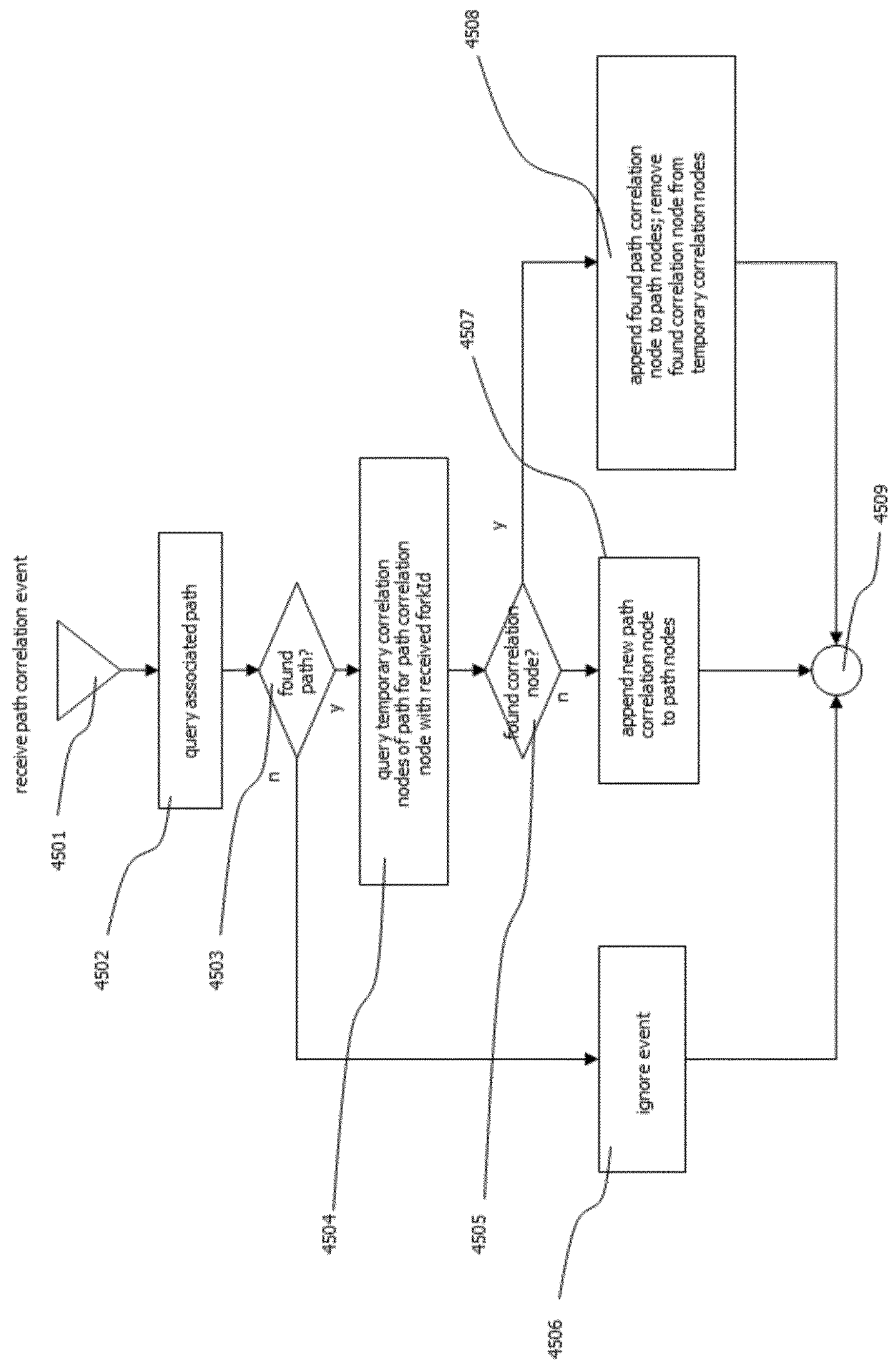

FIG 46: Correlation of Path Events
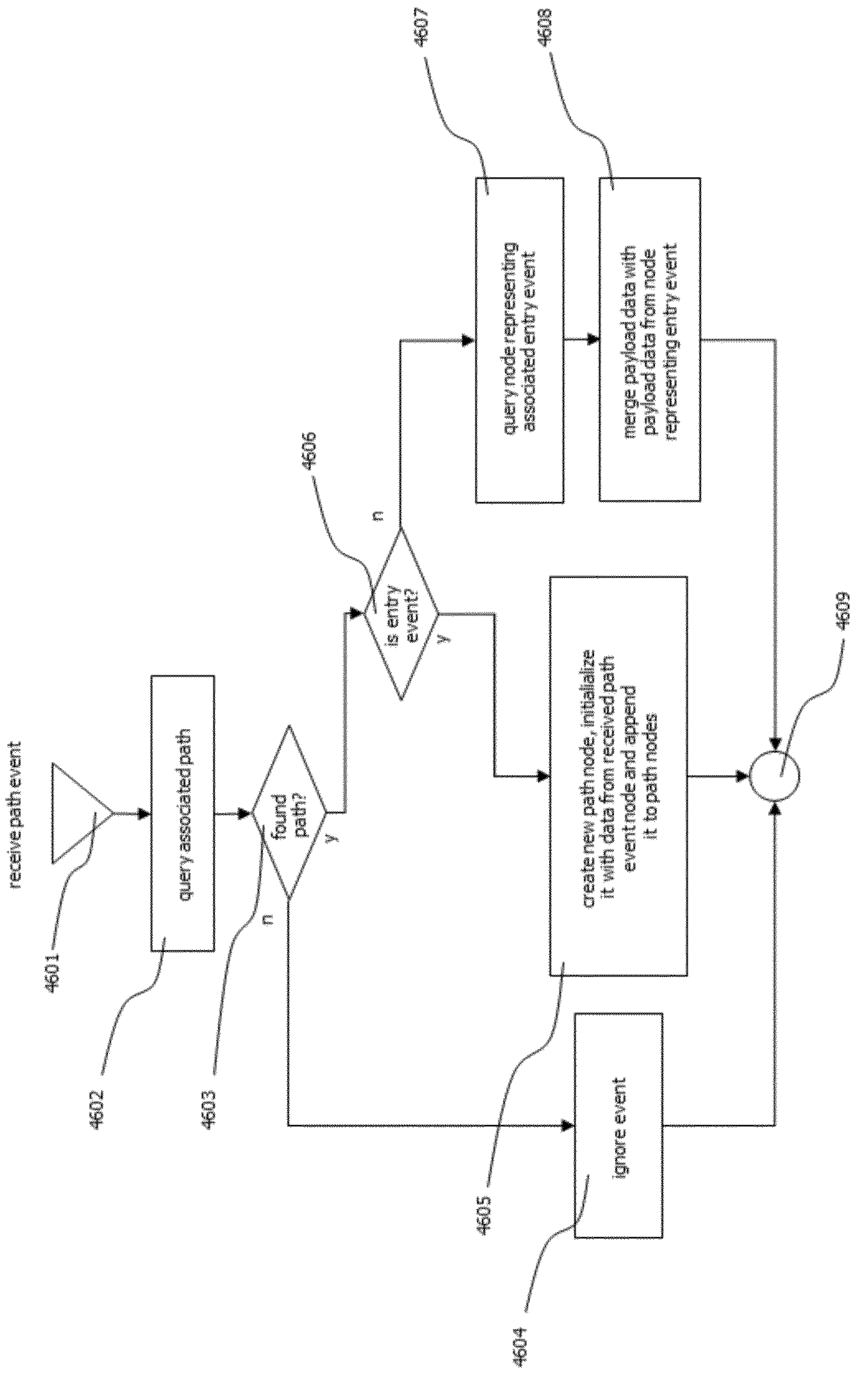

FIG 47: Correlation of Action Event Nodes By Browser Correlator
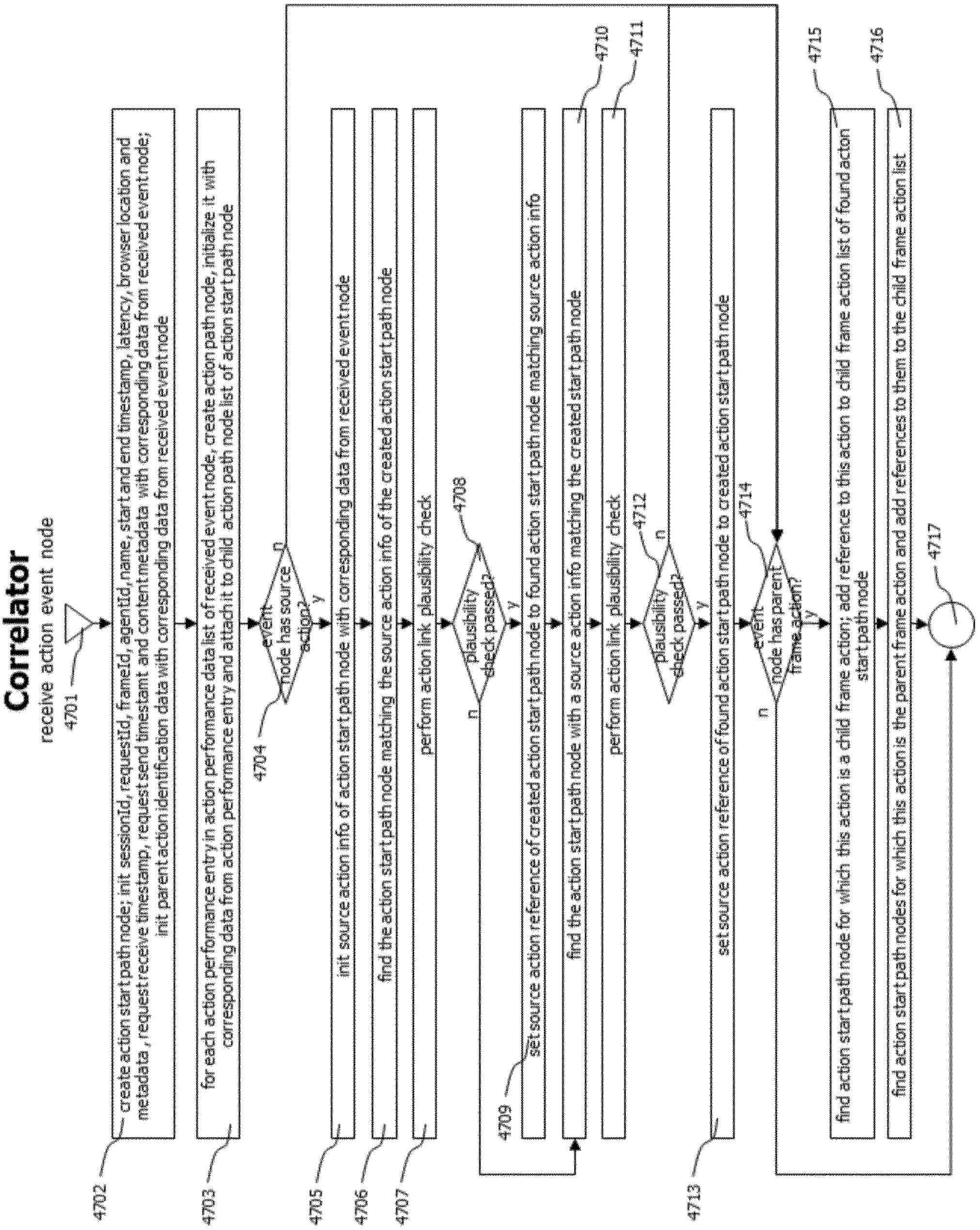

FIG 48: Action Link Plausibility Check { Fig 48a, Fig 48b, Fig 48c, Fig 48d
FIG. 48a Plausibility check for source action candiate and destination action candidate requested
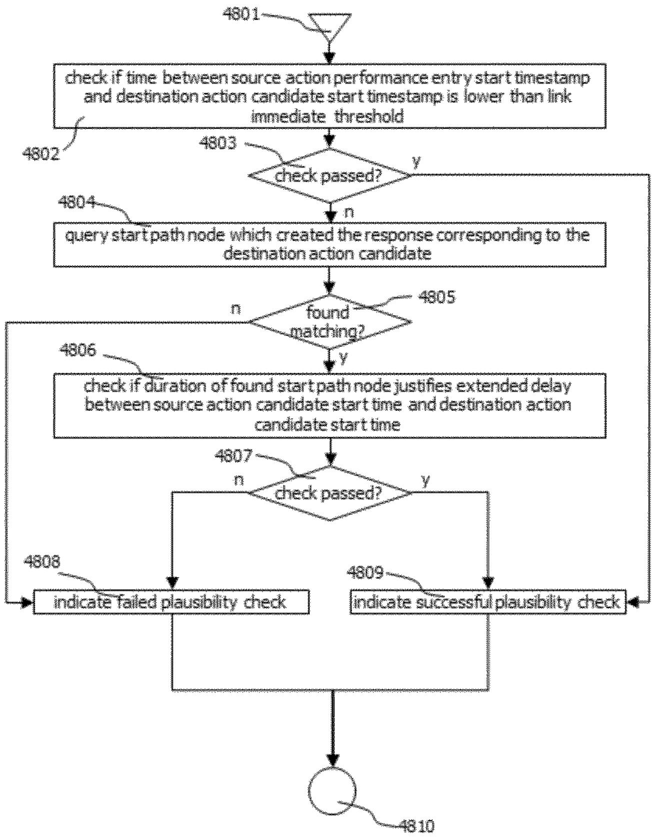
FIG. 48b Scenario destination content in browser cache
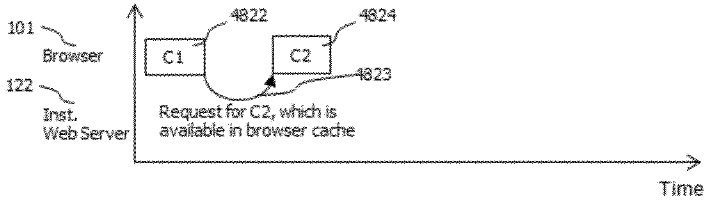
FIG. 48c Scenario destination content requested from server
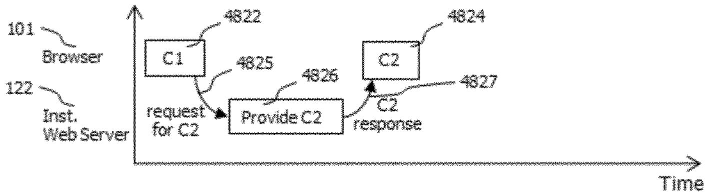
FIG. 48d Scenario unrelated destination
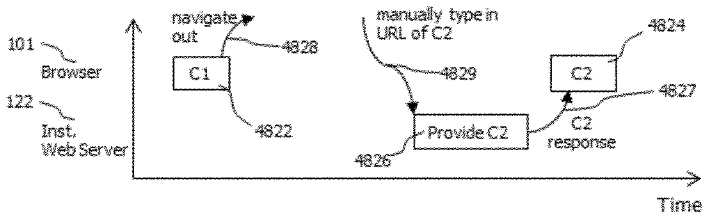

FIG. 49: Per SessionId Path Combination Area
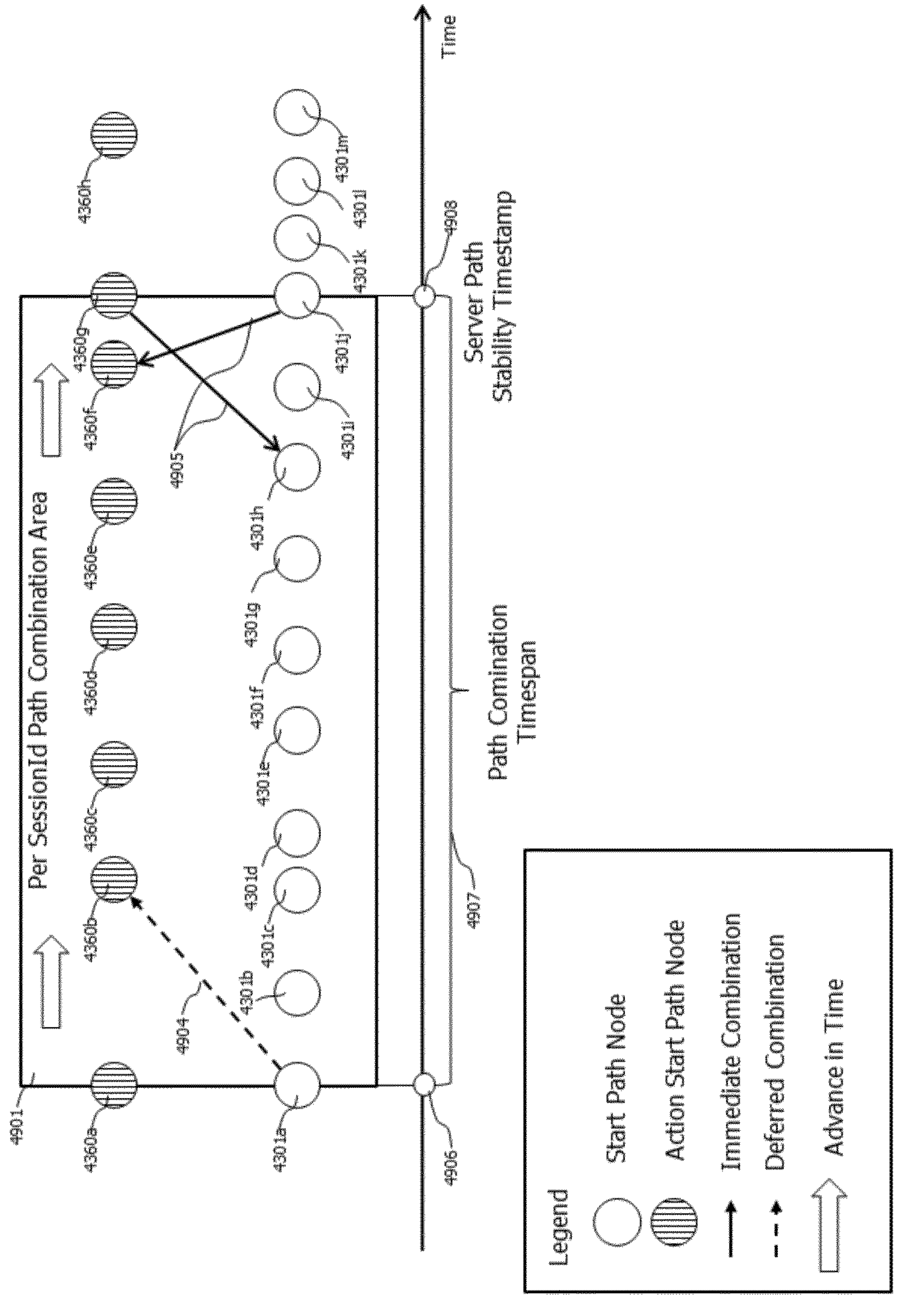

FIG 50: Path Combination Area Entry Correlation { Fig 50a, Fig 50b
FIG 50a: Start Path Node Processing
FIG 50b: Action Start Path Node Processing
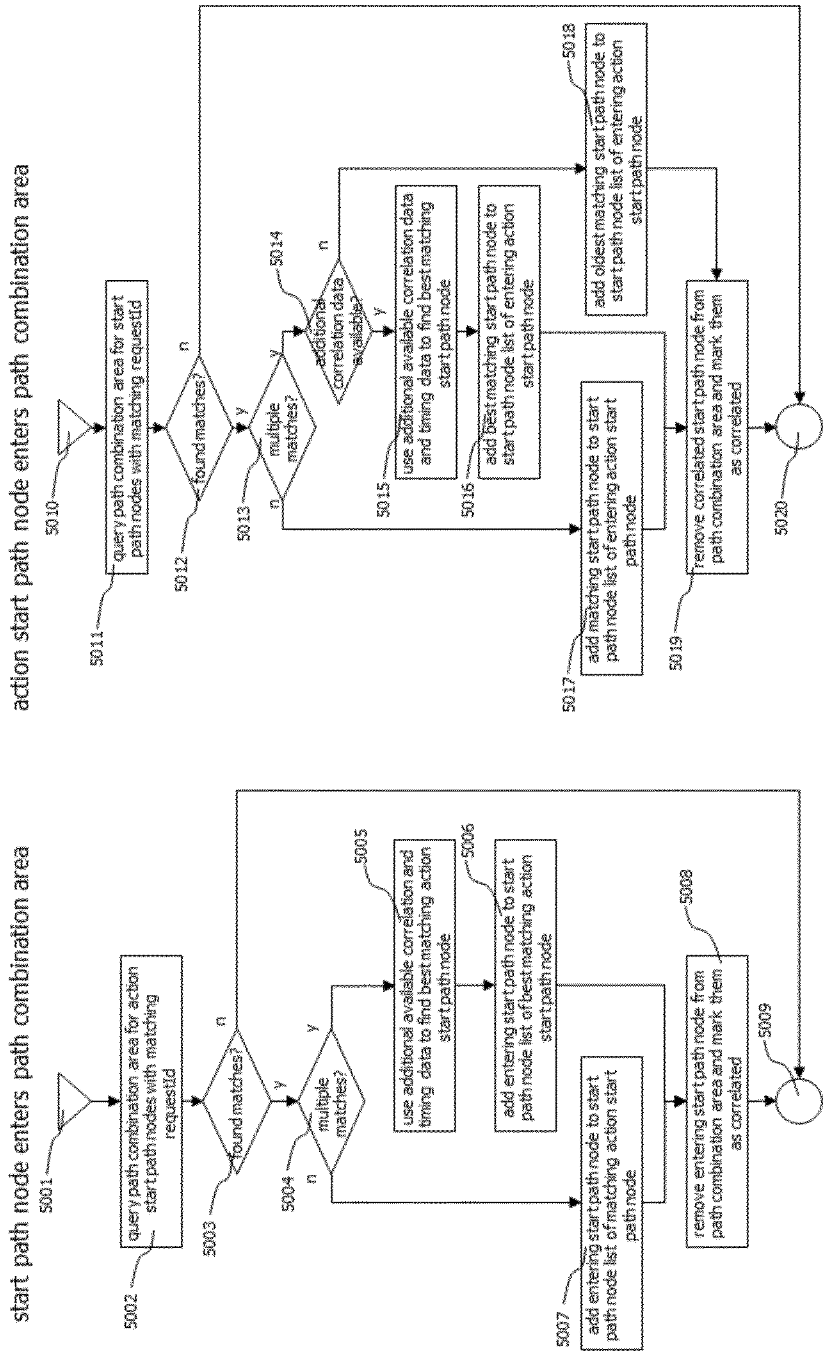

FIG 51: Path Combination Area Exit Correlation
Start Path Node Processing
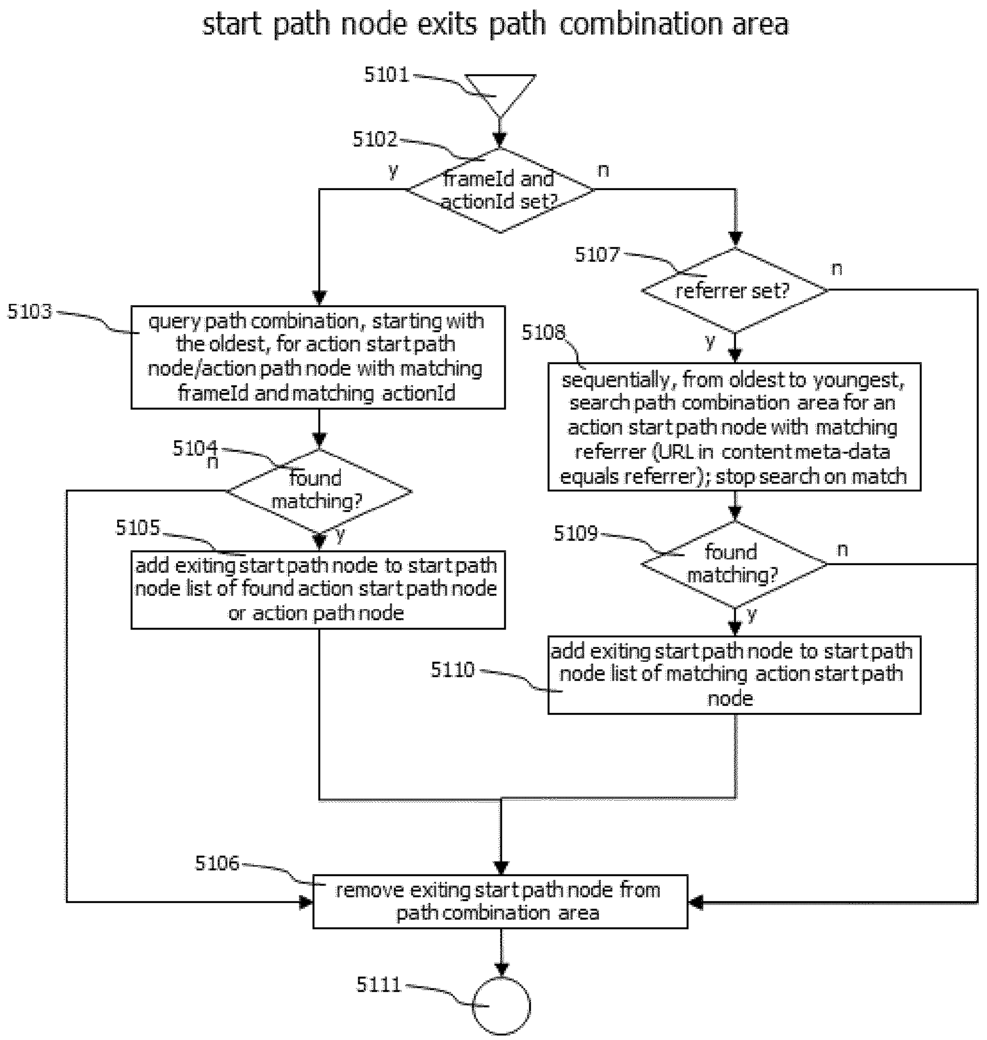

FIG 52: Additional Path Combination Handling for Long Running Actions

{ Fig 52a, Fig 52b

FIG 52a: Browser Agent detects potential exceeded maximal delay between action caused payload request and sending of corresponding action monitor request or sending of last preview request

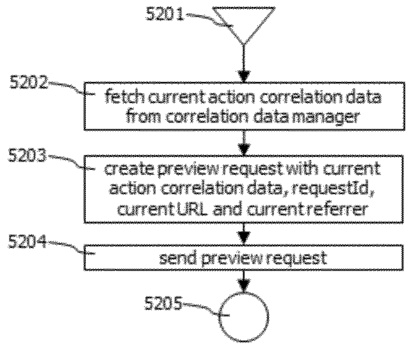

FIG 52b: Path Combiner path combiner receives action preview signal via action monitor request handling method, agent and event collector

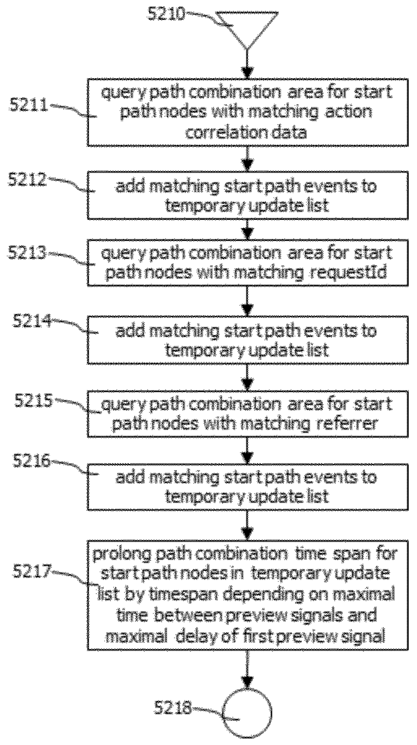

FIG 53: Visit Calculation Overview
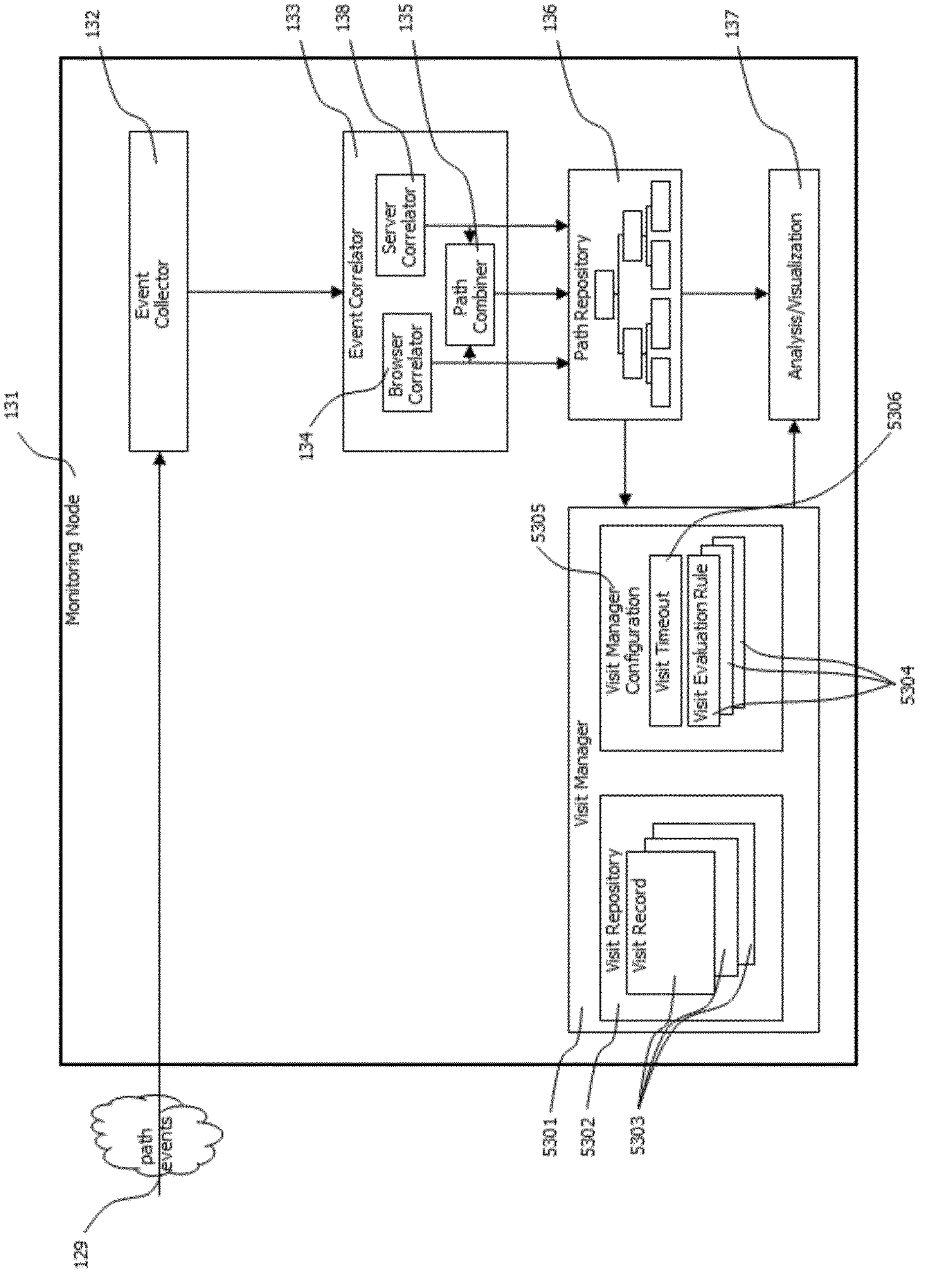

FIG 54: Visit Record
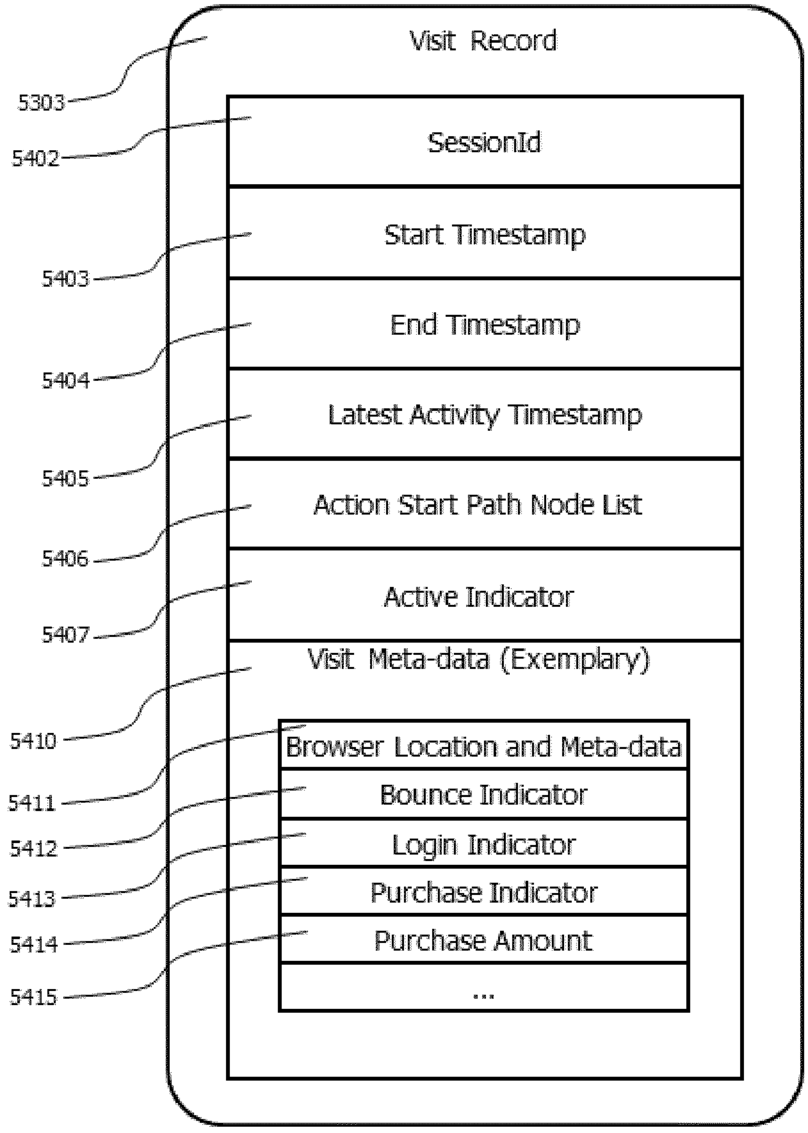

FIG 55: Visit Evaluation Rules { Fig 55a, Fig 55b, Fig 55c
FIG 55a: Visit Size Based Rule
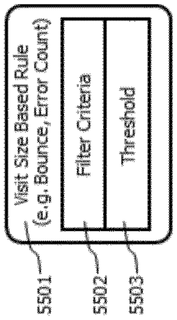
FIG 55b: Method Call Based Rule
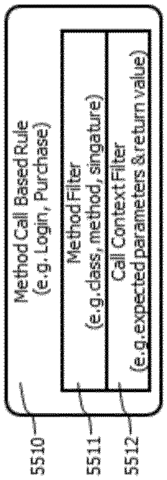
FIG 55c: Method Call Captured Value Based Rule
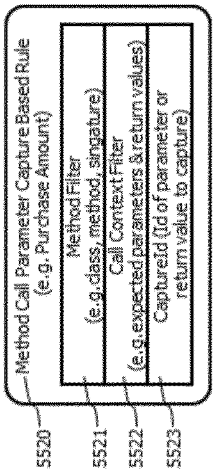

FIG 56: Processing of new finished Path by Visit Manager
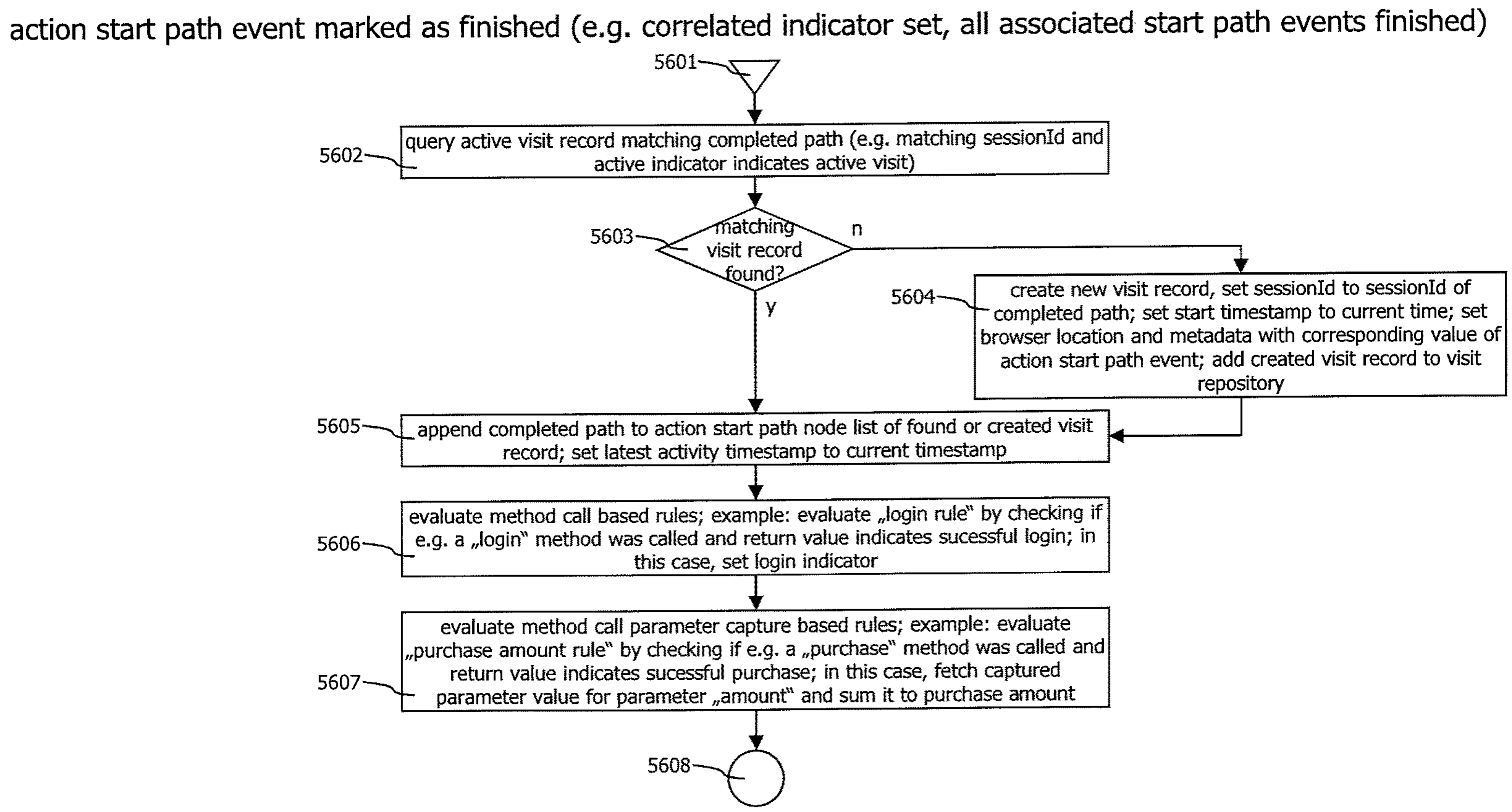

FIG 57: Cyclic Visit Cleanup by Visit Manager
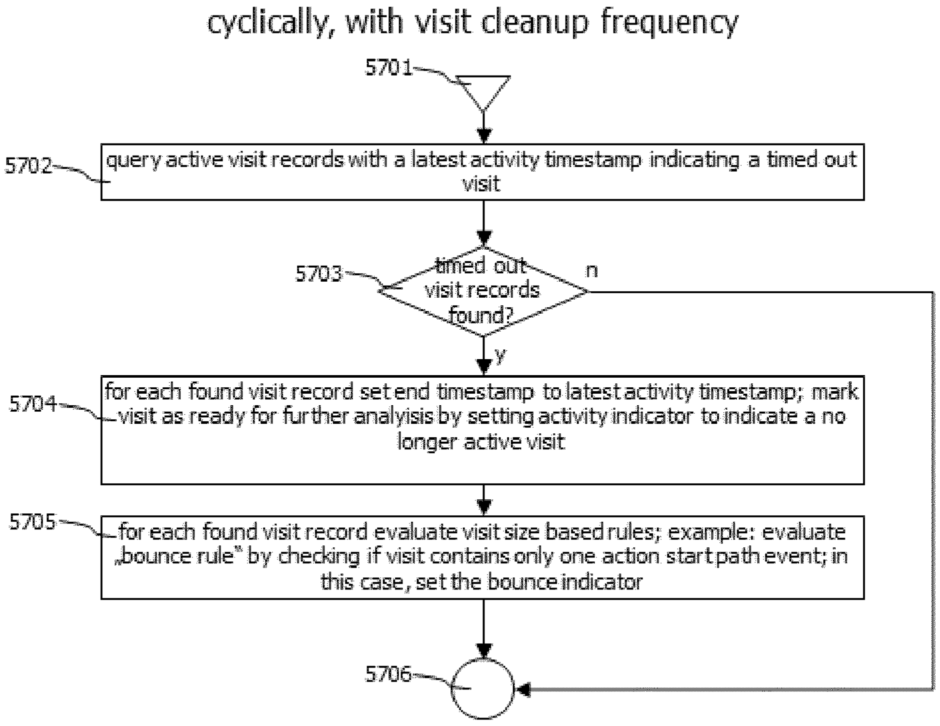

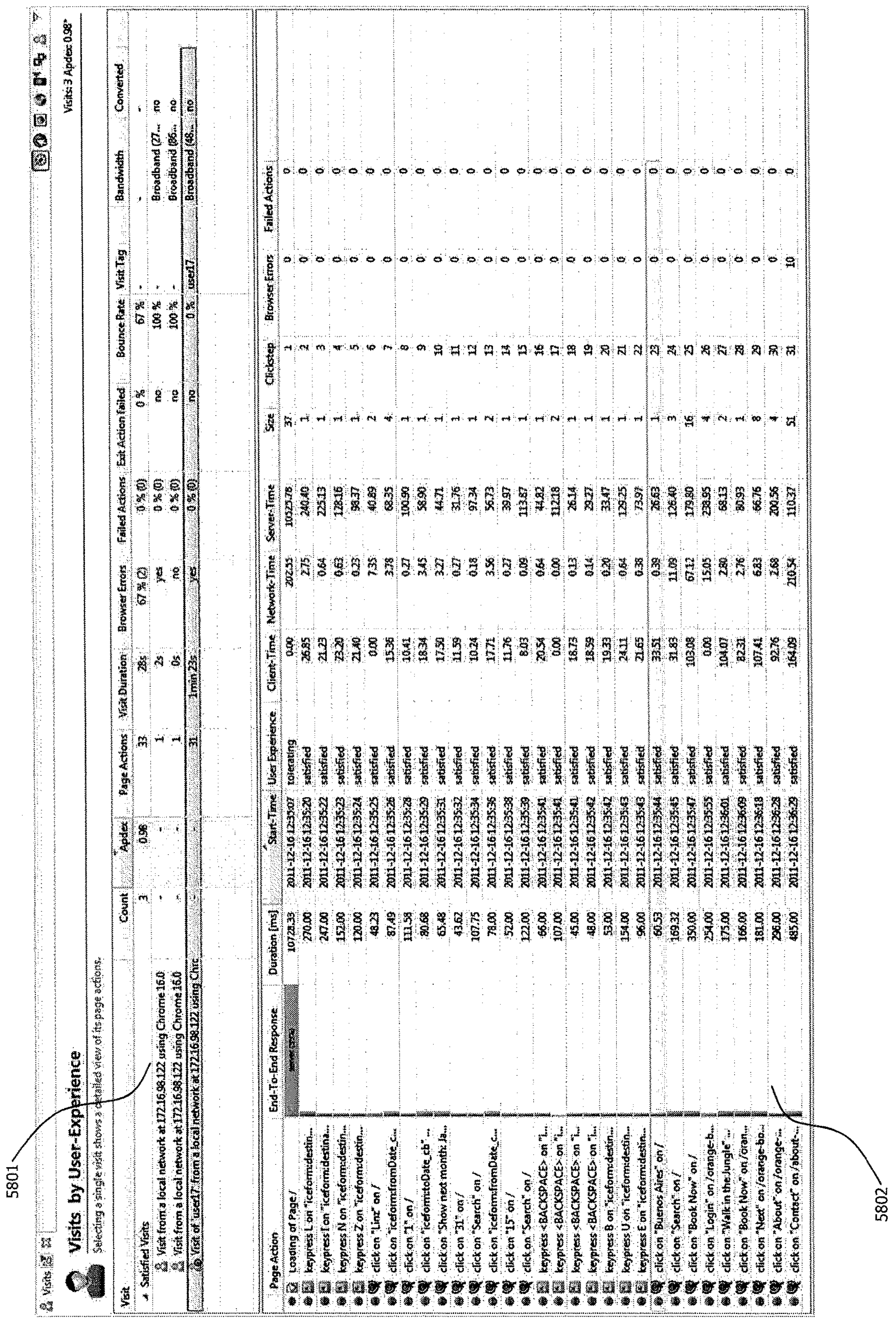
FIG 58: Exemplary Visit Visualization

FIG 59: Exemplary End-To-End Transaction Visualizations
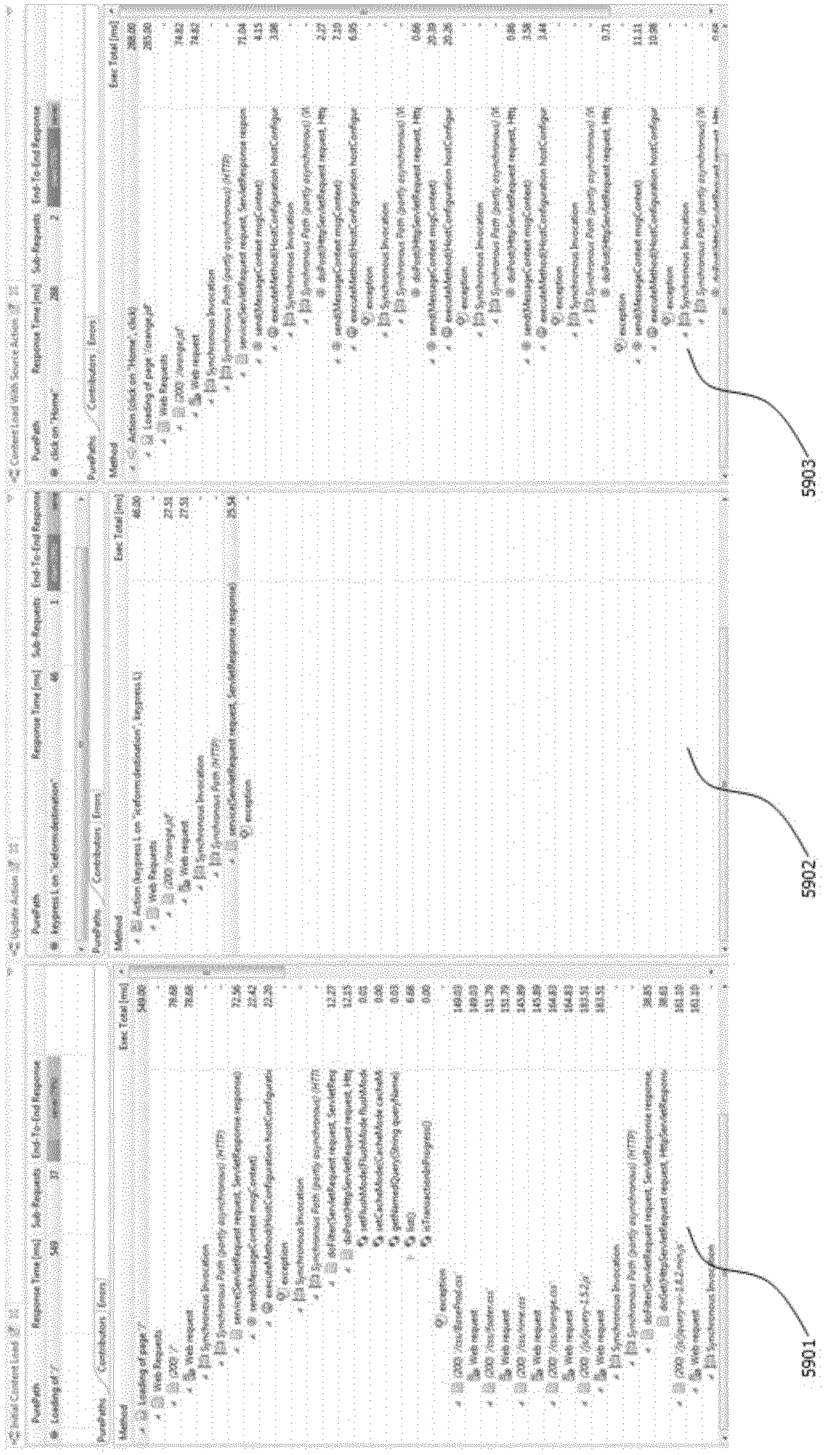

METHOD AND SYSTEM FOR TRACING END-TO-END TRANSACTION, INCLUDING BROWSER SIDE PROCESSING AND END USER PERFORMANCE EXPERIENCE

CROSS-REFERENCE TO RELATED APPLICATIONS

This application is a divisional of U.S. patent application Ser. No. 15/412,129, filed on Jan. 23, 2017, which is a divisional of U.S. patent application Ser. No. 13/722,026, filed on Dec. 20, 2012, which claims the benefit of U.S. Provisional Application No. 61/580,869, filed on Dec. 28, 2011. The entire disclosure of the above applications are incorporated herein by reference.

FIELD

The present disclosure relates to a method and system for tracing end-to-end transaction, including browser side processing and end user performance experience.

BACKGROUND

The architectural landscape of web based applications changed from a pure client server based paradigm, where all processing was performed on a web server, and the purpose of the web browser was only to display the results in a static way, to a more distributed approach, where a part of the processing is performed on the web browser. This approach allows the creation of more interactive and dynamic web based application. AJAX (Asynchronous JavaScript And XML) is one widespread enabling technology for such interactive and dynamic web based applications. It allows e.g. partial update of the web browser content, without requesting new content from the web server. Additionally, AJAX introduces content update communication between web server and web browser, which allows requesting new data from the web server and presenting it in the web browser without reloading the content. There are numerous libraries and frameworks available which provide the above described functionality, together with sets of GUI components, interaction and animation functionalities etc. Typical, those libraries and frameworks are implemented in JavaScript™, which assures that they can be used by most web browsers without the need to install additional software components or plug-ins. Additionally, those libraries and frameworks provide unified, browser independent APIs which hide implementation differences between different web browser types and versions. Some examples of such libraries are jQuery, Dojo or ICEFaces.

This distributed application architecture also creates new demands for performance monitoring and transaction tracing systems, because in such architectures, the performance experience perceived by the user is not only influenced by the performance of the web server, but also by the performance of the web browser side processing because in such scenarios, transactions are not only executed on the web server, but distributed between the web server and browser.

Current art provides monitoring and tracing solutions for the server side processing, and other solutions for browser side monitoring, but there are no monitoring and tracing systems which provide end-to-end visibility, including web browser and web server. This section provides background information related to the present disclosure which is not necessarily prior art.

SUMMARY

This section provides a general summary of the disclosure, and is not a comprehensive disclosure of its full scope or all of its features.

One embodiment of the disclosure provides a method and system, which allows tracing of individual end-to-end transactions, starting from an user interaction on a web browser, including browser side processing, sending requests to a web server, handling of the request by the web server or a separate application server, sending the response back to the web browser, processing the response on the browser and presenting the result to the user. Performance parameters of the transaction execution are evaluated on method call granularity level, both on web browser and on server side. This end-to-end view allows measuring the performance perception of the end user, and in case of poor overall transaction performance, it allows localizing the root cause of the performance problem, may it be on the server or on the web browser. The system detects browser activity causing requests sent to the web server, creates tracing data and measures performance data of those browser activities. The requests are tagged with correlation data that allows identifying the browser activity that caused the requests. The correlation data may be attached to the requests in form of cookies. At the web server, the correlation data is extracted from the requests and attached to tracing data and measurement data created for the execution of the request handling by the web server.

In another embodiment, request handling methods of a web server are instrumented in a way to inject a browser agent into content requested by web browsers. On the browser, the browser agent instruments the content to detect browser side activity and to fetch performance data of detected activities. The captured browser performance data is stored by the browser agent and afterwards sent to the web server asynchronous to the execution of the browser side activity. The browser agent may use a specially tagged request to send the performance data to the web server. The instrumented request handling methods of the web server may detect this special request and separate it from payload requests and forward those special requests to a monitoring server to extract and process performance and tracing data.

In a variant of this embodiment, the browser agent may send the captured browser performance data not to the web server which provided the actual content, but to another entity which receives the browser performance data. In this case, the browser agent may have to overcome problems with security concepts like the "same origin policy" which prevents web browsers from sending some script caused events to other servers than the one from which the content was loaded. However, there are solutions available to circumvent such restrictions.

Another embodiment provides a browser agent that tracks currently ongoing browser activity, detects requests caused by the currently ongoing browser activity, and tags the requests with correlation data that allows identifying the browser activity that caused the request and to identify the individual web browser that caused the requests. The embodiment also provides instrumented request handling methods on the web server receiving the requests, where the instrumented request handling methods start tracing the server side request handling, and which extract the correlation data from the received request and attach it to the tracing data generated by the server side request handling.

Another embodiment provides a system for detecting and identifying user interactions on the web browser by instrumenting the browser content to intercept user interactions and which uses information provided by the document object model (DOM) of the current browser content to identify the content element used for the user interaction.

Some other embodiments provide a system to identify and filter request sending actions on the web browser which are caused by user interactions by instrumenting request sending actions on the web browser and by using information about currently ongoing user interactions on the browser to identify those request sending actions caused by user interactions.

Yet other embodiments use content element identification data available in the document object model describing the content to identify content elements used to perform user interactions which caused sending of content update requests to allow identifying the content element which was used to trigger the user interaction causing the content update request.

Another embodiment provides measurements to describing the performance of user interactions as perceived by the user by detecting the start of user interactions with event handlers instrumented into the original content, which intercept user interactions and record the start time of the user interaction, and instrumented synchronous response handling methods, which determine the time at which all synchronous response handlings caused by the user interaction are finished.

A variant of this embodiment determines perceived user interaction time by additionally instruments asynchronous response handling methods to determine the time at which all asynchronous response handlings caused by the user interaction is finished.

Yet another variant of this embodiment determines perceived user interaction time by additionally measuring delays caused by nested request sending and synchronous or asynchronous response handling by detecting additional requests sent during handling of a response, detecting the corresponding response handling, and determining the time when all nested response handling caused by the user interaction is finished.

Other embodiments of the disclosure detect content loading activity caused by the loading of new content by the web browser by instrumenting event handlers for content load related events to the content while it is loaded and interpreted. Those events are automatically sent by the browser and indicate different stages of the content load process, like e.g. finished interpretation of the new loaded content. Additionally, requests caused by content loading to e.g. fetch resources like scripts and images required for rendering the new content are tagged with correlation data that allows identifying the load action that caused the requests.

Some embodiments of the disclosure determine user perceived duration from a user interaction causing loading of new content to the web browser until loading and post processing of the new loaded content is finished and the loaded content is reactive for new user interactions. These embodiments detect user interaction performed on the previous content that caused the loading of new content to the web browser, provide identification data of the triggering content element of the previous and start time of the user interaction, storing this data in a place where it is accessible for the browser agent on the new loaded content (e.g. in a cookie which is unchanged sent back by the web server, or in a browser cache). On the new loaded content, the information about the activity that caused loading of the new content is merged with tracing and performance data of activity detected on the new content. The merged tracing and performance data is later used to determine the time between the start of the action that caused loading the new content within the previous content and the time until the new content arrived on the web browser, was loaded and interpreted by the web browser until post processing of the new content was finished and the new content was ready on the browser.

Yet other embodiments of the disclosure may maintain parent frame references, to model parent-child relationships between parts of fragmented web browser content. Such fragmented web content may e.g. implemented by HTML frames, where the content is divided into different frames by a frame set, which is loaded by the browser. The frame set contains information about which content should be loaded into which frame. In such a scenario, a browser agent is injected to the top level content which loads the frame set. Each content fragment which is loaded to the individual frames is also augmented with a browser agent, and each of those browser agents detects the browser agent in its parent frame and sets a reference to it. This reference may be used by browser agents to notify the browser agent deployed to their parent frame about starting, ongoing and finished actions within their specific content fragment or to retrieve information about a currently ongoing action in a parent frame. This allows to measure e.g. to measure the time required from start of loading the top level frame, until all content loaded to direct or indirect sub frames of the top level frame is loaded. Additionally, this reference may be used to model content fragmentation based parent child relationships in the transaction trace data.

Some embodiments create transaction tracing and monitoring data for actions performed on the web browser, together with transaction tracing and monitoring data for request handling of requests sent from the browser to the web server during action execution. Those embodiments create correlation date that allows combination of tracing and monitoring data describing individual actions performed on the browser with tracing and performance data describing the processing of individual requests received by the web server and sent by the browser to execute those actions.

Variants of these embodiments detect web server request handling caused by the loading of new content to the web browser, which may consist of requests for the new content itself, together with requests for resources required to interpret, visualize and run the new content on the web browser, like e.g. requests for scripts, formatting rules, images etc. Tracing and performance data describing handling of those requests is correlated with the tracing and performance data describing the respective browser side load action. Due to parallelisms in interpretation of new content, such resource requests may be sent before the browser agent injected to the content is fully operable. For such requests, only partial correlation information is available. The described embodiments handle and correlate both resource requests sent before and after the browser agent of the new content is operating. In case of missing correlation information, standard information which is always available, like a page referrer is used for correlation. Additionally, information about the sequence of expected requests is used for correct correlation of request handling tracing data with incomplete correlation data.

Other variants of those embodiments use parent frame correlation data stored with tracing and performance data describing browser action execution, to establish parent/child relationships between tracing and performance data of browser actions executed in different related frames, to model such relationships and to allow visualization of such relationships.

Yet other variants of those embodiments use merged browser action tracing and performance monitoring data which contains data describing the action execution on the previous content of the browser that caused loading of the content from which the merged browser action tracing and performance monitoring data was received, to link the tracing data describing the action that loaded the previous content with the tracing data that describes the loading of the content that provided the merged tracing and performance monitoring data. Additionally, such embodiments may calculate the time between start of the action on the previous page causing the load of the new content until loading of the new content, including resource loading, initialization and post processing is finished.

Still other variants of those embodiments use information about web server/backend based request handling of requests caused by loading of the new content to verify if action tracing and performance data describing an action on the previous content that triggered loading of new content can be the cause of the new loaded content, if the time between start of content load causing action on the previous content and start of the load action of the new content exceeds a certain limit. In such situations, tracing and performance monitoring data describing request handling caused by the loading of the new content must be available, that justifies the longer time between the execution of the content loading action on the previous content and the start of the load action on the new content. If no justifying tracing and performance monitoring data can be found, then those actions are not linked, and no time between start of loading new content on previous content until availability of the new content is calculated.

Other embodiments of the disclosure use information attached to tracing and performance monitoring data describing individual transactions starting with browser actions and including web server/backend based request handling to identify clusters of such transactions by time and individual browser instance. Such a cluster represents an individual visit of the monitored application performed with an individual web browser. Those clusters provide valuable information about how users interact with the monitored application. As an example, clusters containing only one transaction may indicate an application that does not attract users, because such clusters are caused by users viewing only one page of the application and then moving away from it.

Some variants of these embodiments may use rules based on the number of transactions that form a visit to create meta-data describing the visit, to show e.g. if the number of transactions in a visit exceeds a certain limit.

Yet other variants of these embodiments use rules based on method calls performed within one of the transactions that form a vised to create meta-data describing the visit. One example of such rule would e.g. check if a visit contains at least one transaction which calls a method “login” at least one time. Such transaction would then e.g. be marked as “login” transactions.

Still other variants of these embodiments use rules based on method call and method call parameters to create meta-data describing the visit. Such rules may e.g. used to extract quantitative meta-data from a visit. One example would e.g. be a rule that extracts the value of a parameter “amount” of calls to a method “purchase” to extract the purchase amount of a single transaction. The extracted purchase amounts of each transaction of the visit may be summed up to create a “visit purchase amount” which describes the purchase amount of the whole visit.

To allow easy deployment, and to enable production use, the transaction tracing and performance monitoring methods described here are aimed for non-intrusive installation and operation, both on the web browser side and on the backend side. The described browser side transaction tracking only uses features which are provided by web browser out-of-the-box, like e.g. JavaScript™, cookies etc. The backend/web browser side tracing is based on bytecode instrumentation which allows adapting functionality of existing programs, without the need to recompile it and without even the need to know or access the source code.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1: shows a system consisting in an instrumented web server containing an agent, a web browser with instrumented content containing a browser agent, and a monitoring node. The browser agent receives action execution tracing and performance data from instrumented scripts and the agent receives request handling tracing and performance data from instrumented request handling methods of the instrumented web server. Both agents forward received tracing and performance data to the monitoring node where the received data is correlated and merged to create tracing and performance information that describes execution of individual transactions spanning from the web browser to the web server.

FIG. 2: shows a setup similar to FIG. 1, except that the instrumented web server delegates parts of request handling to an instrumented application server via a remote method invocation. An agent is deployed to the instrumented application server which receives tracing and performance monitoring data describing remote method call handling, which is forwarded to the monitoring node for correlation to create tracing and performance information that describes transactions spanning from web browser, via web server to the application server.

FIG. 3: shows a variant of the monitoring system where the browser agent sends its acquired action tracing and performance monitoring data directly to the monitoring node.

FIG. 4: descripts the initial deployment of the browser agent to a browser and shows a browser currently containing uninstrumented content but requesting new content from an instrumented web server, which returns a response containing a browser agent and browser agent configuration data next to the application payload data of the response.

FIG. 5: describes a resource loading scenario where the browser agent deployed to the new content is not initialized during resource loading. In this case, no correlation data created by the browser agent is available, and the resource request is only tagged with correlation data identifying the individual browser instance sending the request.

FIG. 6: shows a resource loading scenario with initialized browser agent, where the resource request contains complete action correlation data.

FIG. 7: conceptually shows an action correlation data record, containing data required to uniquely identify a specific action execution on a specific browser instance. Tracing and performance monitoring data describing individual request handling transactions is tagged with action correlation data to allow identification of the individual action execution that caused the handled requests.

FIG. 8: conceptually shows the building blocks of a web browser, containing an instrumentation section, a correlation section and a monitoring section.

FIG. 9: is a table showing examples of actions of the categories user interaction, content load and content update for both plain actions (i.e. directly supported by the web browser) and script library actions, which require loading of an additional script library.

FIG. 10: conceptually depicts propagation of user interaction events to registered event handlers as typically performed by web browsers. It shows that user interaction events are normally created by a user interaction event, and are then passed up the document hierarchy to registered event handlers. However, some events may be consumed during traversal and may not reach the top level document hierarchy level and globally registered event handlers.

FIG. 11: conceptually shows fragmented web browser content, using frame definitions, and shows the parent references of browser agents deployed to different content fragments according to the frame definitions. Those parent references point to the browser agent deployed to the parent frame.

FIG. 12: conceptually describes the process of loading and post processing of new content as typically executed by a web browser, including different stages of initialization of an injected browser agent.

FIG. 13: conceptually shows the process unloading content as executed by a web browser, including storage of source action data by the browser agent and cleanup tasks performed by the browser agent. Source action data is used to link actions describing loading of new content with the action of the previous content that caused loading of the new content.

FIG. 14: shows the static initialization of the browser agent, which is performed as soon as the browser agent code has been loaded by the browser.

FIG. 15: shows instrumentation updates performed by the browser agent after updates to the document object model (DOM) of the current web browser content are detected. This instrumentation update is also performed after post processing of new loaded content is finished.

FIG. 16: depicts a configuration with already instrumented content in a web browser, showing instrumented user interaction elements, content load actions and content update actions with corresponding sensors.

FIG. 17: shows a configuration with nested instrumented action executions, where one instrumented action calls another instrumented action. The tracing and performance monitoring data created by the instrumented sensors allows the reconstruction of call sequence and call nesting level of the involved actions.

FIG. 18: shows a configuration with an asynchronous content update action where the update action is separated into a part which sends the update request to the server and returns afterwards, and an asynchronous response handling part, which is an event handler for the expected response. Sensors are placed in both parts of the action, and the data provided by the sensors allows calculating the time from sending the request until the handling of the asynchronously received response is finished. In case an user interaction triggers execution of multiple asynchronous update actions, or one asynchronous update action sends multiple requests and registers multiple asynchronous response handlers, the time until the last of those asynchronous response handlers is finished is measured.

FIG. 19: shows a configuration with an asynchronous content update action that registers a response handler which in turn starts (nested) execution of an asynchronous content update action. In this case, time between triggering user interaction and finish of the last content update response handler, triggered directly or nested, is measured.

FIG. 20: conceptually shows action execution events and user interaction action events which are used for communication between deployed action sensor and user interaction sensors and the browser agent.

FIG. 21: conceptually shows an action record, which is used by the browser agent to store data identifying individual action executions together with acquired performance data of the action executions. Action records contain a list of child action records which allow to model action call trees.

FIG. 22: displays a user interaction data record which contains data allowing identification of the content element used for the user interaction and, parameters of the performed user interaction (e.g. in case of keyboard based interaction, the pressed keys) and a start timestamp describing the point in time when the user interaction was triggered.

FIG. 23: shows a source action correlation data record containing data required to identify the action execution on the previous browser content that caused loading of the current content.

FIG. 24: conceptually describes the execution of action sensor deployed to actions. FIG. 24*a* shows entry sensor execution, performed at the start of an instrumented action and FIG. 24*b* shows an exit sensor execution. Exit sensors are executed when execution of an instrumented action is finished.

FIG. 25: shows the execution of a user interaction sensor. A user interaction sensor execution is triggered when an event handler instrumented to an observed user interaction element fires.

FIG. 26: shows the execution of a sensor that measures event handling of a specific event. It measures the time when handling of a specific event is started and the time when all execution of event handlers listening to this specific event is finished.

FIG. 27: depicts the processing of user interaction events by the action data manager which enables the action data manager to maintain information about currently ongoing user interactions.

FIG. 28: shows handling of action execution events indicating user interactions on existing content by the action data manager according to the type of the action execution event. Received action execution events may e.g. indicate start or end of synchronous actions, request sending or finished response handling of asynchronous actions.

FIG. 28*a* describes handling of events indicating the sending of a new update request by performed by an instrumented action. FIG. 28*b* shows how action execution events indication finished response handling of an instrumented action are processed. The handling of an action execution event indicating start of loading new content is described in FIG. 28*c*.

FIG. 29: shows handling of action execution events indicating start and end of content load actions or sub actions in FIG. 29*a*, and updating of existing action records if the action execution described by the action record is finished in FIG. 29*b*.

FIG. 30: shows action performance data records which are used to transfer action execution tracing and performance monitoring data from the browser agent to an entity that forwards or processes the tracing and performance data, e.g. an instrumented web server or a monitoring node. FIG. 30*a* shows an action performance data node which holds correlation information to identify browser instance and current content, global performance and meta-data, and a list of action performance entries, containing performance information about individual action executions. A source action performance entry is depicted in FIG. 30*b*, which contains data about the action performed on the previous content that caused loading the current content. An action performance entry as described in FIG. 30*c* contains correlation information to find a causing parent frame action if one exists, identification data to identify the user interaction content element causing the action, correlation information to reconstruct action calling sequence and nesting level, and action execution performance data.

FIG. 31: shows the process of action performance data sending as performed by the browser agent to transfer measured action execution data from the browser agent to an entity that forwards or processes the tracing and performance monitoring data, like e.g. an instrumented web server or a monitoring node.

FIG. 32: exemplary shows a set of possible action performance data sending strategies which may be implemented by the browser agent.

FIG. 33: shows an overview of the cyclic bandwidth and latency calculation performed by the browser agent to maintain per browser agent data about current network bandwidth and latency.

FIG. 34: shows cyclic sending of bandwidth and latency calculation requests as performed by the browser agent, and handling of received responses to calculate and store bandwidth and latency data on the browser agent.

FIG. 35: shows handling of received bandwidth and latency requests as received by a receiving entity like an instrumented web server or a monitoring node.

FIG. 36: shows execution of a request entry sensor, which is instrumented to request handling methods of instrumented web servers and which is executed when request is received at the instrumented web server at the beginning of an instrumented request handling method.

FIG. 37: shows a parent info node which is used to transfer correlation information between parent and child threads. Information stored in path info nodes can be used to reconstruct parent/child relationships between thread executions being parts of monitored transaction executions.

FIG. 38: depicts a tag info node, which stores thread local correlation information which allows the identification of individual thread executions, to reconstruct call sequence and nesting level of instrumented method executions performed during thread execution and information to identify existing parent thread and child threads.

FIG. 39A-D: conceptually describes event nodes used to transfer tracing and performance monitoring data describing entry and exit of instrumented methods, spawning of threads on the instrumented web server/backend and action executions on the web browser.

FIG. 40: show transfer of parent info node from a thread invocating a remote method to another thread that handles the remote method invocations. FIG. 40*a* shows execution of a tagging sensor which stores the parent info node in a remote method call message in the sending thread, and FIG. 40*b* describes execution of a tag extraction sensor which extracts parent info from the received remote method call message in the receiving thread and stores parent data in the tag info of the receiving thread.

FIG. 41: shows execution of an entry sensor which is performed on entry of instrumented methods (except instrumented request handling methods which execute a request entry sensor).

FIG. 42: shows execution of an exit sensor which is performed on exit of instrumented methods.

FIG. 43: displays path nodes, which contain transaction tracing and performance monitoring data describing the execution of individual transactions. FIG. 43*a* shows a start path node which represents a part of a traced transaction performed by an individual thread execution. It contains correlation information to identify parent thread of the thread execution described by the start path node, and in case of a thread execution caused by a received request caused by the execution of a instrumented action, it contains correlation data to identify the browser action that caused the request. FIG. 43*b* shows a path node which represents an individual execution of an instrumented method, FIG. 43*c* shows a path correlation node which is used to link start path nodes with other start path nodes that represent transaction executions in spawned child threads. FIG. 43*d* depicts an action start path node which represents a recorded top level action execution. It contains correlation information to identify the individual action execution the action start path node describes, correlation information to identify an existing source action and an existing parent frame action, a list of child action path nodes and performance data and a list of start path nodes containing tracing data describing the request handling executions caused by the modeled action execution. A action path node as described in FIG. 43*e* describes the execution of an individual instrumented action and contains information to reconstruct execution sequence and nesting level of the action execution.

FIG. 44: depicts the handling of incoming start path events by the server correlator. This contains setting parent/child relationships between a start path node representing the incoming start path event, and the start path node representing its parent thread execution. Additionally, if the start path event contains action correlation data, the created start path node is tagged with the action correlation data from the received start path even.

FIG. 45: shows handling of path correlation events received by the server correlator. Path correlation events represent the spawning of a thread by its parent thread, and received path correlation events are converted into path correlation nodes representing the spawning of one or more child threads.

FIG. 46: depicts processing of path events by the server correlator. A path event represents either entry or exit of an instrumented method. For path events representing a method entry, new path nodes are created and added to existing tracing and performance monitoring data representing a monitored transaction. For path events representing a method exit, the matching path node, representing the corresponding method entry is searched, and the performance data received with the path event is merged with existing performance data describing the individual method execution.

FIG. 47: shows the processing of action event nodes by the browser correlator. Processing includes establishing source action references and parent frame references. Establishing source action references also includes a plausibility check which may cause skipping of source action linking even if source action correlation data is available and matches.

FIG. 48: shows execution of the source action plausibility check together with some exemplary scenarios of source and destination action together with request handling transactions caused by the loading of the destination content registered by an instrumented web server. FIG. 48*a* shows the plausibility check performed for a candidate source and destination action. FIG. 48*b* shows a scenario where the browser loads the destination action from its cache, the scenario in FIG. 48*c* shows a request handling transaction justifying linking of source and destination action and FIG. 48*d* describes a scenario where the plausibility check fails because the time between source and destination action is longer than it can be justified by recorded request handling transactions caused by loading the destination action.

FIG. 49: shows an overview of the correlation of start path nodes representing handling of requests received by an instrumented web server from an instrumented web browser with action start path nodes and action path nodes that caused those requests as performed by the path combiner.

FIG. 50: shows processing of start path nodes and action start path nodes on entering the path combination area. FIG. 50*a* shows processing of an incoming start path by searching for an action start path node representing loading of content generated by the request handling transaction represented by the incoming start path node. FIG. 50*b* shows processing of an incoming action start path node by searching for a start path node representing a request handling transaction that produced the content on which the action described by the incoming action start path node was executed.

FIG. 51: shows processing of start path nodes exiting the path combination area. Processing includes finding the action start path node or action start that caused the request handling transaction described by the exiting start path node.

FIG. 52: describes handling of detected delayed sending of action performance data by sending a review request by the browser agent that informs the path combiner about delayed sending of action performance data as described in FIG. 52*a*. FIG. 52*b* shows how the path combiner processes such a notification about delayed action performance data by extending the stay of start path nodes which might be caused by actions described by the delayed action performance data.

FIG. 53: depicts an overview of the visit manager, which creates clusters of correlated paths according to the individual browser and temporal grouping of the paths. Such clusters describe a "visit" of an individual user of the monitored application.

FIG. 54: shows a visit record, which contains data defining the visit, like the data identifying an individual browser instance, start and end time of the visit, a list of action start path nodes which are contained in the visit, and calculated meta-information describing the visit.

FIG. 55: shows exemplary visit evaluation rules which may be used to create meta-information about a visit. FIG. 55*a* shows an example for a visit based rule, which evaluates the number of action start path nodes that form a visit. The visit rule depicted in FIG. 55*b* is a method call based example of a visit rule which verifies if a specific method was called within one of the action start path nodes that form a visit. FIG. 55*c* shows an example of a visit rule based on captured values of method executions of start path nodes that form a visit.

FIG. 56: shows how the visit manager processes a new finished action start path event by either finding a matching currently ongoing visit or, in case of no matching visit by creating a new visit. The action start path event is attached to the matching or new created visit.

FIG. 57: shows the process of cyclic checking for timed out visits and closing those timed out visit as performed by the visit manager.

FIG. 58: shows an exemplary user interface for presenting recorded visits, and which contains representative visit data.

FIG. 59: depicts another exemplary user interface which may be used to present recorded performance monitoring and tracing data describing recorded end-to-end transaction to the user. Different, exemplary states of the exemplary user interface are presented which visualize different recorded end-to-end transactions.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 provides an overview of the monitoring system with a browser 101 showing content 102 with instrumented scripts 105, an instrumented web server 122, and a monitoring node 131 which receives tracing and performance monitoring data from both the instrumented web server 122 and the browser 101.

The content 102 currently loaded by the browser contains payload 103 which represents the instrumented browser side part of the monitored application and a browser agent 801, which was injected into the content by an instrumented request handling method of the instrumented web server 122. The payload data consists in static data 104 which e.g. defines the presentation layout of the content and instrumented scripts 105. The instrumented scripts are created by the instrumentation section 810 of browser agent 801 by script instrumentations containing but not limited to injecting monitoring code in form of actions sensors 112 into existing scripts, wrapping existing event handlers with monitoring event handlers or registering new monitoring event handlers. The instrumented scripts may contain actions 106 which may constitute in script code handling user interactions and which may send payload requests 115 to the instrumented web server 122 to request additional data. The browser agent instruments such actions by injecting action sensors 112 to specific places of the action 106. Such sensors may e.g. be placed before code that sends requests to the instrumented web server 122, after code that processes responses received for requests, and it may be placed before and after code that handles user interactions. The action sensors provide action events 107, which provide data to uniquely identify individual action execution and to identify the user interaction element that triggered action execution. Those action events 107 are received by the browser agent 801 and handled by its monitoring section 840. Additionally, payload requests 115 sent by actions 106 are tagged with action correlation data 701 which allows identification of the specific action execution that caused the sending of those requests. Tagging may e.g. performed by setting cookie values in the browser which are then sent with the requests. Correlation data identifying the currently ongoing action execution is maintained and provided by the correlation section 820 of the browser agent 801. The correlation section 820 may utilize the cookie mechanism of the browser to store correlation data. Typical cookie handling implemented by web browser includes automatically tagging of each sent request with all currently available cookies. Thus, the correlation section only has to update the cookies of the browser before requests are sent to achieve correct cookie based request tagging.

The browser agent 801 sends, asynchronous to action execution, action monitor requests 118 to the instrumented web server 122 which contains action execution performance data 3001. The action execution performance data may contain correlation data allowing the identification of the individual browser instance and the individual content view from which the action execution performance data 3001 was sent. The action execution performance data 3001 also contains tracing and performance monitoring data and identification data of all recorded action executions since the last sending of an action monitor request 118.

The instrumented web server 122 receives payload requests 115 via a computer network 113 connecting it with the browser 101 and handles the requests in an instrumented update request handling method 123. The update request handling method 123 is instrumented with a request entry sensor 124 which is executed at the beginning of the method, and an exit sensor 125 which is executed at the end of the handling method. The request entry sensor 124 creates tracing and performance monitoring data in form of event nodes, which indicates a new started web server/backend based transaction. The created tracing data is tagged with action execution identification data from the action correlation data 701 received with the request. The exit sensor 125 sends tracing data in form of path events that indicating that the request handling is finished.

The path events are received by an agent 127, which forwards the path events to a monitoring node 131 for correlation via a computer network 130. All path events are also tagged with an agentId 128 which uniquely identifies the process (e.g. instrumented web server) which is running the agent 127. The web server instrumentation may be performed by using bytecode instrumentation techniques, but it may also be implemented by loading specific webserver plugin modules that are using standard APIs provided by web server implementations to intercept and manipulate incoming requests.

The instrumented web server 122 also receives action monitor requests 118 and forwards them to an injected action monitoring request handling method 126, which creates path events 129 representing the monitored action executions. The created path events are forwarded to the agent 127, which forwards them to the monitoring node 131 via a computer network 130. Update request handling method 123, action monitor request handling method 126 as well as other handling methods residing on the web server and referenced below are also referred to collectively herein as the request handling method.

The path events are received by the event collector 132 of the monitoring node 131 and forwarded to the event correlator 133. The event correlator 133 consists in a browser correlator 134 which handles path events received from browsers and creates tracing and performance monitoring information representing browse side transaction executions, a server correlator 138 which handles path events received from instrumented web servers or other instrumented entities involved in backend processing, and creates tracing and performance monitoring information representing the backend side transaction execution, and a path combiner 135 which combines browser side and backend side transaction tracing and performance monitoring information to create tracing and performance information describing end-to-end transactions.

Transaction tracing and performance information is stored in a path repository 136 for further analysis and visualization which is performed by an analysis and visualization module 137. Analysis and visualization may also include storing of the transaction data in files on a computer hard disk, in data bases or in a cloud based storage.

The system described in FIG. 2 shows a similar setup as FIG. 1, except that the instrumented web server 122 delegates parts of payload request handling to an instrumented application server 208 via a remote method call 202. It shows an end-to-end transaction starting at a browser 101 by execution of an instrumented action 106, which sends a payload request 115 tagged with action correlation data to an instrumented web server 122 where the transaction execution continues by processing the received payload request. The update request handling method 123 handling the received request, delegates parts of the transaction execution to an instrumented application server 208 via a remote method call. Some described embodiments provide tracing and performance monitoring data describing the whole end-to-end transaction from the browser to the application server. It is noteworthy and apparent for those skilled in the art, that the mechanisms used to transfer correlation information from one thread to another can be applied to other forms of inter-thread communication, like sending and receiving of messages, virtual machine internal thread spawning, or web service based communication. Further details regarding an exemplary mechanism is further described in U.S. patent Ser. No. 12/191,409 entitled "Method and System for Tracing Individual Transactions at the Granularity Level of Method Calls throughout Distributed Heterogeneous Applications without Source code Modifications" which is incorporated by reference herein.

The thread 201 in which the update request handling method 123 is executed, contains a tag info 3801, which holds correlation information to uniquely identify a specific thread execution and information to reconstruct call sequence and nesting level of instrumented method executions within the thread. All path events 129 sent by instrumented methods contain correlation information to identify a specific thread execution performed by a specific virtual machine or process. This correlation information may contain, but is not limited to an agentId to identify a specific virtual machine/process, and a pathId that allows identification of a specific thread execution. During execution of the update request handling method 123, a remote method call 202 is executed, which sends a remote method message 205 to an instrumented application server 208. A tagging sensor 203 is instrumented into the method executing the remote method call. This tagging sensor extracts correlation information from the tag info node 3801 which allows identification of the executing thread and stores it in a parent info node 3701. The parent info node 3701 is attached to the remote method invocation message 205 representing the remote method call. The instrumented application server 208 receives the remote method invocation message 205, and forwards it to a remote method service 210 which is executed in a thread 209. A tag extraction sensor 211 is instrumented to the start of the remote method service method. Execution of the tag extraction sensor extracts correlation information from the parent info node 3701 which allows identification of both the thread execution that sent the remote method invocation message 205 and the virtual machine and process on which the sending thread execution was performed. It also creates a tag info node 3801 and initializes parent thread correlation data 3810 of the created tag info node with the extracted parent thread correlation data. The local thread correlation data 3820 of the tag info node is set to values identifying current thread execution and virtual machine/process and the tag info node is attached to the current thread. The information stored in the tag info node 3801 is used by entry sensors 213 and exit sensors 125 subsequently called during execution of instrumented methods 212 by the thread 209 handling the incoming remote method execution request to initialize correlation data of the path events 129 they create. This correlation data allows reconstruction a parent/child relationship between the thread execution sending the remote method request 201 and the thread handling it 209.

The system shown in FIG. 3 describes an embodiment with a slightly changed architecture, where the action monitor requests 118 are sent directly to the monitoring node 131. In this case, also the action monitor request handling method is shifted from the instrumented web server 122 to the monitoring node. This reduces the monitoring caused overhead on the instrumented web server 122, because handling of action monitor requests 118 is performed by the monitoring node 131. The disadvantage of this setup is that the browser agent 801 has to send requests to another destination than the one from which it was loaded. This contradicts with common security restrictions typically used by web browsers, like the "same origin policy" which prohibits scripts to send some requests to arbitrary destinations. Although there are solutions available to overcome this restriction there, some classes of applications and security policies do not allow such a setup.

FIG. 4 describes the situation when a user browses from a not monitored application to a monitored one. The browser 101 shows content 401 from the not monitored application, containing payload 402 with static data 403 and scripts 404. The browser sends a request 417 to the instrumenting web server 122 via a connecting computer network 113 to get new content. This may e.g. be caused by clicking on a link in the previous content pointing to content provided by the instrumented web server 122 or by manually typing an URL identifying content provided by the instrumented web server 122 into the address bar of the browser.

The load request handling method 417 receives the incoming request 417 and the request entry sensor 124 and exit sensor create an instrumented response 405 which contains additionally to the original payload data 410, a sessionId 406 which allows the identification of individual browser instances, a requestId 407 which identifies the requested content (e.g. a hash code of the URL of the received request), a browser agent configuration 409, which may contain but is not limited to configuration data controlling the script instrumentation performed by the browser, the strategy used by the browser agent to determine when it sends action monitor requests 118, or various timeout settings. Additionally it contains the browser agent 801, either in form of embedded code representing the browser agent, or in form of a resource load directive added to the content telling the browser to load the browser agent during interpretation of the new content. Request entry sensor 124 and exit sensor also create path events 129 representing the execution of the request handling initialized by the incoming request 417. The created path evens 129 also contain correlation data to identify the browser instance that sent the response, and to identify the requested content, like sessionId 406 and requestId 407.

FIG. 5 and FIG. 6 describe how tracing and performance monitoring data that describes the loading of resources which are requested by the browser to interpret and visualize new content is retrieved.

FIG. 5 shows a situation where the browser 101 sends resource requests 502 before the browser agent 801 is initialized on the browser. In this case, the only correlation data created by the monitoring system which is available is the sessionId, which is used to tag the resource request 502. The session Id may be received by the browser together with the response that contained the content that is currently loaded in form of a cookie. Such cookies are automatically attached to requests sent by the browser, which provides that the resource requests 502 are tagged with the sessionId. The resource request handling method 506 which handles the incoming resource request 502 is instrumented with a request entry sensor 124 and an exit sensor, which create tracing and performance monitoring data that describe handling of the incoming resource request 502 in form of path events. These path events are tagged with correlation data allowing identification of the causing resource request which may include but is not limited to sessionId, and a referrer which identifies the URL from which the resource was requested. Sending a referrer with a request is a feature of the hypertext transfer protocol (HTTP) which means referrer data is always available. The referrer identifies the content from which a request was sent, e.g. in form of its URL. For a detailed description about how the referrer is used for correlation, please see descriptions of FIGS. 49 to 51. The resource request handling method 506 creates a response holding the requested resource content which is sent back to the browser 101.

FIG. 6 describes the situation where the browser agent 801 is already initialized and running, when a resource request 502 is sent to the instrumented web server. In this case, the browser agent 801 tags the request with correlation data in form of action correlation data 701 as described in FIG. 7. The action correlation data allows exact identification of the action execution that caused the request. On the instrumented web server 122, an instrumented resource request handling method 506 receives the resource request 502, the request entry sensor 124 and exit sensor 125 create tracing and performance monitoring data describing the request handling caused by the request in form of path events 129. The created path events 129 are tagged with correlation data extracted from the action correlation data 701 received with the incoming resource request 502. Cookies may be used as mechanism to transfer action correlation data from the browser to the instrumented web server.

An exemplary implementation of action correlation data 701 is shown in FIG. 7. Action correlation data 701 may contain but is not limited to a sessionId 702, used to identify the individual browser instance that sent a request, a frameId 703, used to identify the individual content view on which the action execution causing the request was performed, and an actionId identifying the action execution that sent the request. An individual content view can be considered as single loading of a specific content by a specific browser. If content is loaded to a browser and the user reloads the same content, this represents a new content view. As an example, a timestamp identifying the time when new content was received by the browser may be used as frameId 703.

FIG. 8 shows a block diagram of the structure of a browser agent which is separated into an instrumentation section 810, a correlation section 820 and a monitoring section 840. The instrumentation section 810 performs the instrumentation of browser content, and contains a plain action instrumentation engine 811, which performs the parts of action instrumentation which are independent of script libraries which may be used, which may include but is not limited to registering global event handlers for events signaling mouse/keyboard based user interactions or signaling content load/unload related activities, wrapping existing original event handlers with monitoring code that detect and report start and end of the original event handler executions etc.

The action detection and identification module 812 identifies event handlers registered for individual user interaction elements in the content, containing but not limited to buttons, links, text forms etc. and detects and stores identification data of such user interaction elements like the name of the user interaction element or its type. This identification data is later used to tag action executions triggered by user interaction with data that allows the identification of the user interaction content element that was used to trigger the action execution.

The script library action instrumentation engine 813, together with the script library sensor repository, detects if a script library which encapsulates AJAX functionality is used, and in case such a library is detected, performs specific instrumentations to the library code. Those instrumentations may contain but are not limited to instrumentations to detect the sending of content update requests, and the end of response handling methods, to identify matching content update request and response handling pairs. The script library sensor repository 814 may contain library specific sensor code which is injected into original script library code by the instrumentations.

The correlation section 820 contains a correlation data manager 821, which maintains current correlation data 822, which may contain but is not limited to a sessionId which identifies the browse instance 101 running the browser agent 801, a current actionId, holding the id of the action that is currently executed, a frameId identifying the current content view, and a requestId identifying the current content which may e.g. be the hash code of the URI identifying the current content. The correlation data manager also maintains an actionId stack 827 which stores actionIds 828 of nested action executions. The correlation data manager receives correlation data update notifications 857 from the action data manager 841 indicating start or end of action executions recognized by the action data manger 841. A correlation data update notification may contain but is not limited to an actionId identifying a recognized action, and a start/stop indicator identifying if the action identified by the actionId is started or stopped.

A correlation data update notification indicating an action execution start causes the correlation data manager to push the current actionId 823 to its action stack 827 in case the current actionId 823 is not cleared, and to set the current action Id 824 to the action Id of the received update notofication. A correlation data update notification 857 indicating an ended action execution causes the correlation data manager to pop the top most action Id from the stack and set it as current actionId. If the action stack is empty, the current actionId is cleared to indicate that currently no action is executed.

The monitoring section 840 is capable for processing incoming action events 107 and to create action execution tracing and performance monitoring data in form of action records, for creating action monitor requests 118 containing this action execution and performance monitoring data and sending them to a receiver (e.g. an instrumented web server 122 or a monitoring node 131) independently and asynchronous to the execution of monitored actions, and for monitoring the quality of the network connection between the browser and the instrumented web server by cyclically measuring connection latency and bandwidth. Additionally, it provides correlation data update notifications 857 to trigger updates of the current correlation data 822.

The action data manager 841 receives action events 107, which may indicate start and end of user interactions, start and end of content load related actions, start of sending content update requests, end of handling of received content update responses, etc. Action events indicating start or end of user interactions are used to update the current user interaction data stack 845, by pushing new user interaction data 2201 on the stack if an event indicating a started user interaction is received. In case of an action event indicating an ended user interaction, the user interaction data stack 845 is searched for a matching user interaction data entry 2201 which is removed from the stack 845.

In case of received action events indicating load actions or content update related activity, the current root action record 848 which contains tracing and performance monitoring data of the currently ongoing action in form of an action record 2101 is updated to reflect the reported event. If the received action event indicates the end of the current action execution and all its nested child action, then the current root action is moved to the root action list 846, which contains action records 2101 representing previously recorded action executions which are not yet reported via an action monitor request 118. If an event indicating a starting action execution is received, and the current root action record is not sent, a new action record 2201 is created which indicates the started action, and the current root action record 848 is set to refer to the new created action record.

If the sequence of received action events 107 indicates the start or end of an action execution, the action data manager sends a correlation data update notification 857 to the correlation data manager 821 which may then update the current correlation data 822 accordingly.

The communication monitor 849 cyclically sends bandwidth measurement requests 3302 to the instrumented web server 122 and receives corresponding bandwidth measurement responses with a defined size. Timing measured between sending of the request and receiving the response, together with information about the size of the request is used to calculate latency data and bandwidth data which is stored as current latency data 850 and current bandwidth data 851.

The monitoring section 840 also maintains source action data 843, which contains data describing the action execution performed on the previous content that caused the loading of the current content. This information may be used to link the action recorded on the previous content which caused loading the new content with the content load action recorded on the new content. As this data is measured and stored on the previous content and retrieved on the current content, it needs to be stored in a "content load independent storage" 842. Ways to implement such storage include e.g. cookies, which are sent with the content load request, and which are unchanged sent back by the instrument web server together with the response containing the new content, or by using the browser's "local storage", a mechanism provided by some browsers which allows to store data on the browser in a way that it is still available if new content is loaded.

The action monitor request sender 852 checks according to an action sending strategy (exemplary strategies are explained in FIG. 32) if the root action list 846 contains action records 2101. If such action records are available, the action monitor request sender fetches current latency and bandwidth data (850 and 851) from the communication monitor 849, current correlation data 822 from the correlation data manager 821 and source action data 843 from the content load independent storage 842 if it is available. The fetched data is used to compose an action monitor request 118 which is then either sent to an instrumented web server 122 or a monitoring node 131. Afterwards, the root action list 846 and the source action data 843 are cleared to ensure that the next action monitor request 118 does not contain already sent data. It is obvious for those skilled in the art that this mechanism may be enhanced by e.g. waiting until a response is received that the action monitor request was correctly handled by its receiver, and to clear root action list and source action data only in this case, to ensure that monitoring data not correctly sent is not deleted, and sent again with the next action monitor request.

The parent browser agent reference 844 may contain a reference to a browser agent deployed to the parent content, in case the content of the browser is fragmented, e.g. by frames, a feature provided by HTML which allow dividing the content into tree like organized content fragments. In this case, the parent browser agent reference 844 would point to the browser agent 801 deployed to the parent frame. The parent browser agent reference 844 may be used to model dependencies of actions executed on different such content fragments.

The tables showed in FIG. 9 provide exemplary actions supported by browsers without specific library support (plain actions 901), and actions typically provided by script libraries to support AJAX functionality. Plain actions may be divided into user interaction actions, like pressing a mouse button or pressing a keyboard key, content load actions which indicate start and end of content load and unload, or start and end of post processing of new loaded content, or content update actions which may send requests which do not necessarily cause the loading of new content, like XHR HTTP requests, together with corresponding response handling.

Those content update actions may further be divided into synchronous content update actions, where action execution starts with sending the update request, waits until the corresponding response is received, performs processing of the received response and then ends action execution, and asynchronous content update actions, where a content update request is sent, and an event handler is registered which is triggered when the requested content arrived on the browser, and which performs processing of the received content asynchronous to request sending. Technically, such asynchronous content update actions decouple sending of the request from receiving and processing the requested content, which leads to a more reactive user interface. Nevertheless, the performance perceived by the user is still determined by the time elapsed between the action was triggered, and the results of the action are visible, which makes it important to determine the time when execution of such event handlers that asynchronously process the requested data is finished. Nested asynchronous content update actions are not another type of content update action, but they are formed by combination of asynchronous content update actions, where the asynchronous processing of received content causes nested execution of another asynchronous content update action and registering of another update response event handler. This is a commonly used implementation pattern which makes it important to also measure time until all nested asynchronous content update response handling is finished.

Script library actions provide similar functionality, however they encapsulate some of the more complex event handling and processing to e.g. identify user interactions or to send synchronous or asynchronous content update actions. Additionally, those script libraries internally handle different browser type and version specific programming interfaces and provide browser type and version independent programming interfaces.

FIG. 10 depict a simplified structure of a content document which may be displayed by a browser, event handlers registered either for individual user interaction elements of the content, or registered globally on document level and the propagation of user interaction events describing occurred user interactions from the user interaction element causing the user interaction event up to the document. Such a structure is also referred to as document object model (DOM) of the loaded content.

Triggering of user interaction element 1 1003 causes creation of an user interaction event 1020, which may first be processed by event handler 1 which is registered to user interaction element 1 1003. Afterwards, the user interaction event may be forwarded to structure element 1 1002, which sends it up to the document node 1001, with a registered global event handler 1010. The document node 1001 forwards the user interaction event 1020 to its global event handler.

Triggering user interaction element 1004 also causes an user interaction event 1020, which is handled by event handler 2 1012 attached to user interaction element 2 but in this case, the event handler consumes the user interaction event, which causes that the user interaction event does not reach the document root 1001 and is not handled by the global event handlers. This illustrates that it is not sufficient for a monitoring system to inject only global event handlers to detect user interactions, because not all user interaction events may reach these global event handlers. Additionally it is not sufficient to inject or wrap only user interaction element specific event handlers, because some user interactions may not be tied to specific user interaction elements, and some browsers may provide methods to add event handlers to user interaction events which do not allow wrapping those event handlers or to inject additional monitoring event handlers.

Embodiments of the disclosure may use a combined strategy for user interaction capturing, which injects and wraps both global event handlers and user interaction specific event handlers, and which also inject event handlers for user interaction notifications which are typically not used by application. An example for such a typically unused notification is the “MouseUp” notification which indicates that a mouse button was released. As a consequence, individual user interactions may be registered by different sensors, and thus be reported multiple times. The action data manager 841 which receives this data must be capable to handle such situations and to detect that only one user interaction is ongoing, even if it is reported multiple times.

FIG. 11 shows an example of content which is fragmented by nested frame definitions where each content fragment contains a browser agent 801 with a parent browser agent reference 844 pointing to the browser agent deployed to its parent content fragment. The loaded content 1101 contains browser agent 1 844 and is divided into two content fragments child content 1 1110 and child content 2 1120 by frame definition 1 1102. The parent reference 844 of browser agent 1 801 deployed to the top level content fragment content 1 is not set as this browser agent deployed to the top level content has no parent. The parent references 844 of browser agent 2 801 and browser agent 3 801 are pointing to browser agent 1 801 which is deployed to their parent content. The parent reference 844 of browser agent 4 801 points to browser agent 3 which is deployed to the parent content of browser agent 4.

Those parent references may be used to model dependencies between actions performed in different content fragments. As an example, loading content 1101 causes loading of content 1 1110 and content 2 1120 and in turn loading of content 3 1130 because loading the top level content also loads child fragments. Knowledge of such dependencies may be helpful to identify root cause of perceived and measured performance problems caused by content load activities.

The process depicted in FIG. 12 shows processing of loading and initializing new received content by a web browser and starts when the browser receives new content in step 1201. In a second step 1202, the new content is loaded and interpreted by the browser, followed by step 1203 that detects and requests resources referred in the new content. Afterwards, responses containing static referred resources, like e.g. images are received and interpreted in parallel in step 1209. Additionally, and also in parallel, non-static resources like e.g. scripts are loaded and interpreted, whereas loading and interpreting of scripts is performed sequentially in the sequence they appear in the new content. One of those resources may be the browser agent 801 which is loaded in step 1204. It is noteworthy that injection of the resource load directive to load the browser agent is injected into the original content in a way that the browser agent is the first requested script resource. After the browser agent script is loaded, the browser agent is interpreted by the browser which causes static initialization of the browser agent (for a detailed description this see FIG. 14) in step 1205. This also causes the start of a "load" action indicating that loading of new content has started. In a subsequent step 1206, the browser performs after DOM update instrumentation which is described in detail in FIG. 15 for an initial instrumentation of the content. Afterwards, other non-static resources are loaded and interpreted by the browser in steps 1207 and 1208. Step 1208 may cause DOM changes which may trigger subsequent DOM update instrumentations.

In step 1210, which is executed after loading of all static and non-static resources is finished, the browser broadcasts an event indicating that content and resource loading is finished. The browser agent 801 receives this event via an injected event handler and starts an "onLoad" action as child action of the already ongoing "load" action which indicates that post processing of new received content and resources has started in step 1211. It is noteworthy that the corresponding event handler injected by the browser agent is registered in a way that it is the first event handler that receives the event. This may e.g. be done by assuring that the event handler is the first one registered for the specific event, because typically browsers trigger event handlers in the sequence they were registered.

Afterwards, all other event handlers registered for this event are executed. Execution of those event handlers may perform DOM changes and may thus cause after DOM update instrumentation as described in FIG. 15.

In step 1213, the browser agent detects that execution of all event handlers listening for the "onLoad" event is finished, and closes the "load" and "onLoad" actions. This detection may e.g. performed by an event handling duration measuring sensor, as described in FIG. 26.

Afterwards, the new loaded content is ready to process user interactions, step 1214. The process ends with step 1215.

The process performed by the browser to unload currently loaded content is described in FIG. 13. The browser receives a content unload request in step 1301 which starts the process and broadcasts an event indicating that a content unload is about to begin ("onBeforeUnload" event) in step 1302. The event is received by event handlers registered for this event which are executed in parallel in step 1306. Additionally and also in parallel, an event handler injected by the browser agent receives the event and sends remaining action records 2101 in the root action list 846 of the browser agent in step 1303, if such action records are available. Then, the event handler checks if the ongoing content unload was caused by a user interaction in step 1304. This may e.g. performed by checking if the current user interaction data stack 845 is not empty. In case the check succeed, source action data, as described in FIG. 23 is created and stored in a content update independent storage in step 1305. Additionally it is checked if at least one action monitor request 118 was sent for the current content, which means meta-data describing the current content are already available, and the source page notified indicator 2309 is set accordingly. The source page notified indicator may be used later, when data about the source action is sent via an action monitor request to decide if full source content meta-data is required because the source page has not been notified before, or if it is sufficient to transmit only correlation data. It should be mentioned that this technique allows correlation of a source action with the final content load caused by the source action execution, even if there is one or more redirects between the user triggered source action and the finally loaded content, because content unload caused by redirects is not caused by an user interaction and thus does not change the stored source action data.

After event handling is finished, the browser broadcasts another event indicating that content unloading will performed immediately. The browser agent may inject an event handler for this event which is used for browser agent cleanup tasks to enable proper shutdown and unload of the browser agent, see step 1308. Other registered event handlers are executed in parallel, see step 1309.

Afterwards the browser unloads the content in step 1310 and the process ends with step 1311.

The static initialization of the browser agent 801 which is performed immediately after the browser agent is loaded by the browser is showed in FIG. 14. The process starts when the browser agent is loaded and started in step 1401. Afterwards, the browser agent determines the time when loading of the current content was started in step 1402 and reads and interprets browser agent configuration data received with the new content in step 1403. In step 1404, a frameId which identifies the current content view is determined and set. This may e.g. be performed by fetching the current timestamp and using it as frameId. Additionally the requestId may be calculated by e.g. determining the hash code of the URI of the current content, in case no requestId is available in the content.

Step 1405 initializes the parent reference of the browser agent, in case the browser agent was deployed to content which is part of a frame set. Afterwards, in step 1406, content load/unload detection is initialized by registering event listeners for events indicating load post processing, and content unload, like "onLoad", "beforeUnLoad" and "unLoad" events. The registered "onLoad" event handler executes an event handling duration measuring sensor as described in FIG. 26. The "beforeUnLoad" handler performs sending of action records available in the root action list and storage of source action data if unload was caused by a user interaction. The “unLoad” event handler performs browser agent cleanup, like clearing references to allow recycling of resources. In a subsequent step 1407, the correlation data manager 821 is initializes with the determined frameId and the received or calculated requestId. The action data manager 840 is initialized in step 1408.

Afterwards, in step 1409, an action entry sensor is executed with parameters indicating the start of a “load” action which started at the load start time determined in step 1402. Note: this “load” action is stopped in step 1213 of FIG. 12 together with the “onLoad” action.

In step 1410, a part of action detection mechanism aimed to detect user interactions is initialized by registering global call back listeners for user interaction events like mouse clicks or pressed keys. Those callback listeners execute user interaction sensors as described in FIG. 25. Next, the communication monitor 849 is initialized in step 1411 and script library instrumentation wrappers which may later be used to perform script library instrumentation are defined and installed in step 1412. Step 1413 initializes the action monitor request sender 852 and step 1414 ends the process.

The process depicted in FIG. 15 shows instrumentation performed by the browser agent after DOM updates are detected or after activity was detected that potentially caused a DOM change. Browsers provide e.g. events notifying that the DOM of new loaded content has been created (e.g. “DomContentLoaded” event). The browser agent may register an event handler for this event which performs after DOM update instrumentation. An example for an event indicating a potential DOM update would e.g. a finished content update response handling which may be detected and notified by action sensors 112.

If a potential DOM update is detected in step 1501, the action detection and identification module 812 in step 1502 detects user input elements in the content which have not yet been instrumented and instruments them with user interaction sensors. This may contain, but is not limited to wrapping existing event handlers registered to user input elements with user interaction sensors or registering user interaction sensors as additional event handlers for the user input elements. As this process may be performed multiple times for the same content, it is important to mark already instrumented user input elements and to skip instrumentation of such marked user input elements to avoid multiple instrumentations for the same user input element. Step 1503 checks if according to the browser agent configuration, content update mechanisms provided directly by the browser should be instrumented, in case this instrumentation should not be performed, process continues with step 1506. Otherwise, the subsequent steps 1504 and 1505 perform the instrumentation of these content update mechanisms. This may performed by wrapping the content update request/response handling mechanisms provided by the browser (e.g. the methods and functions of the XmlHttpRequest object) and instrument this functionality by wrapping it with code that executes action entry or exit sensors before or after the original update request/response handling mechanism is executed. Also steps 1504 and 1505 require measurements to avoid multiple instrumentation, which may e.g. performed by adding flags to instrumented objects during instrumentation indicating that the object is already instrumented and by only instrumenting objects that do not have this flag.

Step 1506 performs cleanup of no longer needed instrumentations, e.g. instrumentation for user input elements which no longer exist after the DOM update.

Step 1507 checks if a known script library is loaded, the specific loaded script library should be instrumented according to browser agent configuration, and if the script library is not yet instrumented. If the check fails, the process ends with step 1510.

Otherwise, the user input handling actions provided by the library are instrumented in step 1508. This may be performed by wrapping this functionality with user interaction sensors that report start and end of the execution of such user input handling actions. Afterwards, synchronous and asynchronous content update actions provided by the library are instrumented in step 1509 and 1510. It is important that those steps are only performed if the content update mechanisms provided directly are not instrumented (see steps 1503, 1504 and 1505) to avoid double instrumentation. Instrumentation of those library provided update actions may also be performed by wrapping them with functionality that executes action entry sensors before original content update request sending is performed, and action exit sensors after original content update response processing is finished. Afterwards, the process ends with step 1511.

FIG. 16 provides an overview about different sensors and action types they are deployed to. Different forms of actions 106 and action sensors 112 are shown and described in more detail. Script code that handles user interactions 1601 may be available in form of event handlers which are attached to user interaction elements of the content. Registration of those event handlers and also name and type of the handled events may vary over different browser types and versions, which enormously increases the complexity of user interaction handling.

Some script libraries may provide functionality to attach such event handlers in a more convenient way, by hiding complexity introduced by deviating interfaces of different browser types (e.g. Microsoft™ Internet Explorer, Mozilla Firefox etc.) and versions. Both directly added event handlers and event handlers indirectly added by such script library functions are instrumented by wrapping them with user interaction sensors 1602. Additionally, user interaction sensors may be registered for events typically not used by applications regardless if an original event handler is available or not. An example of such an event would be the “MouseUp” event. Those user interaction sensors 1602 report start and end of user interactions in form of user interaction action events 2010, which provide timing information describing start and end of the user interaction, identification data to identify the user interaction element that caused the user interaction, together with data to identify type of the user interaction element and optional action parameters.

Content load actions 1603 constitute another form of instrumented actions, which are triggered by loading of new content by the browser. Action entry sensors are executed on start of such actions and action exit sensors are executed on their end. Those action sensors send action execution events 2001 to the browser agent 801. Some content load relevant actions may be monitored with event handling duration measuring sensors, which measures the time from start of event handling caused by a broadcasted event until all event handling caused by this event is finished. An example of such an action is the content post processing or “onLoad” action, which is initialized by a broadcasted “onLoad” event. The “onLoad” processing is then performed distributed by all registered event handlers, and the action ends when all processing in all event handlers is finished.

Content update actions 1606 represent another type of actions, which are executed to request new data from the instrumented web server 122 with a content update request 1611 and to use the new data received with a content update response 1613 to update the current content, without the need of a content reload. Processing of the new data and content updating is performed by a content update response handler 1607.

Such content update actions are instrumented with an action entry sensor 1604, which registers and reports sending of content update requests, and an exit sensor which registers and reports finished processing of received content update responses as performed by a content response handler. Content update requests 1611 which are sent during execution of content update actions 1606 are tagged with action correlation data 701 which allows identification of the action execution that caused the sending of the request. This action correlation data is later used to merge tracing and performance monitoring data describing browser side activities with tracing and performance monitoring data describing web server/backend side transactions caused by these browser side activities.

FIG. 17 shows a situation where an already running action, which may e.g. be a content load action, triggers a content update action 1603. In this case, an action entry sensor 1604 is executed at the beginning of the first action execution. When the action later executes a nested content update action 1603, another action entry sensor 1605 is executed, which signals the start of a second action execution which is nested to the first action execution. After the content update response handler 1607 of the second action is finished, an action exit sensor 1605 is executed and signals the end of the second action. This is followed by the execution of an action exit sensor 1605 which signals the end of the first action.

Some embodiments may use the data identifying nesting levels of different actions executions to determine how the duration of a top level action is composed out of contributions from different nested action executions.

FIG. 18 shows an instrument content update action with asynchronous response handling. The update action is split into a content update request sender 1801 and an asynchronous content update response handler 1802. The content update request sender 1801 is instrumented with an action entry sensor which signals the start of a content update action and which is executed at the start of the content update request sender and before the content update request 1611 is sent. Afterwards, the content update request 1611 is sent to the instrumented web server 122 which is tagged with action correlation data 701 required to combine sever side and browser side tracing and performance monitoring data. An asynchronous content update request handler 1802 is registered by the content update request sender 1801 which is executed when the corresponding content update response 1613 is received on the browser. The mechanism for registering this response handler is manipulated in a way that it wraps the original response handler with an instrumented response handler that first executes the original response handler and then executes an action exit sensor 1605 which indicates the end of content update response processing.

FIG. 19 shows a configuration with an asynchronous content update action with a content update response handler that in turn starts an asynchronous content update action which creates a situation with nested asynchronous content update actions. A content update request sender 1801 is executed, which first triggers execution of an action entry sensor which signals the start of a content update action and which then sends a content update request and afterwards registers an asynchronous content update response handler 1802 to handle the requested content. During execution of the asynchronous response handler 1802, another, nested content update request sender 1901 is executed, which first executes an action entry sensor which signals the start of a new content update action, then sends a content update request and registers a nested asynchronous content update response hander 1902 which processes the requested update response when it is received. After processing of the first received content update response is finished, an action exit sensor is triggered, which indicates the end of the outer asynchronous content update action. When the content update response 1613 requested by the nested content update request sender 1901 is received, the nested asynchronous content update response handler 1902 is triggered and processes the received response. Afterwards, it executes an action exit sensor 1605 to signal the end of the nested asynchronous content update action. The data provided by the executed action entry sensors may be used to reconstruct the time elapsed between the start of the outer content update action until the end of the last ending content update response handler, be it the outer request handler or the nested one. It is noteworthy that the action exit sensor 1605 is placed after the execution of the nested content update request sender 1901, thereby ensuring monitoring of this nested content update mechanism.

Some embodiments may use the data provided by user interaction sensors and data provided by entry and exit sensors deployed to various content update actions and nested or not nested asynchronous content update response handlers to determine which content update requests were triggered by an individual user interaction and to determine the point in time when all content update response processing related to those content update requests are finished. The time span between triggering the user interaction and the time at which all related response handling is finished, describes the reactivity of the application as perceived by the user and is a very important measurement data to describe the performance of the application as perceived by the user.

FIG. 20 shows different types of action events, which may be used to transfer measurement, correlation and tracing data from action sensors that created this data to the browser agent 801 for processing. FIG. 20*a* describes an action execution event, which may be sent by action entry sensors and action exit sensors to signal start and stop of content load actions 1603 and content update actions 1606. An action execution event 2001 may contain but is not limited to an actionId 2002, which contains data to identify the action that was executed, a name 2003 which contains the name of the executed action, a type 2004 which may indicate if the action is a content load action, a content update request action or a content load request action, parameters 2005 containing parameters of the action execution if the action can be parameterized, a time stamp 2006 identifying start or end time of the monitored action execution, and an entry/exit indicator 2007 to identify if the action execution event describes an action start or end.

The user interaction action event 2010 displayed in FIG. 20*b*, may be used to transfer data describing start or end user of interactions detected by user interaction sensors 1602 from user interaction sensors to the browser agent 801. An user interaction action event 2010 may contain but is not limited to an actionId 2011, which identifies the user interaction element used for the detected user interaction, a name 2012 containing the name of the user interaction element, a type, indicating the type of user interaction, like mouse click or key pressed, parameters 2014 for user interaction parameters, which may contain e.g. for a keyboard based interaction, the key or keys pressed, a timestamp 2015 indicating the time when the user interaction start or end was detected and a start/end indicator 2016 which indicates if the user interaction event signals the start or end of an user interaction.

Action records 2101, as described in FIG. 21, are used to store tracing and performance monitoring data describing action executions and their nested action executions. The data received with action events, like action execution events 2001 and user interaction action events 2010 is used to incrementally create and store this tracing and performance monitoring data in form of action records 2101. An action record contains parent action identification data 2120, which may be used to store data to identify an action on a parent frame that caused the execution of this action. Examples for such parent frame action relationships are e.g. load actions of parent frames which cause execution of the load actions of their child frames. Parent action identification data contains but is not limited to a parent frame action Id 2121, identifying the parent action in the scope of the parent content, a parent requestId 2122, containing the hash code of the URL of the parent frame, and a parent frameId 2123, identifying the individual view of the parent frame content in which the parent action was executed.

Beneath parent action identification data 2120, an action record may additionally contain but is not limited to an actionId 2102, identifying the action which was executed, a name 2103 holding the name of the executed action, a type 2104 which identifies the type of the executed action, parameters 2105 which may contain parameters of the action execution, a start timestamp 2107 and an end timestamp 2108 describing monitored start and end time of the action execution, a list of child action records 2108 containing action records that describe the execution of nested actions, a field holding information about registered update requests 2109 which contains information about the content update requests triggered by the action execution for which the corresponding content update response processing is currently not finished, and a finished indicator 2110, which may be used to indicate if this action and all its direct and indirect child actions are finished.

The data stored in the field registered update requests 2109 may be used to determine the end time of an action execution if it executed asynchronous content update requests. Content update request sending 1801 may register an update request, and finished execution of an asynchronous content response handler 1802 may deregister an update request. The action execution is finished, when no more update request is registered. This may either performed by simple reference counting, where each request sending increments a counter, and each response handling decrements it, or by creating correlation data that allows to identify matching request/response pairs, and adding such correlation data to a list with every request and removing correlation data when the end of matching response handling was signaled.

The user interaction data 2201 as shown in FIG. 22 may be used to store data about an ongoing user interaction in the current user interaction data stack 845 of the browser agent 801. It may contain but is not limited to an actionId 2202, identifying the ongoing user interaction, a name 2203, type 2204 and parameters 2205 field for name, type and parameters that specify the ongoing user interaction, and a start timestamp 2206 indicating the time when the user interaction was started.

FIG. 23 shows a source action data record 2301 which may be used to store data identifying the action that was performed on a previous content view and which caused the loading of the current content. The data contained in source action correlation data records 2301 may be used to calculate performance data of an action that started on a previous content view by e.g. clicking on a link, and which was ended by the end of content load caused activity on the current content. A source action data record 2301 may contain but is not limited to a source requestId 2302, a source frameId 2303 and a source action Id 2304 which allow the identification of the previous content view, and the action which was executed to load the current content. Additionally, it may contain a name 2305 and type 2306 field with additional data describing the source action, a start timestamp 2307 holding the time when the action was started on the previous content, source content meta-data containing data 2308 describing the previous content view, like its URL, name of the content etc., and a source page notified indicator 2309. The source page notified indicator may indicate if at least one action monitor request 118 was sent on the previous content view, which means that parts of the source content meta-data 2308 are already known on the monitoring node 131 and can be omitted when the data describing the source action is transmitted.

The execution of action entry sensors and action exit sensors are shown in FIG. 24. FIG. 24*a* depicts the execution of an action entry sensor 1604, which is started when an instrumented action is entered, which may be an action related to content load activity or the sending of a content update request, see step 2401. Afterwards, the current timestamp is fetched in step 2403, and action type, actionId and name are determined in step 2403. The action type determines if the monitored action is a load action or content update request action. In a subsequent step 2404 action parameters may be capture and in step 2405, an action execution event 2001 is created, initialized with the data retrieved in the previous steps, its entry/exit indicator is set to indicate a starting action, and the action execution event record is forwarded to the browser agent 801. The process ends with step 2406.

The process shown in FIG. 24*b* describes the execution of an action exit sensor 1605 which is executed when a load action is finished, or a content update response handling is ended, see step 2410. In a subsequent step 2411, the current time stamp is fetched, and step 2412 determines action type, name and actionId. The following step 2413 creates an action execution event 2001 which is initialized with previously fetched data. The entry/exit indicator is set to exit and the event is forwarded to the browser agent 801. The process then ends with step 2414.

FIG. 25 shows the execution of a user interaction sensor which is executed when a user interaction is triggered by an instrumented user interaction element, see step 2501. The current timestamp is fetched in a subsequent step 2502, and action type, name and parameters are retrieved in subsequent steps 2503 and 2504. A user interaction action event 2010 is created, its entry/exit indicator is set to entry, other data is initialized with the previously fetched values and the event is forwarded to the browser agent 801 in step 2505.

Afterwards, the sensor checks if an original user interaction handler which is wrapped by the user interaction sensor is available in step 2506. If no one is available, a timer is created and started in step 2510, which on timeout creates a user interaction event 2010 indicating the end of the previously started user interaction and forwards the created user interaction event to the browser agent 801. The process then ends with step 2511. The timeout of this time should be chosen in a way to guarantee that all directly triggered request sending is finished within the timeout and to minimize overlapping with timers created by other user interactions. Values between 20 and 50 milliseconds have shown good results.

In case a wrapped original user interaction handler is available, it is executed in step 2507. Subsequent steps 2508 and 2509 fetch the current time stamp and create a user interaction event indicating the end of the previously started user interaction. The process then ends with step 2511.

The process depicted in FIG. 26 describes the execution of an event handling duration measuring sensor. Such sensors may be used to measure the overall time that it takes to handle broadcast events, which may be received and processed by a large number of receivers. The sensor measures the time elapsed between broadcasting the event and the end of the execution of all event handlers registered for the broadcasted event. The sensor execution starts, when an event which is instrumented for event handling duration measuring is triggered in step 2601. An event listener for this event is injected, which first executes an action entry sensor indicating the start of the event handling, as described in FIG. 24*a* in step 2602. Afterwards, a timer is created and stared with a timeout value of 0, which executes an action exit sensor as described in FIG. 24*b*, which indicates the end of the event handling in step 2603. The process ends with step 2604.

The described sensor relies on typical browser behavior regarding execution of event handlers. First, it assumes that event handlers are triggered in the sequence they are registers. Thus, the browser agent registers those sensors as event listener at a point of time in content loading where it is guaranteed that no other event listeners have been registered before. Second, it assumes that event handling is performed sequentially, which means that first all event handler execution regarding the broadcasted event is performed and afterward the timer timeout event indicating the timeout of the timer registered in step 2603 is sent which causes the execution of the exit sensor in its event handler.

Processing of user interaction action events 2010 by the action data manager 841 is shown in FIG. 27. The process starts when the action data manager 841 receives a use interaction action event 2010 in step 2701. Subsequent step 2702 checks if the event indicates start or end of a user interaction. In case of a signaled user interaction start, step 2706 checks if the current user interaction data stack 845 is empty. In case of an empty stack, the new user interaction indicator is set in step 2707, because this signals the transition from a state where no user interaction was active to a state with active user interaction. Afterwards, or if the stack was not empty, processing continues with step 2708, which creates an user interaction data record with the data from the received user interaction action event 2010 and pops it to the stack. The process ends then in step 2709.

If the received event indicates an ended user interaction (step 2702), processing continues with step 2703 which removes the user interaction data record matching the received event from the stack. In case the stack is empty afterwards (step 2704), the new user interaction indicator is cleared in step 2705. The process ends then with step 2709. This stack based mechanism allows to handle situations where user interaction start and end is signaled multiple times for the same user interactions. This allows more aggressive placing of potential redundant user interaction sensors, which in turn greatly reduces the probability to miss user interaction.

FIG. 28 shows the processing of action execution records 2001 by the action data manager 841, to detect and measure user interaction triggered activities which cause sending of content load or update requests. FIG. 28*a* shows the processing of action execution events indicating the sending of a content update request, which starts by receiving such an event (step 2801) and continues by checking if a user interaction is currently ongoing in step 2802. If no user interaction is ongoing, and step 2812 indicates that no current root action record 848 is available, the event is ignored (step 2813) and processing ends with step 2816. In case step 2812 indicates an existing current root action record 848, the process continues with step 2808 which queries the current root action record, all not finished action records 2101 in the root action list 846 and their child action records for an action record matching the incoming event. If one is found, the process continues with step 2814. Otherwise, a new action record 2101 is created and initialized with combined data from the user interaction data 2201 from the top of the current user interaction stack, representing the currently ongoing user interaction in step 2810. ActionId 2102, name 2103, type 2104, parameters 2105 and start time stamp may e.g. be initialized with the corresponding data from the user interaction data 2201. The data in the action record, together with action correlation data attached to requests sent during action execution may later be used to identify which recorded user interaction caused which requests.

Additionally, the current root action record 848 and its child action records are queried for the top most not closed action record, which represents the currently executed action. The created action record 2101 is appended to the child action records 2108 list of the found action record, and the process continues with step 2811, which updates the current correlation data 822 of the correlation data manager 821 to reflect the detected start of an action execution, if the new action record was added to the child actions of the current root action record 848. Step 2814 registers the detected content update request with the found or created action record in the registered update requests 2109. One simple way to perform this may be to maintain a request counter which is incremented with each recorded content update request sending and decremented with each registered finished content update response handling. The outgoing request (and all subsequent content update requests sent by this action) will be tagged with action correlation data reflecting the signaled action execution as denoted in step 2815. Request tagging may be performed by typical browser side cookie handling, which automatically attaches currently set cookies to outgoing requests. Thus, the correlation data manager only has to update the cookies representing the action correlation data correctly in step 2811 to guarantee correctly tagged requests. The process ends then with step 2816.

In case step 2802 indicates a currently ongoing use interaction, the process continues with step 2803 and checks if a current root action record 848 is available. If no one is available, a new action record is created and initialized with data from the user interaction data 2201 describing the currently ongoing user interaction in step 2807 (similar to step 2810), and this new action record is set as current root action record 848. Additionally, step 2807 checks if the parent agent reference is set, and in case it is set, it check if an action execution is currently recorded by the parent browser agent. If such a parent action is ongoing, the parent action identification data 2120 is set with data retrieved from the parent browser agent describing the parent content view (parent requestId 2122 and parent frameId 2123) and the ongoing parent action (parent frame action Id). The Process then continues with step 2811.

If step 2803 indicates that a current root action record 848 is available, process continues with step 2804 and checks if a new user interaction was indicated (see step 2707 in FIG. 27). In case no new user indication is indicated, process continues with step 2808. Otherwise, the process shifts to step 2805 which clears the new user interaction indicator, and subsequently executes step 2806, which appends the current root action record to the root action list 846 and then clears the current root action record reference. The process then continues with step 2807.

FIG. 28*b* shows the handling of action execution events indicating finished content update response processing. The process start with receiving such an event (step 2820) and queries the current root action record (if available) 848 and all not finished action records in the root action list 846 for an action record matching the received action execution event. If none is found, the event is ignored in step 2825 and the process ends with step 2827. Otherwise, the corresponding request is unregistered from the matching action record in step 2823. This may e.g. be performed by decrementing a request counter. Subsequent step 2824 checks if all requests of the action are unregistered. This may e.g. be done by checking if the request counter has now reached the value 0. In this case, the matching action record is stopped (FIG. 29*b* describes the process of stopping an action record in detail). The process then ends with step 2827.

FIG. 28*c* shows the processing of action execution records indicating a content load request, which is started when such an event is received by the action data manager 841 (step 2830). A content load request indicates that an action was triggered which requests new content and in turn causes loading of new content. The process described in FIG. 28*c* provides an alternative to the processing showed and described in steps 1304 and 1305 of FIG. 13. Subsequent step 2831 checks if a user interaction is currently ongoing (e.g. by checking if the current user interaction data stack 845 is empty). In case no user interaction is ongoing, the event is ignored (step 2834) and the process ends with step 2835. Otherwise, source action data is extracted from then received event, current correlation data and from the meta-data about the current content, and a source action data record 2301 is create and initialized with the previously retrieved data in step 2832. Step 2833 stores the source action data record in content load independent storage 842.

The processes described in FIG. 29 show the processing of action execution events indicating the start of content load related actions, and the process of stopping a currently executing action. Processing of action events indicating the start of load actions is shown in FIG. 29*a*, and starts with receiving such an action execution event 2001 in step 2901. In a subsequent step 2902, the action data manager 841 checks if the current root action record 848 of the action data manager 841 is set. In case it is set, the currently active action record, which may be the current root action record itself, or one of its child action records, is determined, a new action record 2101 with the data of the incoming action execution event 2001 is created (Timestamp of action execution event is set to start timestamp of action record) and the created action record is appended to the child action records list 2108 of the currently executing action record. If no current root record is set, a new action record is created with the data from the incoming action execution event, and this created action record is set as new current root action record 848 in step 2904. In both cases, the current correlation data 822 of the correlation data manager 821 is updated to reflect the start of the new action execution in step 2905. The process ends then with step 2906.

The process of stopping a currently executing action, either by an incoming action execution event indicating the end of a load action, or by an execution event indicating finished response handling which unregisters the last update request from an action (see step 2826 in FIG. 28*b*) is shown in FIG. 29*b*.

In case an action execution record indicating an ending load action is received, the process starts with step 2910, and searches for a matching not closed action record in step 2912. If no such action record is found (step 2914) the action event is ignored in step 2918 and the process ends with step 2920. Otherwise, the end timestamp 2107 of the found action record is set to the timestamp 2006 of the received action execution event 2001 in step 2914. In a subsequent step 2915, the end timestamp of parent action records of the found action record is aligned by finding those parent and ancestor action records which currently have an end timestamp set. Those end timestamps are now set to the timestamp of the incoming action execution event. Situation where end timestamps of parent action records are earlier than an ended child action record are e.g. caused by synchronous actions, like content load actions, that execute content update requests with asynchronous content update response handlers 1802. In such causes, the end of the parent synchronous action may be signaled before the end of the asynchronous content update request handler is signaled. The later finished content update request handler then also sets the end timestamp of its parent action to its end timestamp, because the overall action is finished at this point of time. In case of multiple nested asynchronous content update request handlers, the parent end timestamps are determined by the last finished asynchronous content update request handler. In a subsequent step 2916, it is checked if closing the found action record also finishes the current root action. This may e.g. be performed by checking if end timestamps of the current root action record and all its direct and indirect child action records are now set. In this case, the action record 2101 referred by current root action record reference 848 is appended to the root action list 846, and the current root action record reference is cleared. Afterwards, the current correlation data 822 of the correlation data manager 821 is updated to reflect the end of the action execution in step 2918. The process ends then with step 2919.

In case the process is initialized by a detected finished content update request handling which unregisters the last registered content update request of an action record, as in step 2911, the action record query is skipped, and the process continues in step 2914 with the incoming action record.

FIG. 30 displays different data records which may be used to transfer action execution tracing and performance monitoring data from the browser agent which recorded this data to an action monitor request handling method 126 in form of an action monitor request 118. FIG. 30*a* shows an action performance data record 3001, which contains action origin correlation data 3010, providing data to identify the individual browser instance and individual content view on which the action performance data was recorded. The action origin correlation data 3010 may contain but is not limited to a sessionId 3011 which identifies an individual browser instance, a requestId 3012 which identifies the viewed content (e.g. hash code of the URL), a frameId 3013 which identifies an individual content view, and a pageId 3014 which identifies the top level content view, in case of frame based, fragmented content. In case of no fragmented content, the values frameId and pageId may be identical.

Further, an action performance data record 3001 may contain but is not limited to general performance data 3002, describing general performance statistics of the viewed content, like e.g. "time to first byte" (timestamp when the first byte of the content arrived at the browser), number of elements in the DOM tree of the content etc., latency and bandwidth data 3003 which describes the quality of the used network connection that connects browser and webserver, content meta-data 3004 which describes the viewed content and may e.g. provide the name or the URL of the viewed content, a send timestamp 3005, containing a timestamp in browser time at which the action monitor request 118 containing this action performance data record 3001 was sent by the browser agent and an action performance data list 3006 which may contain tracing and performance monitoring data of executed actions in form of a source action performance entry 3020, and action performance entries 3030.

Source action performance entries 3020 as displayed in FIG. 30*b*, may be used to transfer information about an action that caused loading of the current content which was executed on the previous content view. It may contain but is not limited to a source requestId 3021, a source frameId 3022 and a source actionId 3023 to identify the previous content view and the action execution on the previous content that caused loading the current content. A sessionId to identify a browser instance is not required here, because it would be identical with the session Id 3011 of the enclosing action performance data 3001 because previous and current content view are performed with the same browser instance.

Name 3024, type 3025 and parameters 3026 provide additional information about the executed action, a start timestamp 3027 provides the time when the source action was triggered on the previous content view and source content meta-data 3028 provides information like name or URL describing the content on which the source action was triggered.

FIG. 30*c* shows an action performance entry 3030, which may be used to transfer tracing and performance monitoring data describing individual action executions. The parent action identification data 3041 may be used to identify an action execution on a parent frame which caused the action execution described by the action performance entry 3030 and may contain a parent frame requestId 3041, a parent frameId and a parent frame action Id to identify the content view of the parent frame and the action execution on the parent frame which caused the action execution described by the action performance entry 3030. The parent action identification data may be omitted if no parent action is available. Additionally, an action performance entry may contain an actionId 3031 to identify the described action execution, a name 3032, type 3033 and parameters 3034 which provide additional information about the executed action, a nesting level 3035 which provides the nesting level of the described action execution, a start timestamp 3036 and an end timestamp 3037 which provide start and end of the described action execution. The nesting level is used to indicate action executions which are triggered by already ongoing action executions. For example, if execution of instrumented action A executes action B, then action execution B is nested to execution A. In this case, nesting level of A would be 0 and nesting level of B would be 1.

FIG. 31 shows the process of creating an action monitor request 118, as performed by the action monitor request sender 852. When the process is triggered according to an action sending strategy (for examples see FIG. 32) in step 3101, the action monitor request fetches the root action list 846 in step 3102 and checks in step 3103 if the list is not empty and contains action records describing finished action executions (action record and all its direct and indirect child action records have a set end timestamp 2107). In case no finished action record is available, the process ends with step 3111. Otherwise, correlation data like sessionId 823, requesId 826, frameId 825 and pageId (frameId of top level frame if available) are fetched from the correlation data manager in step 3104, and current latency and bandwidth data are fetched from the communication monitor 849 in step 3105. An action performance data record 3001 is created in step 3106, its action origin correlation data 3010 is set with the data fetched from the correlation data manager, its latency and bandwidth data 3003 is set with data fetched from the communication monitor. General performance data 3002 and content meta-data are also fetched and set to the corresponding fields of the action performance data record.

A subsequent step 3107 checks if source action data 843 is available in the content load independent storage 842. In case no source action data is available, process continues with step 3109. Otherwise, a source action performance entry 3020 is created and initialized with the source action data in step 3108. The source action data is then removed from the content load independent storage 842, the created source action performance entry is appended to the action performance list 3006 of the action performance data record 3001 and the process continues with step 3109. In this step, action performance entries 3030 are created for each available finished action record and their child action records in a way that preserves the sequence of monitored action executions and which sets the nesting levels 3035 of the created action performance entries to reflect nested action executions.

In a subsequent step 3110, the send timestamp 3005 of the action performance data 3001 is set to the current time. Afterwards, an action monitor request 118 is created with the action performance data record and sent either to an instrumented web server 122 or a monitoring node 131. The process then ends with step 3111.

FIG. 32 shows some example strategies which may be used to determine when an action monitor request is created and sent by the browser agent. For such strategies, there is always a tradeoff between fast notification of recorded action executions and the overhead generated by to frequent sending. Additionally, such a sending strategy may also be influenced by the correlation process performed by the event correlation, which may rely on a certain maximum delay between the arrivals of tracing data describing monitored server side transactions and tracing data describing the browser actions causing those server side transactions.

Those strategies are explained by means of a typical content view, which starts with a load content action 3206 which sends some requests 3214 to the web server to e.g. fetch resources required to render the content. A nested load post process action 3207 is triggered by the load content action which also sends some requests. After load content and load post process ended, there is typically a time span with no activity 3208, after which an user interaction is triggered, which causes the execution of action 1 3209 which in turn triggers execution of action 2 3210 which again triggers action 3 3211. After the action executions are finished, there is another time period of inactivity 3212, followed by an unload sequence 3205 which is initiated by a user interaction that navigates to another content.

A cyclic send strategy 3201, would e.g. attempt sending of action monitor requests 3205 with a fixed frequency. Such a strategy would guarantee a maximum delay between action recording and sending, but it may also produce a certain amount of overhead, both on the network and on the browser during periods of inactivity 3208 and 3212.

An action buffer size controlled strategy 3202 would send action monitor requests 3205 when the number of action records stored by the browser agent exceeds a certain maximum, to avoid excessive memory overhead on the browser. Such a strategy fails to guarantee a certain maximum delay between action recording and sending, and it may in some scenarios with low activity, never send an action monitor request, because the send threshold is never reached.

An on unload strategy 3203 would aggregate all action execution data on the browser agent, and then send all recorded activity on unload of the content. Although such a strategy minimizes the network overhead, it fails to guarantee a certain maximum delay between action recording and sending.

A strategy which sends action monitor requests on the end of specific actions 3204 like e.g. the end of a root action would e.g. send an action monitor request after the end of the load content action and after the end of action 1. Such a strategy would guarantee a certain maximum delay between action recording and action sending and it would create relatively low overhead, because no processing/request sending is performed in times of inactivity.

It is obvious for those skilled in the art that the above described strategies may be combined to form more sophisticated strategies, and that additionally various notifications provided by the browser may be used to trigger sending of action monitor requests.

FIG. 33 shows an overview of the latency and bandwidth measurement subsystem which may be used to create measurement data describing quality and performance of the network connection connecting browser 101 and instrumented web server 122.

The communication monitor 849 of the browser agent 801 cyclically sends bandwidth measurement requests, which may contain a test data size which may define the desired size of the requested bandwidth measurement response 856 in bytes.

The instrumented web server 122 receives the request and forwards it to the action monitor request handling method 126. This method reads the test data size 3302 from the received request, creates test data 3304 of the desired size and a bandwidth measurement response 856 containing this test data, and sends the response back to the browser 101.

The process depicted in FIG. 34 describes browser based activities performed to measure network bandwidth and latency. As those parameters may change over time, this measurement may be performed after each finished content load and afterwards cyclically with a period providing relatively up-to-data measurement, but which does not cause too much overhead. Update periods between 1 to 5 minutes constitute a good compromise.

After the process is triggered due to finished content load or a new measurement cycle in step 3401, the communication monitor 849 first performs a reset of current latency data 850 and current bandwidth data 851 in step 3402. In a subsequent step 3403, a temporary bandwidth test data size is set to 0, and in step 3404 a bandwidth measurement request with test data size 0 is sent, the current time is stored and a response handler for the request is registered. When the response handler gets triggered in step 3405, the time network latency is determined by subtracting the time at which the response handler was triggered from the time at which the request was sent. This value is then stored as current latency data 850. Afterwards, in step 3406 the process waits until an inter request timeout elapsed before proceeding to avoid request bursts caused by latency and bandwidth measurement. Subsequent steps 3407 and 3408 first increment the test data size and afterwards send a bandwidth request measurement request 855 with the incremented test data size, store the send timestamp and register a response handler for the sent request. When the response handler gets triggered by the received response in step 3409, it measures the time between sending the request and receiving the response and in a subsequent step 3410 it checks if the time between sending the response and receiving the response is above a certain threshold, or if the bandwidth test data size exceeds the test data size maximum. If both checks fail, the process continues with step 3406. Reason for these checks is to perform the bandwidth test with a test data amount that produces a measurable transfer time and to restrict the size of test data to a certain limit.

If the checks passed (step 3411), the current test data size and the measured transfer time for this test data are stored as current bandwidth data 851 in step 3412. The process then ends with step 3413.

The process shown in FIG. 35 describes the handling of bandwidth measurement requests 855 by the action monitor request handling method 126. (Note: in case of a setup as described in FIG. 3, the bandwidth measurement requests are not sent to the action monitor request handling method 126 of the monitoring node 131. They have to be handled by the instrumented web server 122 to ensure that the quality of the network connection connecting the browser 101 and the instrumented web server 122 is measured.) The process starts when the action monitor request handler receives a bandwidth measurement request in step 3501. In a subsequent step 3502, the test data size is read from the request and in step 3503 a response is created which contains test data of the requested size. The response is sent back to the browser in step 3504 and the process ends with step 3505.

FIG. 36 shows the execution of a request entry sensor 124 which is executed at the beginning of a request handling method (e.g. update request handling method 123, load request handling method 417 or resource request handling method 506).

A request entry sensor 124 gets invoked (step 3601) when a request handling method receives a request and starts execution. In a first step 3602, the sensor checks if the incoming request is a monitoring internal request, like an action monitor request 118, a bandwidth measurement request 855 or a request for a browser agent resource. In this case, process continues with step 3603 and checks if the incoming request is an action monitor request 118. If the check passes, the process continues with step 3604 which forwards the request to the action monitor request handling method 126. A subsequent step 3607 checks if the received request is a valid action monitor request. In case the request is not valid, the process ends with step 3631. Otherwise, the process continues with step 3608, which extracts action correlation data containing sessionId, frameId and actionId, action execution tracing and performance monitoring data and latency and bandwidth data from the received action monitor request and fetches the agentId 128 of the agent 127 deployed to the instrumented web server 122 and the current timestamp in step 3609.

In a subsequent step 3609, an action event node 3980 is created and initialized with the previously fetched values. The created action event node is then sent to the agent 127 which is deployed to the instrumented web server in step 3611. (The agent forwards the event to the event collector 132 of the monitoring node 139) The process then ends with step 3631.

If step 3603 indicates that the incoming request is no action monitor request, the process continues with step 3612 which checks if the request is a bandwidth measurement request 855. In this case the request is forwarded to the action monitor request handling method in step 3613, and a subsequent step 3614 checks if the request is a valid bandwidth monitoring request. If the check fails, process ends with step 3631. Otherwise, the test data size is extracted from the request, test data with the requested size is created an embedded into a response which is sent back to the browser 101 in step 3615. The process then ends with step 3631.

In case step 3612 indicates that the request is no bandwidth measurement request, a subsequent step 3616 checks if the request is a browser agent resource request (e.g. a request for a script file containing the browser agent code). In case this check fails, the process ends with step 3631. Otherwise, the requested browser agent resource is fetched and a response containing the requested browser agent resource is created which is then sent back to the browser in step 3617. Afterwards, the process ends with step 3631.

If step 3602 detects that the incoming request is not a monitoring internal request, the process continues with step 3618 which checks if the request should be traced. Step 3618 may be used to filter internal requests, like requests sent between members of a web server cluster for management purposes. In case step 3618 detects that the request should not be traced, the process ends with step 3631.

Otherwise, the process continues with step 3619, which checks if a tag info node 3801 is available in the local storage of the current thread. In case a tag info node is already available, the process continues with step 3629. A missing tag info node indicates that the current request handling execution is not part of an already traced transaction. Only in this case, tracing data modeling a new traced transaction is created and tagged with correlation data to identify the corresponding browser activity that caused the transaction.

In case of no available tag info, the process continues with step 3620, which creates and initializes a new tag info node and stores it in the local storage of the current thread. The parent thread correlation data 3810 is set to values indicating no existing parent thread, the agentId 3821 is set to the agentId 128 of the agent 127 deployed to the instrumented web server 122, local pathId 3822 is set to an arbitrary but unique (within the scope of the executing instrumented web server) value, call depth 3823 and forkId 3824 are set to 0. Subsequent step 3621 creates and initializes a start path event node 3901, with parent thread correlation data 3910 and local thread correlation data 3920 initialized with values from the previously created tag info node 3801, sets the path start timestamp 3936 to the current time and acquires and sets measurement payload data 3902 of the start path event node. Thus, start path event nodes are created for content update requests, content load requests and resource requests; such nodes are also referred to herein as request records.

In a subsequent step 3622, the process checks if end-to-end correlation is enabled (end-to-end correlation may be switched on and off during runtime of the monitored application via configuration settings). In case end-to-end correlation is not enabled, the process continues with step 3628. Otherwise, step 3623 is executed, which checks if a browser agent should be injected and in this case performs injection of the browser agent into the content which is currently created.

Browser agent injection is performed in a way to ensure the browser agent is the first resource which is loaded and interpreted by the browser. This may be achieved by injecting the browser agent at the position of the content which is loaded an interpreted by the browser before all other parts of the content are loaded and interpreted. For HTML based content, this may be directly after the first occurrence of the tag "<HEAD>" which indicates the start of the HTML header, and also the first position which allows referring resources like scripts. Browser agent injection may be performed by an "on the fly agent injector", which may be attached to the content which is currently created and which may be notified if the content is updated. On each notified update, the on the fly agent injector may check if the earliest browser agent injection position was already written to the content and then insert browser injection data (e.g. a resource link to load the browser agent) to the content. Additionally, the on the fly agent injector may detect if a browser agent should be injected to the content or not. This on the fly browser agent injector provides a way to inject the browser agent which does not influence the overall functionality and performance of the request handling and the web server/browser communication, because the on the fly injection does not require to e.g. parse the whole content, which would prohibit sending parts of content to the browser as they are created, which has great impact on the performance of web based applications.

In a subsequent step 3624, the action correlation data 701 containing sessionId 702, frameId 703 and actionId 704 is extracted from the received request, and the corresponding fields session Id 3931, frameId 3933 and actionId 3934 of the previously created start path event node 3901 are set with the extracted data.

Afterwards, step 3625 checks if a browser agent should be injected into the currently created content. This may e.g. be performed by checking the content type of the content which is currently created and only inject a browser agent if the content may capable to contain executable or interpretable scripts, like content of type "html" or "xhtml" etc.

In case no browser agent is injected, the process continues with step 3627 and the requestId 3932 is set to an invalid value. Otherwise, the requestId of the incoming request is calculated in step 3636 (e.g. hash code of the URL of the request) and set to the requestId field 3932 of the created start path event node 3901. Afterwards, the step checks if the received request contained a sessionId, and creates a new unique sessionId in case it is missing. A missing sessionId indicates that the request was sent by a new web browser which did not send requests to the instrumented web server 122 before. In this case, a new unique sessionId is created. Afterwards, requestId and created or received sessionId and the browser agent configuration are attached to the response which is currently created. See e.g. 407, 406 and 409 in FIG. 4. Attaching this data may be performed by using cookies which are added to the response. Typically, browsers store such received cookies and send them which each subsequent request. This behavior guarantees that each subsequent request from the browser contains a cookie with the browser instance identifying sessionId, and the requestId. Additionally, it makes the browser configuration data available for the browser agent.

In some implementations, information of a browser agent is injected or not is only available to the on the fly browser agent injector. In this case, steps 3625 and 3626 are also performed by the on the fly browser agent injector.

The process then continues with step 3627 by extracting the referrer from the incoming request and storing it in the referrer field 3935 of the start path event node 3901 and by sending the start path event node to the agent 127 in step 3628. Afterwards, path event relevant data, like start time of the currently executed method, method argument values etc. may be acquired, the call depth 3823 of the tag info node will be incremented, and a path event will be created and initialized in step 3629. The created path event represents the entry of the currently executed method by the current thread. Step 3630 then sends the path event node 3940 to the agent 127 and the process ends with step 3631.

The data record described in FIG. 37 shows a parent info node which may be used to transfer inter thread correlation data from a monitored parent thread execution to a monitored child thread execution, which is e.g. shown in FIG. 2, where a parent info node is transferred with a remote method invocation message 205 to transfer identification information identifying a thread that invokes a remote method, to another thread executed on another virtual machine/process, that executes the remote method.

A parent info node 3701 may contain but is not limited to an agentId 3702 which identifies the process or virtual machine on which the parent thread is executed, a local pathId 3703 identifying the parent thread execution within its process or virtual machine, and a forkId 3704 which allows to identify the position within a thread execution that caused the start of the child thread (e.g. intra process/virtual machine spawned thread, remote method call etc.)

FIG. 38 shows a tag info node 3801 which may be used to store thread specific correlation data, and parent thread identification data in the local storage of a thread.

A tag info node may contain a parent tread correlation data section 3810, which may in turn contain but is not limited to a parent agentId 3811, a parent local pathId 3812 and a parent forkId 3813 to identify the process/virtual machine running the parent thread, to identify the parent thread itself, and to determine the part within the parent thread execution that spawned the current thread. Parent thread correlation data 3810 may remain unset if no parent thread is available.

Additionally, a tag info node may contain local thread correlation data 3820 which may contain but is not limited to an agentId 3821 identifying the process/virtual machine running the thread, a local pathId 3822 identifying an individual thread execution, a call depth 3823 indicating the current call nesting level of instrumented methods and a forkId 3824 which contains the number of spawned child threads of the current thread.

FIG. 39 depicts various types of event nodes, which may be used to transfer tracing and performance monitoring data describing action executions and server side transaction executions from sensors (request entry sensors 124, entry sensors 213 or exit sensors 125) or from action monitor request handling methods 126 to an agent 127 which may forward those event nodes to the monitoring node 131 for correlation.

A start path event node 3901 as shown in FIG. 39*a* notifies a new started monitored thread execution, and contains parent thread correlation data 3910 to identify the monitored parent thread execution if such a parent thread exists, local thread correlation data 3920 to identify the current thread execution, action correlation data 3930 to identify the monitored browser action execution causing the current thread execution if such an action execution exists, and measurement payload data 3902 which may contain data describing the current thread execution, like e.g. a thread name.

The parent thread correlation data 3910 may contain but is not limited to a parent agentId 3911, identifying the process or virtual machine that executed the parent thread, a parent local pathId 3912 identifying the parent thread execution, and a forkId 3913. Local thread correlation data 3920 may contain but is not limited to an agentId 3921 and a local pathId 3922 to identify process or virtual machine executing the thread and to identify the thread execution itself.

Action correlation data 3930 contains but is not limited to a session Id 3931 identifying the browser instance that executed the causing action, a requestId 3932 and frameId 3933 to identify the content type (e.g. hash code of the URL identifying the content) and the individual content view on which the causing action was executed, an actionId identifying the causing action execution, a referrer 3935 and a path start timestamp holding the time at which request handling was started by the instrumented web server 122. For requests sent by the browser before the browser agent 801 was initialized, frameId 3933 and actionId 3934 which are set by the browser agent are not available. In such cases, only referrer 3935 and sessionId 3931 are available for correlation, because this data is either part of the communication protocol used between web server and browser (referrer) or is automatically returned by the browser (sessionId). Knowledge about temporal sequence of received requests, is used to also correctly combine those requests with their causing browser side action (for details see FIGS. 49-51).

Path event nodes, as depicted in FIG. 39*b* are used to indicate entry or exit of instrumented methods 212. A path event node contains an agentId 3921 and a local pathId 3922 which identify the application and the thread execution that originated the path event node and which form the local thread correlation data 3920. The entry/exit indicator 3951 allows distinguishing between event nodes created by entry sensors 213 and exit sensors 125. The entry/exit indicator may be used to distinguish between path event nodes describing the entry of instrumented methods from path event nodes describing the exit of instrumented methods. The sensorId 3942 may be used to reconstruct the context of the sensor that created the path event node 3940. The call depth 3952 indicates the nesting depth of the instrumented method that created the path event node. The measurement payload data 3941 includes information about the current execution of an instrumented method 212. Measurement payload data 3941 may include but is not limited to method execution time, synchronization time, captured method parameter values, method return values or wait time of the instrumented method.

Path correlation event nodes 3960, which are shown in FIG. 39*c*, are used to indicate that a thread activated another thread, either explicitly, by e.g. calling a remote method or by sending a message. Path correlation event nodes allow reconstructing the sequence of thread activations performed by a thread. A path correlation node contains an agentId 3921 and a local pathId 3922, which identify the application and the thread execution that originated the path correlation event node. The sensorId 3961 allows the reconstruction of the context of the sensor that created the path correlation event node 3960 and the call depth 3971 indicates the nesting depth. The forkId 3961 indicates the sequence number of the thread activation described by the path correlation event.

Action event nodes 3980 as described in FIG. 39*d*, are used to transfer action execution tracing and performance monitoring data to the monitoring node 131. An action event node may contain action origin correlation data 3990 to identify browser instance and the individual content view on which the reported actions were executed, which may contain a sessionId 3991 to identify the browser instance, a requestId and a frameId to identify the content type and the individual content view. Additionally it may contain an agentId 3981 that identifies the instrumented web server 122 that received the action monitor request 118 which caused the creation of the action event node, latency and bandwidth data 3982 containing data describing performance and quality of the network connection between the browser and the instrumented webserver, browser location and metadata 3983, containing e.g. geographic location of the browser and data describing the browser, like its name and version. The action performance data list 3984 contains action tracing and performance monitoring data in form of source action performance 3020 and action performance entries 3030 as received with the action monitor request 118 that caused the creation of the action event node. A request received timestamp 3985 contains the time at which the instrumented web server 122 received the request, and a request send timestamp 3986 contains the time at which the browser 101 sent the request. The content meta-data field 3987 may be used to store content meta-data describing the content on which the monitored actions were executed which was received with the action performance data record 3001 causing the creation of this action event node 3980, see respective content meta-data field 3004.

FIG. 40 shows the transfer of correlation information within a remote method call, whereas FIG. 40*a* describes how a tagging sensor is attaching correlation information in form of a parent info node 3701 to a message representing a remote method invocation 205 at the caller side of the remote method. The process starts when a remote method 202 is invoked, which causes the execution of a tagging sensor 203. In step 4002, the tag info node 3801 is retrieved from the thread local storage and step 4003 checks if the local thread correlation data 3820 is initialized. If the local data is initialized, execution continues with step 4004 by creating and initializing a parent info node 3701 with data from the tag info node 3801 retrieved in step 4002. In step 4005, the parent info node 3701 is attached to the message representing the remote method call 205. In a subsequent step 4006, a path correlation event 3960 is initialized and sent to the monitoring node 131 and the forkId 3824 of the tag info node 3801 is incremented.

FIG. 40*b* displays how a tag extraction sensor 211 extracts the parent info received with a remote method message 205 on execution of the remote method service routine 210. The process starts when a remote method call message is received in step 4010. In a subsequent step 4011 the sensor checks if the remote method message 205 contains a parent info node 3701. If a parent info node is found, it creates a tag info node 3801 and resets its local data section 3920 in step 4012, initializes the parent data section 3910 with data from the received parent info node 3801 in step 4013 and stores the tag info node in the thread local storage in step 4014. The process then ends with step 4015.

The execution of an entry sensor 213 is depicted in FIG. 41. Calls to entry sensors 213 are inserted at the start of each instrumented method 212. The process starts if an instrumented method 212 is entered in step 4101. Following step 4102 checks if a tag info node 3901 is available in the local storage of the current thread. If it is available, the process continues with step 4104, otherwise a new tag info node is created, reset and stored in the thread local storage in step 4103. In a subsequent step 4104, the entry sensor checks if the local data 3920 of the tag info node 3901 in the thread local storage is initialized. If the local data of the tag info node is set, payload data is acquired in step 4112. Payload data may contain, but is not restricted to execution time, synchronization time or argument values of the current method. In step 4113, the call depth 3952 of the tag info node 3901 is incremented and in a subsequent step 4114, a path event node 3940 is created and initialized with an agentId 3821, local pathId 3822 and call depth 3823 from the tag info node 3801. Additionally the sensorId 3942, which identifies the context of the entry sensor 213, is set. The entry/exit indicator 3951 is set to "entry" and the acquired payload data is stored in the path event node. In step 4115 the path event node is sent to the agent 127 deployed to the monitored virtual machine or process, which forwards the event to the monitoring node 131 for correlation. The process ends with step 4116.

In case step 4104 indicates not set local data 3820, the entry sensor 213 executes step 4105 and generates a new local pathId 3822, which uniquely identifies a thread execution within the scope of a virtual machine or process. Additionally, it retrieves the agentId 128 from the agent 127 deployed to the application. Both local pathId 3822 and agentId 127 are stored in the tag info node 3801 stored in the local thread storage, and call depth 3823 and forkId 3824 of the tag info node 3801 are reset.

In a subsequent step 4106, payload data specific for a started local execution path is acquired, which may contain the start time of the path, or an indicator about the event causing the start of the execution, like handling a message or executing a remote method.

In step 4107 the entry sensor creates a start path event 3901, sets local path Id 3921, agentId 3922 with data from the tag info node 3801, and stores the acquired payload data to the measurement payload data 3902. Afterwards the entry sensor 213 checks in step 4108 if the parent data 3810 of the tag info node 3801 is set. If the parent data 3810 is set, the entry sensor initializes the parent data 3910 of the start path event node 3901 with the parent data 3810 of the tag info node 3801 in step 4109. Otherwise, parent data 3910 of the start path event node 3901 is reset in step 4110. Afterwards, the start path event 3901 is sent to the monitoring node 131 in step 4111 and execution of the entry sensor continues with step 4112 and subsequent steps.

The execution of an exit sensor 125 is depicted in FIG. 42. Each time an instrumented method 212 is exited, an exit sensor 125 may be invoked, see step 4201. The exit sensor checks in an initial step 4202 if the local data 3820 of the tag info node 3801 in the local thread storage is set. If no local data is set, the current execution of the method belongs to no monitored execution path. In this case, the execution of the exit sensor 125 is terminated in step 4209. Otherwise, execution continues with step 4203 which acquires pay load data of the exit sensor 125. The payload data may contain, but is not restricted to execution time, synchronization time or CPU time of the current method. Afterwards, a path event node 3940 is created in step 4204 and its agentId 3921, local pathId 3922 and call depth 3952 are initialized with the corresponding values from the tag info node 3801 of the thread local storage. The sensorId 3942 is initialized with a value identifying the current method, the entry/exit indicator 3951 is set to "exit" and the payload data 3941 is initialized with the previously acquired values. In step 4205 the initialized path event node is sent to the monitoring node 131 and the call depth 3823 of the tag info node in the thread local storage is decremented in step 4206. If it is detected in step 4207 that the call depth has now a value of 0, then the tag info node 3801 in the local thread storage is reset in step 4208. A call depth of 0 indicates that execution of the outermost instrumented method within the current execution of the current thread is finished and thus the values of the tag info node 3801 are no longer valid.

FIG. 43 depicts different types of path nodes, which are used by the correlation engine to represent monitored execution paths. A start path node 4301 which is shown in FIG. 43*a* contains a parent path section 4310, which is used to store information to correlate the current execution path with a potential parent execution path which triggered the current execution path. The parent path info section 4310 contains a parent pathId 4311, a parent agentId 4312, which are used to identify the parent execution path, and a forkId 4313 which is used to identify the position within the parent execution path where the current execution path was activated. The path info section 4320 includes a pathId 4321 to identify the execution path within the virtual machine, an agentId 4322 to identify the virtual machine or process that executed the path, payload data 4323 which may contain information about the execution path, like name or id of the thread that performed the execution, a field path nodes 4324, which includes a list of path nodes 4330 and path correlation nodes 4350 belonging to the path. The entries of the path nodes list 4324 of a start path node 4301 are sorted according to the arrival time of the corresponding method entry path event nodes 3940 and path correlation event nodes 3960 at the server correlator 138. Path event nodes 3940 and path correlation nodes 3960 are sent to the server correlator 138 via one network communication channel and arrive at the correlation engine in the same sequence as they were sent by the agent 127. Thus, the sequence of the path nodes in a path node list 4324 is equivalent to the execution order of the methods represented by the path nodes.

The field temporary correlation nodes 4325 contains path correlation nodes 4350 which link the current execution path with associated child execution paths, where data describing the child paths arrived at the server correlator 138 before the corresponding path correlation event node arrived. This situation may occur e.g. if in case of a remote method invocation, the network latency between the calling application and the correlation engine is higher than the network latency between the callee application and the correlation engine.

The action correlation data section of a start path node 4301 contains data that allows the identification of the monitored action execution that caused the thread execution described by the start path node 4301. More specific, it allows identification the action start path node 4360 or action path node 4340 describing the monitored action execution causing the thread execution described by the start path node 4301. In case no such action execution exists, the action correlation data section 4330 may be empty. This may e.g. be the case if a described thread execution is not directly triggered by a monitored action execution. The action correlation data 4330 may contain but is not limited to a sessionId 4331 which may be used to identify the browser instance 101 on which the causing action execution was performed, a requestId 4332 identifying the content on which the causing action was executed in form of e.g. the hash code of the URL of the content, a frameId 4333 identifying the content view on which the causing action was executed, an actionId 4334 which identifies the causing action within content scope, a start timestamp 4335 holding the time at which the monitored thread execution was started and which is also the time at which request causing the thread execution was received, a referrer 4336 identifies the content (e.g via its URL) that referred and caused loading of the content on which the causing action execution was performed. A correlated indicator 4337 may be used by the path combiner 135 to quickly check if a start path node should be considered for end-to-end transaction correlation.

FrameId 4333 and actionId 4334 may not be available if the request that caused the monitored thread execution was sent before the browser agent was initialized. This may e.g. be the case for resources loaded by the browser during content load activity. In this case, the path combiner 135 may use the remaining action correlation data (e.g. sessionId 4331, referrer 4336 etc.) together with information about the sequence of incoming start path nodes 4301 and action start path nodes 4360 to correctly correlate end-to-end transactions.

FIG. 43*b* describes a path node 4330 which represents one execution of an instrumented 212 method or an instrumented request handling method (e.g. 123, 417 or 506) within an execution path. A path node contains payload data 4431, sensorId 4332 and call depth 4333. Payload data contains data describing one execution of an instrumented method, which may contain but is not limited to execution time, synchronization time, CPU time or argument values. The sensorId 4332 allows the reconstructing of the context of the sensor that caused the created of the path node 4330. The field call depth 4333 stores the nesting level of the current instrumented method.

FIG. 43*c* shows a path correlation node 4350 which is used to map interdependencies between different parts of distributed execution paths. A path correlation node may contain a forkId 4351, a sensorId 4352, a call depth 4353 and a child path references list 4354. The forkId 4351 identifies activations of other threads, performed by the current thread, within the scope of the current thread. Activations of other threads may be performed by explicit thread activation, remote method invocation or sending of messages. The list child path references 4354 may include references to paths triggered by the thread activation described by the current path correlation node 4350. The functionality of sensorId 4352 and call depth 4353 is as specified in the description of FIG. 43*b*.

An action start path node 4360 as shown in FIG. 43*d* represents an individual monitored action execution performed on an individual browser within an individual content view. It contains correlation data to identify the described action execution, data to identify dependencies to other recorded action executions like source action info 4380 and parent action identification data 4390, together with tracing and performance monitoring data describing the action execution and all its monitored nested action executions. Such an action start path node may contain but is not limited to a session Id 4361, requestId 4362 and frameId 4363 to identify the origin of the described action execution, an actionId 4367 to identify the execute action and an agentId 4364 identifying the instrumented web server 122 that received the action monitor request 118 that, indirectly via creating and sending a corresponding action event node 3980, caused the creation of the action start path node 4360. Additionally it may contain a source action info section 4380 which allows the identification of the action execution on the previous content view that caused the content view on which the action execution described by the action start path node 4360 was executed. The source action info 4380 may contain but is not limited to a source requestId 4381, a source frameId 4382 and a source action Id 4383 to identify the source action execution, a name 4384, type 4385 and parameters field 4386 which describe the source action execution, a start timestamp 4387 containing the time when the source action was triggered on the previous content view and source content meta-data 4388 containing data describing the source content, like the name or the URL of the source content. The source action reference 4365 may be used to refer the action start path node 4360 representing the source action of this action. The source action reference may be set by the browser correlator 134 during action correlation, see FIG. 47.

The parent action identification data 4390 contains information to identify a monitored action execution performed on a parent frame which caused the execution of this action. This may be the case for monitored content load activity in a frame setup, where loading of a parent frameset causes loading the content of its child frames. The parent action identification data 4390 may contain but is not limited to a parent frame requestId 4391, a parent frameId 4392 and a parent frame action Id 4393 to identify the causing parent action execution, and a parent frame action name 4394 containing the name of the causing parent action. The child frame action reference list 4366 contains all action start path nodes 4360 for which the current action start path node is the parent frame action. This list is populated by the browser correlator 134 during action correlation.

Name 4368, type 4369 and parameters 4370 provide detail information about the executed action, start timestamp 4371 and end timestamp 4372 contain recorded action execution start and end time. The child action path node list 4373 contains a list of monitored nested action executions in form of action path nodes 4340 if such monitored nested action executions exist. It is populated by the browser correlator 134 during action correlation.

The start path node list 4374 contains a list of start path nodes 4301 which were caused by the action execution described by the action start path nodes. This list is populated by the path combiner 135 during end-to-end transaction combination, see FIGS. 49 to 53. Browser location and metadata 4375 describes the geographic location and information like name, type and version of the browser on which the described action was executed. Latency and bandwidth data 4376 describe the measured performance of the network connection between browser and instrumented web server. Request received timestamp 4377 and request sent timestamp contain the time when the corresponding action monitor request 118 was received by an action monitor request handling method 126 and the time when the action monitor request sender 852 sent it. Content meta-data may contain data describing the content on which the action was executed, like a name and an URL. The correlated indicator 4389 may be used by the path combiner 135 to flag action start path nodes 4360 for which end-to-end transaction combination is finished.

FIG. 43*e* describes an action path node 4340, which may be used to describe nested action executions of an action execution described by an action start path node 4360. It may contain but is not limited an actionId 4341 which identifies the action execution within the content view identified by its enclosing action start path node, name 4342, type 4343 and parameters 4344 describing the executed action, a start timestamp 4345 and an end timestamp 4346 for the recorded start and end of the action execution, a nesting level 4347 to model the call nesting level of the described action, and a start path node list 4348 containing the start path nodes 4301 which are caused by the described action execution.

The start path node list 4348 is populated with start path nodes describing the processing of requests triggered by the action execution by the path combiner 135 during correlation.

The sequence of action path nodes 4340 in the child action path list 4373 of an action start path node 4360, together with the nesting level 4347 allow to reconstruct call sequence and nesting level of monitored action executions performed by the action execution described by the enclosing action start path node 4360.

The process depicted in FIG. 44 shows the processing of an incoming start path event node 3901 by the server correlator 138. A start path event node 3901 is transformed into a start path node 4301, which is inserted into the path repository 136 and forwarded to the path combiner 135. Each start path node 3901 represents one execution path of a thread.

After receiving a start path event node 3901 in step 4401, the server correlator first queries the path repository 136 for an existing start path node 4301 with the same pathId 4321 and agentId 4322 as the received start path event in step 4402. If such a start path node is found, the payload data of the found start path node is updated with the payload data of the received start path event node 3801 in step 4405. Otherwise, a new start path node 4301 is created and inserted into the path repository 136 and its path info section 4320 is initialized with data from the local data section 3920 of the incoming start path event node 3901 in step 4403. A following step 4420 checks if action correlation data 3930 of the incoming start path event node is set. In case full or partial action correlation data is available, the corresponding action correlation data fields 4330 of the created or found start path event node 4301 are set to the corresponding values from the received start path event node 3901 in step 4406. The start timestamp 4335 is set to the path start timestamp 3936 of the incoming star path event node.

The server correlator checks 138 in step 4407, if the parent thread correlation section 3910 of the received start path event node 3901 is initialized, and resets the parent path info section 4310 of the created or updated start path node 4301 in step 4408, if the parent data 3910 of the received start path event node is not initialized, and terminates processing of the received start path event in step 4419. Otherwise, the server correlator 138 initializes the parent path info section 4310 of the start path node 4301 with the data from the received start path event node 3901 in step 4409. Afterwards, it queries the path repository 136 for a start path node 4301 representing the parent path addressed by the received start path event node 3901 in step 4410. If no matching start path node 4301 is found, the correlation engine creates a new start path node 4301 and initializes its pathId 4321 and agentId 4322 with parent local pathId 3912 and parent agentId 3911 from the received start path event node 3901 in step 4420. Additionally, a path correlation node 4350 is created, and added to the temporary correlation nodes 4325 of the start path node 4301 created in step 4412. The forkId 4351 of the created path correlation node 4350 is initialized with the forkId 3913 of parent thread correlation data 3910 of the received start path event node 3901, and a reference to the start path node 4301, created or updated in step 4403 or 4405, which represents the path described by the received start path event node 3901, is appended to the child path references 4354 of the created path correlation node 4354. SensorId 4352 and call depth 4353 of the path correlation node are reset. After execution of step 4412, processing of the received start path event is terminated in step 4419.

If a start path node 4301 representing the parent execution path was found in step 4410, execution continues with step 4413, where the server correlator 138 queries the path nodes 4324 of the found start path node representing the parent thread execution for a path correlation node with a forkId 4351 as the forkId 3913 of the received start path event node 3901. If such a path correlation node 4351 is found, a reference to the start path node 4301 which was created or updated in step 4403 or 4405 is added to the child path references of the path correlation node in step 4418, and the processing of the received start path event node 3901 is terminated in step 4419.

If no matching path correlation node 4350 is found in the path nodes 4324 of the start path node representing the parent thread execution in step 4413, execution continues in step 4415, and the temporary correlation nodes 4325 of the start path node 4301 representing the parent thread execution are queried for a path correlation node with a forkId 4351 as the received forkId 3913. If a corresponding path correlation node is found, execution continues with step 4418, which appends a reference to the created or updated start path node 4301 to the child path references 4354 of the found path correlation node 4350. Otherwise, a new path correlation node 4350 is created and added to the temporary correlation nodes 4325 of the start path node 4301 in step 4417. The forkId 4351 of the created path correlation node 4350 is set to the forkId of the received start path event 3901 and sensorId 4352 and call depth 4353 are reset. After subsequent execution step 4418, execution continues with step 4419.

The processing of an incoming path correlation event 3960 by the server correlator 138 is shown in FIG. 45. On receiving a path correlation event 3960 (step 4501), the server correlator first checks if a start path node 4301 with pathId 4321 and agentId 4322 equal to local pathId 3922 and agentId 3921 of the received path correlation event node 3960 exists in the path repository 136. If no corresponding start path node 4301 is found, the path correlation event 3960 is ignored (step 4506) and processing of the event is ends with step 4509.

Otherwise, the temporary correlation nodes 4325 of the start path node 4301 found in step 4602 are queried for a path correlation node 4350 with a forkId 4351 matching the forkId 3961 of the received path correlation event node 3960. If the temporary correlation nodes 4325 do not contain a matching path correlation node 4360, a new path correlation node is created, initialized with the data of the received path correlation event node 3960 and appended to the path nodes 4324 of the start path node 4301 found in step 4502. Otherwise, the path correlation node 4350 found in step 4504 is removed from the temporary correlation nodes 4325, call depth 4353 and sensorId 4352 are initialized with the corresponding values of the received path correlation event node 3969, and the path correlation node 4350 is appended to the path nodes 4324 in step 4508. The process then ends with step 4509.

FIG. 46 describes the processing of an incoming path event node 3940 by the server correlator 138, starting with step 4601. In a subsequent step 4602 the server correlator 138 checks if a start path node 4301 with agentId 4322 and pathId 4321 equal to the agentId 3921 and local pathId 3922 of the received path event node exists in the path repository 136. If no matching start path node 4301 is found, the incoming path event node 3940 is ignored (step 4604) and processing of the event terminates with step 4609.

Otherwise, the server correlator 138 evaluates the entry/exit indicator 3951 of the path event node 3940 to determine if the received path event node described entry or exit of an instrumented method 212, or an instrumented request handling method (123, 417, or 506) in step 4606. If the received path event node 3940 describes a method entry, a new path node 4355 is created, payload data 4356, sensorId 4357 and call depth 4358 are initialized with the corresponding values of the received path event node 3940 and the path node 4355 is appended to the path nodes 4324 of the start path node 4301 found in step 4602. If the server correlator 138 detects in step 4606 that the received path event node 3940 describes a method exit, the server correlator 138 queries the path nodes 4324 of the start path node 4301 found in step 4602 for a path node 4355 representing the corresponding method entry event in step 4607. The corresponding path node 4355 representing the corresponding method entry is detected by scanning the path nodes 4324 of the start path node 4301 found in step 4602 backwards, beginning with the last added path node 4355 until a path node 4355 describing a method entry with the same call depth 4358 as the received path event node 3955, which describes a method entry is found, and which has the same sensorId 4357 as the received path event node 3955. The first detected path node matching these criteria is the path node 4355 that describes the corresponding method entry.

In step 4608, the payload data 4331 of the path node 4355 found in step 4607 is merged with the measurement payload 3941 of the received path event node 3940. Merging of payload may contain but is not limited to calculating the execution duration of the method call described by the path node 4355, adding captured method return values to the measurement payload 4356 of the path node 4355, or setting a flag in the path node 4355 indicating that execution of the described method is terminated. The process then ends with step 4609.

The process depicted in FIG. 47 shows the correlation of action event nodes 3980 by the browser correlator 135 to create action start path nodes 4360 and action path nodes 4340 representing the monitored action executions reported by incoming action node events 3980. Additionally, the process evaluates data describing relations between monitored action executions, like source action info data 4380 and parent action identification data 4390 to link related action start path nodes in form of source action references 4365 and child frame action reference lists 4366.

The process starts with step 4701, when an action event node 3980 is received by the browser correlator 135. In a subsequent step 4702, an action start path node is created, and initialized with data from the received action event node 3980. Session Id 4361, requestId 4362, frameId 4363, agentId 4364, browser location and meta-data 4375, latency and bandwidth data 4376, request received timestamp 4377, request sent timestamp 4378 and content meta-data 4379 are set to the corresponding data of the received action event node. ActionId, 4367, name 4368, type 4369, parameters 4370, start timestamp 4371 and end timestamp 4372 are set from the first action performance entry 3030 from the action performance data list 3984 of the received action event node 3980. This action performance entry 3030 represents the monitored root action execution, which may have caused nested monitored action executions which are described by the consecutive action performance entries 3030 in the action performance data list. In case parent frame requestId 3041, parent frameId 3042 and parent frame actionId 3044 of the first action performance entry 3030 are set, parent frame requestId 4391, patent frameId 4392 and parent frame actionId 4393 are set to the corresponding value of the first action performance entry 3030. The first action performance entry is then removed from the action performance data list 3984.

The subsequent step 4703 processes each remaining action performance entry 3030 in the action performance data list 3984, and action path nodes 4340 are created and initialized with data from those action performance entries 3030. ActionId 4341, name 4342, type 4343, parameters 4345, start timestamp 4346, end timestamp 4347 and nesting level 4348 are set with corresponding data from an action performance entry. The start path node list remains empty and is later populated by path combiner 135. The created action path nodes 4340 are then appended to the child action path node list 4373 of the previously created action start path node 4360.

A subsequent step 4704 checks if the action performance data list 3984 of the received action event node 3980 contains a source action performance entry 3020. If no such entry is available, the process continues with step 4714. Otherwise, the data of the source action info section 4380 is initialized with corresponding data from the source action performance entry 3020 in step 4705. A subsequent step 4706 detects the action start path node 4360 that matches the source action info 4380 set in step 4705. This may e.g. be performed by finding the newest action start path node 4360 with the same sessionId 4360 as the created start path node, a requestId 4362 as the source requestId 4381 and a frameId 4363 as the source frame Id 4382 or by finding the action start path node 4360 representing the content load activity of the content with a matching sessionId, requestId and frameId. If such an action start path node 4360 is found, a plausibility check is performed in step 4707 (For details of the plausibility check, see FIG. 48). In case the plausibility check fails, the process continues with step 4710. Otherwise, the source action reference 4365 of the created action start path node 4360 is set to refer the found action start path node found in step 4706.

A subsequent step 4710 finds the action start path node 4360 for which the action start path node 4360 created in step 4702 is the source action. The availability of data describing an action before the availability of data describing its source action may e.g. occur in systems with clustered web servers, where action monitor requests 118 and action event nodes may travel on different paths with different latency.

If such an action start path node is found, step 4711 performs a plausibility check which determines if both action start path nodes should be linked. In case the check fails, the process continues with step 4714. Otherwise, the source action reference 4365 of the found action start path node 4360 is set to refer the created action start path node in step 4713.

Following step 4714 checks if the parent action identification data 4390 of the action start path node is set (see step 4702). In case no parent action identification data is available, the process ends with step 4717. Otherwise, the action start path node 4360 identified by the parent action identification data is fetched, and a reference to the created action start path node is added to the child frame action reference list 4366 of the found action start path node 4360 in step 4715. Subsequent step 4716 queries action start path nodes for which the created action start path node is the parent action, and adds them to its the child frame action reference list 4366. The process then ends with step 4717.

Finding matching parent or child action start path nodes may be performed by searching action start path nodes 4360 with the same sessionId 4361, as the created action start path node, and with requestId 4362, frameId 4363 and actionId 4367 matching the corresponding parent frame requestId 4391, parent frameId 4392 and parent action Id 4393.

The drawings shown in FIG. 48 illustrate the plausibility check which is performed to check if a received source action performance entry 3020 which identifies a source content view should be used to link recorded activity with the potential source content view, or if the source action performance entry should be ignored because the plausibility check failed. The plausibility check is performed in steps 4707 and 4711 of the process described in FIG. 47.

FIG. 48*a* shows the execution of the plausibility check, FIG. 48*b* and FIG. 48*c* depict exemplary scenarios in which the plausibility check passes and FIG. 48*d* shows an exemplary scenario that causes the plausibility check to fail.

The plausibility check starts when a source action performance entry 3020 is received, which is followed by an action performance entry 3030 describing the content loading caused by the source action (destination action candidate) and an action start path node 4360 (source action candidate) matching the start action performance entry is found, see step 4801. The start timestamp 3027 of the source action performance entry 3020 is compared with the start timestamp 3036 of the destination action candidate in step 4802, and it is checked if the time elapsed between both timestamps is lower than a specific "link immediate threshold". A time lower than this threshold may indicate a destination content loaded from the local cache of the browser, or a destination content loaded from the webserver without unexpected delays. Experiments showed that threshold values between 2 to 5 seconds provide good results. In case the check of step 4802 is passed, a subsequent step 4809 indicates a successful plausibility check and the process ends with step 4810. If check 4802 fails, the process continues with step 4804, and queries if a start path node 4301 is available, that describes the web server side handling of the request that provided the response containing the destination content. In case such a start path node 4301 is not available, step 4808 indicates a failed plausibility check and the process ends with step 4810. Otherwise, step 4806 checks if the duration of the found start path node 4301 justifies the delay between the start of the action on the previous content and the recorded loading of the destination content. For example, if time between recorded start of the source action and recorded start of loading the destination content is 30 seconds, a recorded request handling duration of about 25-30 seconds, which implies that handling of the request has been started 0-5 seconds after the request was sent, would justify the delay. Lower monitored handling durations would not justify a passing plausibility check. Additionally, measured browser/web server network connection performance data, like network latency may also be used for this check. If this check fails, a failed plausibility check is indicated in step 4808. Otherwise, a passed plausibility check is indicated in step 4809. In both cases, the process ends with step 4810.

FIG. 48*b* shows a scenario where the content C2 4824 requested by the source action started on content C1 4822 is fetched from the cache of the browser 101, and no request for C2 is sent to the instrumented web server 122. Such a scenario would pass the plausibility check because check 4802 would pass.

The scenario described in FIG. 48*c* shows a source action triggered on content C1 4822, which requests content C2

4824 which is not available in the cache of the browser 101. In this case, a request for C2 4825 is sent to the instrumented web server 122, which handles the request to provide C2 4826 and which sends a response 4827 containing C2 to the browser. This scenario would pass the plausibility check even if check 4802 fails, if the request handling to provide C2 4826 justifies an extended delay.

FIG. 48*d* shows a scenario where the user first views content C1 4822, and then navigates out of the monitored application 4828 and views not instrumented content. After some time, the user e.g. manually types in the URL of C2 4829. This scenario would create browser side monitoring data indicating a direct link between the view of C1 4822 and C2 4824, because source action data 843 may remain in the content load independent storage 842 of the browser. But considering also recorded request handling activity as in step 4806 reveals that there is no request handling for C2 recorded which justifies the extended delay between navigating out of C1 4822 and the loading of C2 4824.

FIG. 49 provides an overview of end-to-end transaction correlation as performed by the path combiner 135 to combine recorded browser side action executions with the recorded instrumented web server side request handling related processing caused by the browser side action executions.

Action start path nodes 4360 and start path nodes are partitioned according their sessionId (4331 and 4361). Action start path nodes 4360 with identical sessionId 4361 are sorted according to their request received times 4377, and start path nodes 4301 with the same sessionId 4331 are sorted according to the completion time of the recorded request handling. Start path node completion time and request received time are transferred into the timing system of the monitoring to allow comparison.

A server path stability timestamp 4908 is continuously calculated and updated, and indicates the point of time when no path event from any connected agent deployed to a monitored application (e.g. instrumented web server 122 or application server 208) can be expected. All start path nodes 4301 ending at an earlier time are stable, because no events that could change child start path nodes of those start path nodes can be expected. Further details regarding this technique may be found in U.S. patent application Ser. No. 12/971,408 entitled "Completeness Detection of Monitored Globally Distributed Synchronous and Asynchronous Transactions" which is incorporated by reference herein.

The server path stability timestamp advances in time, and determines the start of the per session Id path combination area 4901. The path combination timespan 4907 expands the per sessionId path combination area 4901 into the past. Only action start path nodes and start path nodes which are inside this per session path combination area are considered for end-to-end transaction correlation. Path combination timespan values between 5 and 10 minutes provide good results. The length of the path combination timespan also influences the action sending strategy (see e.g. FIG. 32), because monitored browser side activity must be available at the path combiner 138, before the monitored server side transaction handling caused by this browser activity leave the per session path combination area.

4360*a* to 4360*h* represent different action start path nodes 4360 with identical sessionId 4361, sorted by their request received time, 4301*a* to 4301*m* represent different start path nodes 4301 with the same sessionId 4331 as the action start path nodes, sorted by their completion time. At the snapshot depicted in FIG. 49, action start path node 4360*g* and start path node 4301*j* are currently entering the path combination area. Start path node 4301*j* is combined with action start path node 4360*f* and action start path node 4360*g* is combined with start path node 4301*h* by immediate combination 4905. At the same time, start path node 4301*a* and action start path node 4360*a* are exiting the per sessionId path combination area and start path node 4301*a* is combined with action start path node 4360*b* by deferred combination 4904.

Immediate combination 4905 is performed when an action start path node 4360 or a start path node 4301 enters the per sessionId path combination area 4901, and deferred combination 4904 is performed when a start path node 4301 leaves the per sessionId path combination area (see point of time 4906).

The server path stability timestamp 4908 continuously advances in time and thus the whole per sessionId path combination area advances in time. This continuous advance in time causes start path nodes 4301 which are finished at a specific point of time, and action start path nodes which are received at a specific point of time, to enter the per session path combination area 4901 and to leave it after the path combination timespan 4907.

Immediate combination as performed on entry of the path combination area (for a detailed description of the process see FIG. 50), performs path combination based on matching requestIds (4332 for start path nodes, 4362 for action start path nodes). On entry of a start path node 4301, an action start path node 4360 with matching requestId is searched. If one is found, start path node and action start path node are combined and the start path node 4301 is removed from the combination area. If an action start path node 4360 enters, a start path node 4301 with matching requestId is queried. If one is found, then action start path node and start path node are combined and the start path node is removed from the path combination area. The requestId based combination is used to combine action start path nodes describing the request and load of new content with the start path node that describes the handling of this request for new content.

If a start path node 4301 leaves the path combination area 4901, deferred combination 4904 is performed, which searches the path combination area 4901 for the action start path node or action path node that caused the leaving start path node 4301. This search may either be based on matching frameId (4333, 4363) and actionId (4334, 4367), or on a matching referrer (the referrer 4336 of the start path node 4301 matches the content URL stored in the content meta-data 4379 of the action start path node 4360).

The frameId/actionId based matching is used to combine action start path nodes and action path nodes with start path nodes caused by the execution of those actions that where sent after the initialization of the browser agent 801 and which provide action correlation data in form of frameId 4363 and actionId 4367.

The referrer based matching combines requests sent before the browser agent 801 was initialized and which therefore do not provide set frameId and actionId. In this case, the only usable combination data in addition to the sessionId is the referrer. This referrer is compared with the content URL stored in the content meta-data of action start path nodes, and the first matching action start path nodes is linked.

Examples for requests that are combined based on the referrer, are image resources which are requested by the browser during interpretation and rendering of the content. The referrer of those requests would be the URL of the content which contains references to those resources.

It is noteworthy, that a request for new content would also contain the same referrer, which makes it impossible to determine which request caused the loading of new content and which caused loading of resource of the current content. However, combination of requests for new content has already been performed during immediate combination 4905, and only requests for resources of the current content are available in the per sessionId path combination area 4901 at this point of time, which can then safely be combined using the referrer.

The processes described in FIG. 50 show two variants of immediate path combination, whereas FIG. 50*a* shows immediate path combination 4905 caused by a start path node 4301 entering the path combination area, and FIG. 50*b* depicts the process executed when an action start path node 4360 enters the path combination area 4901. One goal of immediate combination is to match each action start path node describing the load of content, with the start path node that describes the request which provided this content.

Immediate path combination 4905 triggered by a start path node 4301 starts with step 5001, when a start path node enters the path combination area. Subsequent step 5002 queries the path combination area 4901 for action start path nodes 4360 with a requestId 4362 matching the requestId 4332 of the start path node 4301. In case no matching action start path is found, the process ends with step 5009. Otherwise, step 5004 checks if multiple matching action start path nodes are found. In case only one was found, process continues with step 5007 which adds the entering start path node to the start path node list 4374 of the matching action start path node 4360. Afterwards step 5008 is executed, which removes the entering start path node 4301 from the path combination area, because it is now combined with its causing action start path node. The process then ends with step 5009.

Otherwise, if step 5004 detects more than one matching action start path node 4360, the process continues with step 5005 which uses additional data available in the entering start path node and the matching action start path nodes to find the best matching action start path node.

Different strategies may be employed to detect the best matching action start path node. A first, simple exemplary strategy may e.g. use the youngest matching action start path node. More complex strategies may use timing data provided by the involved start path nodes and action start path nodes, like the start timestamp 4335 of the start path node together with start timestamp 4371 and browser/web server network latency 4377 to determine the best matching action start path node 4360. Yet other strategies may introduce additional correlation data in form of a request serial number, which uniquely identifies a request, and which is attached to the start path node describing the request, and which is also added to the content created in a way, that the browser agent 801 can extract it, and send it back with action monitor requests 118. This request serial number may also be attached to action start path nodes 4360 and allows identification of the matching action start path node. It is noteworthy, that the probability of multiple matching action start path nodes is very low. Such a situation may e.g. occur if a browser with multi-tab feature uses multiple tabs to display the same content simultaneously.

Subsequent step 5006 adds the entering start path node to the start path node list of the best matching action start path node, and the process continues with step 5008.

FIG. 50*b* shows the immediate combination process 4905 performed when an action start path node 4360 enters the path combination area 4901. If an action start path node enters the area as described in step 5010, the process queries the path combination area for start path nodes 4301 with a requestId 4332 matching the requestId 4362 of the entering action start path node. If no matching start path nodes are available, the process ends with step 5020. Otherwise, step 5013 checks if multiple matching start path nodes 4301 were found. In case only one matching start path node is available, this is added to the start path node list 4374 of the entering action start path node 4360 in step 5017, and the matching start path node 4301 is removed from the path combination area 4901 in step 5019. The process then ends with step 5020.

In case multiple matching start path nodes are found, the process proceeds with step 5014 to check if additional data which may be used for correlation is available (for a detailed description of such data see description of step 5005). In case no such data is available, step 5018 adds the oldest matching start path node to the start path node list 4374 of the entering action start path node 4360 and the process continues with step 5019 and the process ends with step 5020.

In case step 5014 detects that additional correlation data and timing data is available, the process continues with step 5015 to detect the best matching start path node. (For a set of exemplary strategies to identify the best matching start path node, see description of step 5005) A subsequent step 5016 adds the best matching start path node to the start path node list 4374 of the entering action start path node 4360. The process then continues with step 5019.

FIG. 51 shows the process of deferred path combination 4904, as performed when a start path node 4301 leaves the path combination area 4901. Deferred path combination 4904 performs combination of action start path nodes 4360 and action path nodes 4340 which described browser activities that are not content load related with the start path nodes 4301 describing request handling caused by those activities. Additionally, start path nodes 4301 describing resource load activities performed before the browser agent 801 was initialized, are combined with action start path nodes 4360 describing the causing resource load activity.

The process starts when a start path node 4301 leaves the path combination area 4901 which triggers deferred combination 4904, see step 5101. A subsequent step 5102 checks if frameId 4333 and actionId 4334 of the exiting start path action 4301 are set. In case they are set, the process continues with step 5103 and queries the path combination area for action start path nodes with matching frameId 4363. From those matching action start path nodes, the action start path node or action path node 4340 with matching actionId (4367 or 4341) is selected.

Note: in case of multiple matching action start path nodes/action path nodes, the matching one may be found by comparing recorded start and end timestamp (4371, 4345 and 4372, 4346) with the start timestamp 4335 and other timing information of the exiting start path node 4301 to detect the best matching action start path node 4360 or action path node 4340.

In case no matching action start path node or action path node is found, the process continues with step 5106 which removes the exiting start path node 4301 from the path combination area 4901. The process then ends with step 5111.

In case step 5103 detects a matching action start path node or action node, the exiting start path nod 4301 is added to its start path node list (4374 or 4348) in step 5105 and the process continues with step 5106.

If step 5102 detects that frameId 4333 and actionId 4334 of the exiting start path node 4301 are not set, the process continues with step 5107, which checks if the referrer 4336 is set. In case it is not set, the process continues with step 5106. Otherwise, step 5108 is executed which searches the path combination area 4901 for the oldest action start path node 4360 which matches according to the referrer 4336. This may be performed by sequentially scanning the path correlation area 4901, starting with the oldest action start path event, for an action stat path node with an URL (stored in the content meta-data 4379 of the action start path node) matching the referrer 4336 of the exiting start path node 4301. Scanning stops when the first matching action start path node is found, or if the full path combination area 4901 was scanned.

If no matching action start path event was found, the process continues with step 5106. Otherwise, step 5110 adds the exiting start path node 4301 to the start path node list 4374 of the found action start path node 4360. The process then continues with step 5106.

The processes depicted in FIG. 52 show detection and handling of unexpectedly delayed sending of action monitor requests 118, which may cause that action start path nodes 4360 reach the path combiner 135 after their related start path nodes 4301 exited the path combination area 4901. The process described in FIG. 52*a* shows the handling of an exceeded delayed of an action monitor request by the browser agent 802 and FIG. 52*b* depicts the processing of the path combiner 135 when it gets notified about a delayed action monitor request 118.

Notification about a delayed action monitor request 118 by the browser agent 801 starts if the browser agent detects that the delay between a request sent by an action execution, and the sending of the action monitor request containing data about the action execution exceeds a certain limit. The chosen action sending strategy (see FIG. 32) determines how this detection is performed, or even if such handling is required. A cyclic action sending strategy 3201 would not require handling of delayed action monitor requests because the strategy itself guarantees a maximum delay. For a strategy that sends action monitor requests 118 depending on the end of action executions, like strategy 3204, detection of potentially delayed action monitor requests may be performed by cyclically checking the duration of an ongoing action execution. If the action execution time exceeds a certain limit, the process may start with step 5201. A subsequent step 5202 fetches current action correlation data from the correlation data manager, a following step 5203 may create a preview request, which may contain but is not limited to all data contained in the current action correlation data, the URL of the current content, and the current referrer. Step 5204 sends the preview request to an action monitor handling method 126, which may create a preview signal notifying delayed action monitor request sending and containing all data of the preview request. The process then ends with step 5205. It is noteworthy, that the browser agent may send consecutive preview requests in case the time elapsed since sending the previous preview request exceeds the delay limit and action execution is still not ended.

The process shown if FIG. 52*b* shows the processing of a preview signal as received by the path combiner 135. On receiving such a signal, the path combiner fetches all start path nodes which are potentially caused by the monitored action executions affected by the delayed action monitor request, and prolongs the stay of those start path nodes in the path combination area 4901.

If the path combiner 135 receives such a signal, see step 5210, it queries the path combination area for start path nodes matching according to action correlation data (frameId 4333 and actionId 4335) in step 5211, and adds the found start path nodes to a temporary update list in step 5212. A subsequent step 5213 queries the path combination area for start path nodes with matching requestId and appends those paths to the temporary update list in step 5214. A following step 5215 queries the path combination area for start path nodes matching according to the referrer (The referrer of the start path nodes equals the URL received with the preview signal) and step 5216 adds found start path nodes to the temporary update list.

The following step 5217 marks the start path nodes in the temporary update list to expand their stay in the path combination area to compensate the delay of the action monitor request in step 5213. If the stay of those start path nodes is already expanded, the expand time period is exceeded. The process then ends with step 5218.

The outcome of the above described combination process is end-to-end transaction data describing browser side activities and all related server side activities. This related server side activities contain all request caused by a browser side user interaction triggering a content update, and contains requests like XHR requests or requests for additional resources required for the content update. Such end-to-end transaction data is also referred to herein as path records.

For browser side user interactions triggering a content load that replaces the current content with new content, those related server side activities also contain the request for the new content. Those content load requests are combined with that browser side activities that describe the loading of the new content (e.g. load/onLoad action) instead of a browser activity describing unloading of the old content.

Following example shows the benefit of this approach: A complex web application provides various different pages containing different content adverting products and also provides various links to a "purchase" page that allows buying products. In case of an approaching performance problem related to the request of the "purchase" page, a monitoring system associating requests for new content to an unload activity on the original content, various performance degradations of page unloads would be reported, and the user of the monitoring system would have to deduce the root cause. A monitoring system as proposed herein would show exactly one performance degradation related to the loading of the "purchase" page as the root cause of the problem.

The combination process described above achieves this by using different types of correlation data at different points of time in the combination process. The path combination area entry combination as described in FIGS. 50*a* and 50*b* performs requestId (4332 and 4362) based combination. The requestId identifies and represents the URL of a specific content. The requestId is calculated by the browser agent to represent the content it is deployed in, and set to the requestId of action start path nodes 4360 created by the browser agent. Those start path nodes also describe the loading of the content. Additionally, the requestId is calculated for all received requests at the server and set to representing start path nodes 4301. The requestId based combination assures that server side tracing data describing a request for new content is combined with browser side tracing data describing the loading of the new content. However, the correlation data of those requests for new content may also contain correlation information like action Id and frameId that point to an activity of the previous content. To prevent the usage of this—in that situation incorrect—correlation data, the frameId and actionId based correlation is deferred to a time when it is guaranteed that all corresponding requestId based combination has been performed. This may be at a point of time when a potential activity describing the next content load and the corresponding server side response handling describing the request for the next content have entered the path combination are and have been combined using requestId based combination.

After this point in time, only server side tracing data is available which can safely be combined using frameId and actionId or a referrer, as described in FIG. 51.

The block diagram shown in FIG. 53 depicts an exemplary embodiment of a monitoring node containing a visit manager 5301. The visit manager analyzes end-to-end transactions inserted into the path repository 136 by the path combiner 135 in form of action start path nodes 5406. It analyzes the chronological sequence of end-to-end transactions per browser and detects temporal clusters. Those temporal clusters represent specific visits of the monitored application performed by individual browsers.

The visit manager 5301 contains a visit manager configuration section 5305, which may contain but is not limited to a visit timeout 5306 which may determine the minimum time transaction free time period between two consecutive visits and a set of visit evaluation rules 5304 which may be used to create meta-data describing visits. Additionally, the visit manager 5301 maintains a visit repository 5302 which contains visit records 5303 which describe currently active and previously recorded visits.

FIG. 54 shows a detailed view of a visit record 5303 which may be used to describe individual visits. A visit record may contain but is not limited to a sessionId 5402 identifying the browser instance with which the visit was executed, a start timestamp 5403 identifying the point of time when the first end-to-end transaction being part of this visit was started, and an end timestamp 5404 containing the point of time when the last end-to-end transaction of the visit was ended. The latest activity timestamp 5405 indicates the point of time of the latest activity recorded for this visit and may be used to determine the end of the visit. The action start path node list 5406 contains the action start path nodes that describe the end-to-end transactions which form the visit. An active indicator 5407 may be used to indicate if the described visit is currently active and subsequent action start path nodes are expected for the visit, or if the visit is ended due to an exceeded maximum inactivity time. The visit meta-data 5410 may be used to store calculated or measured meta-data describing the visit. Especially visit evaluation rules 5304 may be used to calculate the meta-data. Visit meta-data 5410 may contain but is not limited to browser location and meta-data 5411, describing geographic location and e.g. name and version of the browser executing the visit, a bounce indicator 5412 indicating if the user immediately left the application after the first content view, a login indicator 5413 indicating if the described visit contains a login, a purchase indicator 5414 indicating if a purchase was performed with the visit, and a purchase amount 5415 containing the value of purchases performed with the visit in terms of currency.

FIG. 55 shows exemplary visit evaluation rules which may be used to generate meta-data describing a visit. A visit size based rule 5501 as described in FIG. 55*a* may be used to evaluate the number of end-to-end transactions that form a visit. It may contain a filter criterion 5502, which may be applied to the action start path nodes 4360 in the action start path node list 5406 of a visit, and a threshold 5503 which may be used to specify the minimal number of action start path nodes 4360 matching the filter criteria to fire the rule. A visit size based rule 5501 may be used to implement a bounce rule, which has a filter criterion matching all action start path nodes, and a threshold of 2. This rule distinguishes visits containing only one action start path node (bounces) from other visits.

FIG. 55*b* depicts a method call based rule 5510 which may be used to detect if specific interactions were performed during a visit, like e.g. a login or a purchase by checking if the action start path nodes 4360 in the action start path node list 5406 of a visit record 5401 contain performance monitoring and tracing data describing the execution of functionality which indicates execution of these specific interactions. A method call based rule may e.g. be used to implement a login rule, by checking if a specific "login" method was called during the visit, and if execution of this "login" method returned a value indicating a successful login. Such a method call based rule 5510 may contain but is not limited to a method filter 5511 used to identify the specific method which has to be executed to fire the rule, and a call context filter 5512 used to specify expected method call parameters or a return value which have to be met to fire the rule. The method filter may e.g. contain a class name, method name and method signature to identify an individual method.

A method call captured value based rule 5520 is shown in FIG. 55*c*. Such rules may e.g. be used to extract numeric values from visits, like e.g. the amount of spent money for purchases during a visit. Such a rule may contain a method filter 5521 and a call context filter 5522 which server the same purposes as the corresponding method filter 511 and call context filter of method call based rules. Additionally it may contain a captureId 5523 which identifies the value which should be captured. The captureId 5523 may identify the value to capture by e.g. a method parameter name or it may indicate to capture the method return value.

Such a method call captured value based rule 5520 may e.g. be used to implement a purchase amount rule, with method filter 5521 set to identify a purchase method and call context filter 5522 set to filter calls identifying a successful purchase. The captureId 5523 may be set to capture the value of a method parameter containing the purchase amount.

FIG. 56 describes the processing of new action start path nodes 4360 describing end-to-end transactions by the visit manager 5301 as they are inserted into the path repository 136 by the path combiner 135. If a new action start path node 4360 is received (step 5601), the visit manager queries the visit repository for a matching active visit record (sessionId 5402 matches sessionId 4361 of action start path node 4360 and active indicator 5407 indicates active visit) in step 5602. If no matching active visit record 5401 is found, a new visit record is created in step 5604 and initialized with data from the received action start path node 4360 and inserted into the visit repository 5302 in step 5604. The process then continues with step 5605.

In case a matching active visit record 5401 is found in step 5602, the process continues with step 5605, which appends the received action start path node 4360 to the action start path node list 5406 of the found or created visit record 5401 and which sets the latest activity timestamp 5405 of the visit record to the current time. Subsequent steps 5606 and 5607 evaluate "method call based rules" 5510 and "method call captured value based rules" 5520 with the received action start path node 4360 and store the evaluation results in the meta-data 5410 section of the visit record 5401. The process then ends with step 5608.

The process shown in FIG. 57 describes the cyclic check for timed out visits by the visit manager 5301. The process scans the visit repository 5302 to detect visit records 5303 with a latest activity timestamp older than the visit timeout 5306 stored in the visit manager configuration 5305. The process is executed cyclically with a specific visit cleanup frequency (e.g. every 1 to 5 minutes), see step 5701. An initial step 5702 queries the visit repository 5302 for visit records 5303 with an activity indicator 5407 indicating an active visit, and where the latest activity timestamp 5405 is older than the current time minus the visit timeout 5306. If no such visit records are found, the process ends with step 5706. Otherwise, the end timestamps 5404 are set to the value of the latest activity timestamp 5405, and the active indicator 5407 is set to indicate a no longer active visit record in step 5704. Subsequent step 5705 evaluates visit size based rules 5501 for each found visit record and stores the results of those evaluations in the visit meta-data 5410 of the respective visit record. The found visit records 5303 are now ready for further analysis, and the process ends with step 5706. However, data about detected ongoing visits may be used for presentation purpose even before the active indicator 5407 of the representing visit record 5303 is set to a value indicating a finished visit, to enable real-time presentation of currently ongoing visits.

The availability of end-to-end transactions considerably eases calculation of visit describing meta-data in contrast to currently available browser side based solutions, because end-to-end transactions allow the evaluation of backend side tracing data, describing e.g. the call of specific methods, their parameters and return values. Previous and current solutions are restricted to content which is available at the browser and are restricted to information extracted from this content which involves error prone content parsing. Additionally, currently available systems require manual adaptation of created content to manually insert measurement and beacon requests into the content to create transfer data to server which evaluates those requests. As most commercial web based applications consist in more than thousand different types of content, this manual adaptation initially creates a large amount of manual work to get the monitoring system working, and each update or change of the application creates additional manual adaptation work.

The screenshot shown in FIG. 58 provides an exemplary visualization of recorded visits. A visit overview section 5801 may display summary information about past and currently ongoing visits, and a visit details section 5802 may provide an overview of the recorded end-to-end transactions that form the visit which is currently selected in the visit overview 5801.

FIG. 59 shows a screenshot which provides exemplary visualizations of recorded end-to-end transactions. A visualization of an end-to-end transaction which initially loads a page is shown in tab "initial content load" 5901. A web request for root content "/" is first sent, which is received by the browser and which causes the loading of resources referred by root content. Both sending of the requests by the browser and the handling of those requests by the web server/backend are show. Additionally, timing data representing the performance of the overall page load processing and representing the performance of individual requests caused by resource requests are shown. Detailed performance data describing the performance of handled requests, down to the granularity level of individual method executions is available.

An end-to-end transaction caused by a content update activity recorded on the browser is depicted in tab "update action" 5902. It shows that a user interaction element "iceform:destination" was triggered. The type of the activity is "keypress", indicating the the interaction was keyboard based. It also shows an action parameter "L", indicating that the key "L" was pressed. The recorded browser side activity sent a request for "/orange.jsf" to the server. Details about handling this request by the web server are also displayed.

The tab "content load with source action" 5903 shows a recorded load action which loads the page "/orange.jsf", which is linked with its source action "click on Home", performed on the previously shown content and which caused the loading of "/orange.jsf".

Some embodiments of the presented disclosure may use cookies to transfer action correlation information which is required to correlate web server side transaction data with the recorded browser side activities. Browser side cookie management may be performed in a way that cookie values are shared between different tabs or frames displayed by the browser. Some embodiments using cookies as action correlation information transport mechanism may adapt the correlation data manager 821 responsible for managing correlation manager to account for such situations by setting cookie values representing action correlation data in a way that respects potential other browser tabs/frames containing monitored content. This may in case of multiple simultaneously triggered actions on different tabs/frames cause ambiguous action correlation data. But the use of requestId (hash code the URL of a request) and referrer allows correct identification of matching browser side activity and caused server side request handling even in most of such situations. The only exception for which also requestId and referrer are not sufficient for an unambiguous matching are multiple tabs/frames showing the same content. In this case, recorded timing information about recorded browser side and server side activity may additionally be used for correlation. However, such situations occur very rare in real-live usage of browser based internet applications. Potential incorrect correlation for such cases can be neglected.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for analyzing user visits to a monitored application made from a web browser in a distributed computing environment, comprising:

receiving, by a monitoring node, browser side monitoring data from one or more web browsers, where the browser side monitoring data includes a session identifier that identifies an instance of a web browser and represents a content request sent by the web browser, wherein the browser side monitoring data is sent by browser agents instrumented into content rendered by the one or more web browsers;

determining, by the monitoring node, duration between consecutive content requests received from a given web browser;

grouping, by the monitoring node, the consecutive content requests from the given web browser together to form a visit in response to the duration between the consecutive content requests being less than a visit threshold;

generating, by the monitoring node, a visit record for the visit, where the visit record includes the session identifier that identifies the given web browser, a start timestamp indicating when the visit started and an end timestamp indicating when the visit ended;

receiving, by the monitoring node, server side monitoring data, where the server side monitoring data is caused by creation of the content that is requested by the content request embodied in the browser side monitoring data and the server side monitoring data is sent by server agents instrumented into methods executed by one or more application servers; and combining, by the monitoring node, the server side monitoring data with the browser side monitoring data to form transactions between the monitored application and a particular web browser, where the browser side monitoring data identifies the particular web browser and the monitored application is comprised of the methods executed by the one or more application servers.

2. The method of claim 1 wherein the visit record further includes a login indicator indicating whether the visit included a login, a purchase indicator indicating whether a purchase was made during the visit, and a purchase amount specifying value of the purchase made during the visit.

3. The method of claim 2 further comprises determining whether a particular method was executed during the visit and updating an indicator for the particular method in the visit record.

4. The method of claim 1 further comprises applying a filter criterion to the content requests forming the visit and determining the number of content requests forming the visit that match the filter criterion.

5. The method of claim 4 wherein the filter criterion identifies content requests that executed a specific method.

6. The method of claim 5 wherein the filter criterion further identifies an expected return value of the specific method.

7. The method of claim 5 further comprises fetching value of a parameter for the specific method and storing the value of the parameter in the visit record, wherein the filter criterion includes a name for the parameter.

8. The method of claim 1 further comprises tagging a content request as a bounce when the duration between the tagged content request and adjacent content requests exceeds the visit threshold.

9. The method of claim 1 further comprises capturing, at a particular browser agent, a first action event executing on a computing device hosting the particular browser agent, where the first action event is indicative of a user interaction with a user interaction element on the web browser, wherein the first action event identifies the user interaction element by name and type of user interaction element and the type of user interaction is selected from a plurality of different types of user interactions;

capturing, at the particular browser agent, a second action event, where the second action event is caused by the first action event and is indicative of a content request sent from the web browser to a particular one of the application servers;

associating, by the particular browser agent, the second action event with the first action event;

creating, by the particular browser agent, an action record for the user interaction, where the action record includes an identifier for the user interaction and a performance metric that is related to the user interaction and accounts for the second action event;

sending, by the particular browser agent, the action record over the network to the monitoring node located remotely from the computing device;

maintaining, by the particular browser agent, correlation data that uniquely identifies the user interaction, where the correlation data includes the session identifier, an action identifier that identifies the user interaction, and a frame identifier that identifies page view for the content presented by the web browser; and appending, by the particular browser agent, the correlation data to each content request sent by the particular web browser to the particular one of the application servers to create tagged content requests.

10. The method of claim 9 further comprises receiving, by the particular one of the application servers, the tagged content requests from the particular web browser;

extracting, by a request entry sensor, the correlation data from each one of the tagged content requests;

creating, by the request entry sensor, a request record for each one of the tagged content requests, where the request record includes a performance metric related to handling of a given tagged content request and the correlation data extracted from the given tagged content request; and sending, by a server agent, the request record over a data network to the monitoring node, where the request entry sensor is instrumented by the server agent into a method of the particular one of the application servers.

11. The method of claim 10 wherein combining the server side monitoring data with the browser side monitoring data includes:

receiving, by the monitoring node, the request record from the particular one of the application servers;

receiving, by the monitoring node, the action record from the computing device;

comparing, by the monitoring node, correlation data from the request record with correlation data from the action record; and associating, by the monitoring node, the request record with the action record when the correlation data from the request record matches the correlation data from the action record.

12. The method of claim 1 wherein determining duration between consecutive content request further includes receiving, by the monitoring node, two consecutive content requests and determining whether the two requests originate from the same web browser;

in response to a determination that the two requests originate from the same browser, determining an elapsed time between the two consecutive content requests and comparing the elapsed time with the visit threshold;

assigning the two consecutive content requests to a given visit in response to the elapsed time being below the visit threshold; and assigning the two consecutive content requests to different visits in response to the elapsed time being greater than the visit threshold.

13. The method of claim 12 wherein determining whether the two consecutive content requests originate from the same web browser includes comparing session identifiers associated with the two content requests.

14. The method of claim 1 wherein generating the visit record further includes identifying most recent content request associated with a given visit;

determining time elapsed since completion of the most recent content request; and setting the end timestamp for the given visit based on the completion of the most recent content request in response to the time elapsed since the completion to the most recent content request exceeding the visit threshold.

15. A performance management system that measures end user performance in a distributed computing environment, comprising:

a client computing device;

a monitoring computing device;

a browser agent instrumented into content rendered by a web browser executing on the client computing device, the browser agent being configured to detect a content request sent by the web browser and send browser side monitoring data over a data network to the monitoring computing device located remotely from the client computing device, wherein the browser side monitoring data describes the content request and includes a session identifier that identifies an instance of the web browser;

an event correlator executing on the monitoring computing device and configured to receive the browser side monitoring data from the browser agent; and a visit manager executing on the monitoring computing device and configured to determine duration between consecutive content requests received from the web browser and group the consecutive content requests from the web browser together to form a visit in response to the duration between the consecutive content requests being less than a visit threshold and generate a visit record for each visit of a plurality of visits to a monitored application, where the visit record is stored in a computer memory of the monitoring computing device;

wherein the event correlator receives server side monitoring data and combines the server side monitoring data with the browser side monitoring data to form transactions between the monitored application and a particular web browser, where the server side monitoring data is caused by creation of the content that is requested by the content request embodied in the browser side monitoring data and the server side monitoring data is sent by server agents instrumented into methods executed by one or more application servers, and where the browser side monitoring data identifies the particular web browser and the monitored application is comprised of the methods executed by the one or more application servers.

16. The system of claim 15 wherein the visit record includes the session identifier that identifies the given web browser, a start timestamp indicating when the visit started and an end timestamp indicating when the visit ended.

17. The system of claim 16 wherein the visit record further includes a login indicator indicating whether the visit included a login, a purchase indicator indicating whether a purchase was made during the visit, and a purchase amount specifying value of the purchase made during the visit.

18. The system of claim 15 wherein the visit manager determines whether a particular method was executed during the visit and updating an indicator for the particular method in the visit record.

19. The system of claim 15 wherein the visit manager applies a filter criterion to the content requests forming the visit and determines the number of content requests forming the visit that match the filter criterion.

20. The system of claim 19 wherein the filter criterion identifies content requests that executed a specific method and further identifies an expected return value of the specific method.

21. The system of claim 20 wherein the visit manager fetches value of a parameter for the specific method and stores the value of the parameter in the visit record, wherein the filter criterion includes a name for the parameter.

* * * * *